US011980329B2

(12) United States Patent
Lu et al.

(10) Patent No.: US 11,980,329 B2
(45) Date of Patent: May 14, 2024

(54) AUTONOMOUS FLOOR CLEANING WITH REMOVABLE PAD

(71) Applicant: iRobot Corporation, Bedford, MA (US)

(72) Inventors: Ping-Hong Lu, Newton, MA (US); Joseph M. Johnson, Norwood, MA (US); Daniel Foran, Cambridge, MA (US); Marcus Williams, Newton, MA (US); Andrew Graziani, Derry, NH (US)

(73) Assignee: iRobot Corporation, Bedford, MA (US)

( * ) Notice: Subject to any disclaimer, the term of this patent is extended or adjusted under 35 U.S.C. 154(b) by 382 days.

(21) Appl. No.: 17/208,610

(22) Filed: Mar. 22, 2021

(65) Prior Publication Data

US 2021/0267429 A1 Sep. 2, 2021

Related U.S. Application Data

(60) Continuation of application No. 16/117,416, filed on Aug. 30, 2018, now Pat. No. 10,952,585, which is a (Continued)

(51) Int. Cl.
*A47L 11/40* (2006.01)
*A47L 9/06* (2006.01)
(Continued)

(52) U.S. Cl.
CPC ......... *A47L 11/4036* (2013.01); *A47L 9/0673* (2013.01); *A47L 9/2805* (2013.01); (Continued)

(58) Field of Classification Search
CPC ...... A47L 11/28; A47L 11/40; A47L 11/4036; A47L 11/4002; A47L 13/16; A47L 2201/00
See application file for complete search history.

(56) References Cited

U.S. PATENT DOCUMENTS

| | | | |
|---|---|---|---|
| 3,729,041 | A | 4/1973 | Kubota |
| 4,319,379 | A | 3/1982 | Carrigan et al. |

(Continued)

FOREIGN PATENT DOCUMENTS

| | | |
|---|---|---|
| CN | 1493247 | 5/2004 |
| CN | 1659489 | 8/2005 |

(Continued)

OTHER PUBLICATIONS

Anderson and Hamilton, "The Journey Robot," Aug. 1, 2005, [retrieved on Aug. 4, 2015], Southern Methodist University, available at URL: http://www.geology.smu.edu/~dpa-www/robo/jbot/, 10 pages.

(Continued)

*Primary Examiner* — Eric J Rosen
*Assistant Examiner* — Sharonda T Felton
(74) *Attorney, Agent, or Firm* — Fish & Richardson P.C.

(57) ABSTRACT

An autonomous floor cleaning robot includes a body, a controller supported by the body, a drive supporting the body to maneuver the robot across a floor surface in response to commands from the controller, and a pad holder attached to an underside of the body to hold a removable cleaning pad during operation of the robot. The pad includes a mounting plate and a mounting surface. The mounting plate is attached to the mounting surface. The robot includes a pad sensor to sense a feature on the pad and to generate a signal based on the feature, which is defined in part by a cutout on the card backing. The mounting plate enables the pad sensor to detect the feature. The controller is responsive to the signal to perform operations including selecting a cleaning mode based on the signal, and controlling the robot according to a selected cleaning mode.

25 Claims, 23 Drawing Sheets

Related U.S. Application Data continuation of application No. 15/383,008, filed on Dec. 19, 2016, now Pat. No. 10,064,533, which is a division of application No. 15/085,505, filed on Mar. 30, 2016, now Pat. No. 9,565,984, which is a continuation of application No. 14/936,236, filed on Nov. 9, 2015, now Pat. No. 9,320,409, which is a division of application No. 14/828,285, filed on Aug. 17, 2015, now Pat. No. 9,265,396, which is a continuation-in-part of application No. 14/658,820, filed on Mar. 16, 2015, now Pat. No. 9,907,449.

(51) Int. Cl.

| | |
|---|---|
| ***A47L 9/28*** | (2006.01) |
| ***A47L 11/24*** | (2006.01) |
| ***A47L 11/28*** | (2006.01) |
| ***A47L 13/16*** | (2006.01) |
| ***A47L 13/24*** | (2006.01) |
| ***B08B 1/10*** | (2024.01) |
| ***B08B 7/04*** | (2006.01) |

(52) U.S. Cl.

CPC ............ *A47L 9/2815* (2013.01); *A47L 11/24* (2013.01); *A47L 11/28* (2013.01); *A47L 11/4002* (2013.01); *A47L 11/4061* (2013.01); *A47L 11/4066* (2013.01); *A47L 11/4083* (2013.01); *A47L 11/4088* (2013.01); *A47L 13/16* (2013.01); *A47L 13/24* (2013.01); *B08B 1/10* (2024.01); *B08B 7/04* (2013.01); *A47L 2201/00* (2013.01); *A47L 2201/04* (2013.01); *A47L 2201/06* (2013.01); *Y10S 901/01* (2013.01)

(56) References Cited

U.S. PATENT DOCUMENTS

| | | | | |
|---|---|---|---|---|
| 4,967,862 | A | 11/1990 | Pong et al. | |
| 5,440,216 | A | 8/1995 | Kim | |
| 5,630,243 | A | 5/1997 | Federico et al. | |
| 5,720,077 | A | 2/1998 | Nakamura et al. | |
| 5,787,545 | A | 8/1998 | Colens | |
| 5,815,880 | A | 10/1998 | Nakanishi | |
| 5,841,259 | A | 11/1998 | Kim et al. | |
| 5,894,621 | A | 4/1999 | Kubo | |
| 5,940,927 | A | 8/1999 | Haegermarck et al. | |
| 5,959,423 | A | 9/1999 | Nakanishi et al. | |
| 5,991,951 | A | 11/1999 | Kubo et al. | |
| 5,998,953 | A | 12/1999 | Nakamura et al. | |
| 6,012,618 | A | 1/2000 | Matsuo | |
| 6,076,025 | A | 6/2000 | Ueno et al. | |
| 6,119,057 | A | 9/2000 | Kawagoe | |
| 6,142,252 | A | 11/2000 | Kinto et al. | |
| 6,327,741 | B1 | 12/2001 | Reed | |
| 6,338,013 | B1 | 1/2002 | Ruffner | |
| 6,389,329 | B1 | 5/2002 | Colens | |
| 6,459,955 | B1 | 10/2002 | Bartsch et al. | |
| 6,481,515 | B1 | 11/2002 | Kirkpatrick et al. | |
| 6,491,998 | B1 | 12/2002 | Heitz | |
| 6,532,404 | B2 | 3/2003 | Colens | |
| 6,580,246 | B2 | 6/2003 | Jacobs | |
| 6,594,844 | B2 | 7/2003 | Jones | |
| 6,600,981 | B2 | 7/2003 | Ruffner | |
| 6,690,134 | B1 | 2/2004 | Jones et al. | |
| 6,741,054 | B2 | 5/2004 | Koselka et al. | |
| 6,771,217 | B1 | 8/2004 | Liu et al. | |
| 6,779,217 | B2 | 8/2004 | Fisher | |
| 6,781,338 | B2 | 8/2004 | Jones et al. | |
| 6,809,490 | B2 | 10/2004 | Jones et al. | |
| 6,868,307 | B2 | 3/2005 | Song et al. | |
| 6,883,201 | B2 | 4/2005 | Jones et al. | |
| 6,901,624 | B2 | 6/2005 | Mori et al. | |
| 6,938,298 | B2 | 9/2005 | Aasen | |
| 6,965,209 | B2 | 11/2005 | Jones et al. | |
| 7,013,527 | B2 | 3/2006 | Thomas et al. | |
| 7,013,528 | B2 | 3/2006 | Parker et al. | |
| 7,015,831 | B2 | 3/2006 | Karlsson et al. | |
| 7,113,847 | B2 | 9/2006 | Chmura et al. | |
| 7,135,992 | B2 | 11/2006 | Karlsson et al. | |
| 7,137,169 | B2 | 11/2006 | Murphy et al. | |
| 7,145,478 | B2 | 12/2006 | Goncalves et al. | |
| 7,155,308 | B2 | 12/2006 | Jones et al. | |
| 7,162,338 | B2 | 1/2007 | Goncalves et al. | |
| 7,173,391 | B2 | 2/2007 | Jones et al. | |
| 7,177,737 | B2 | 2/2007 | Karlsson et al. | |
| 7,196,487 | B2 | 3/2007 | Jones et al. | |
| 7,248,951 | B2 | 7/2007 | Hulden | |
| 7,272,467 | B2 | 9/2007 | Goncalves et al. | |
| 7,288,912 | B2 | 10/2007 | Landry et al. | |
| 7,320,149 | B1 | 1/2008 | Huffman et al. | |
| 7,346,428 | B1 | 3/2008 | Huffman et al. | |
| 7,388,343 | B2 | 6/2008 | Jones et al. | |
| 7,389,156 | B2 | 6/2008 | Ziegler et al. | |
| 7,448,113 | B2 | 11/2008 | Jones et al. | |
| 7,480,958 | B2 | 1/2009 | Song et al. | |
| 7,539,557 | B2 | 5/2009 | Yamauchi | |
| 7,571,511 | B2 | 8/2009 | Jones et al. | |
| 7,620,476 | B2 | 11/2009 | Ziegler et al. | |
| 7,636,982 | B2 | 12/2009 | Jones et al. | |
| 7,761,954 | B2 | 7/2010 | Ziegler et al. | |
| 7,832,048 | B2 | 11/2010 | Harwig et al. | |
| 7,891,898 | B2 | 2/2011 | Hoadley et al. | |
| 8,387,193 | B2 | 3/2013 | Ziegler et al. | |
| 8,670,866 | B2 | 3/2014 | Ziegler et al. | |
| 8,692,695 | B2 | 4/2014 | Fallon et al. | |
| 8,739,355 | B2 | 6/2014 | Ziegler et al. | |
| 8,774,966 | B2 | 7/2014 | Ziegler et al. | |
| 8,782,848 | B2 | 7/2014 | Ziegler et al. | |
| 8,855,813 | B2 | 10/2014 | Ziegler et al. | |
| 8,892,251 | B1 | 11/2014 | Dooley et al. | |
| 8,931,971 | B2 | 1/2015 | Schwarz et al. | |
| 8,961,695 | B2 | 2/2015 | Romanov et al. | |
| 8,966,707 | B2 | 3/2015 | Ziegler et al. | |
| 9,220,388 | B2 | 12/2015 | Walz et al. | |
| 9,265,396 | B1 | 2/2016 | Lu et al. | |
| 9,320,409 | B1 * | 4/2016 | Lu | A47L 9/2815 |
| 9,565,984 | B2 | 2/2017 | Lu et al. | |
| 9,615,712 | B2 | 4/2017 | Dooley et al. | |
| 9,907,449 | B2 | 3/2018 | Lu et al. | |
| 10,064,533 | B2 * | 9/2018 | Lu | A47L 11/4066 |
| 10,499,783 | B2 | 12/2019 | Lu et al. | |
| 10,952,585 | B2 | 3/2021 | Lu et al. | |
| 11,324,376 | B2 | 5/2022 | Lu et al. | |
| 2002/0002751 | A1 | 1/2002 | Fisher | |
| 2002/0011813 | A1 | 1/2002 | Koselka et al. | |
| 2002/0016649 | A1 | 2/2002 | Jones | |
| 2002/0120364 | A1 | 8/2002 | Colens | |
| 2002/0175648 | A1 | 11/2002 | Erko et al. | |
| 2003/0025472 | A1 | 2/2003 | Jones et al. | |
| 2003/0028985 | A1 | 2/2003 | Prodoehl et al. | |
| 2003/0229421 | A1 | 12/2003 | Chmura et al. | |
| 2004/0020000 | A1 | 2/2004 | Jones | |
| 2004/0031113 | A1 | 2/2004 | Wosewick et al. | |
| 2004/0049877 | A1 | 3/2004 | Jones et al. | |
| 2004/0143930 | A1 | 7/2004 | Haegermarck | |
| 2004/0158357 | A1 | 8/2004 | Lee et al. | |
| 2004/0187457 | A1 | 9/2004 | Colens | |
| 2004/0207355 | A1 | 10/2004 | Jones et al. | |
| 2004/0244138 | A1 | 12/2004 | Taylor et al. | |
| 2005/0010331 | A1 | 1/2005 | Taylor et al. | |
| 2005/0028316 | A1 | 2/2005 | Thomas et al. | |
| 2005/0053912 | A1 | 3/2005 | Roth et al. | |
| 2005/0054257 | A1 | 3/2005 | Barnabas et al. | |
| 2005/0067994 | A1 | 3/2005 | Jones et al. | |
| 2005/0155631 | A1 | 7/2005 | Kilkenny et al. | |
| 2005/0186015 | A1 | 8/2005 | Sacks | |
| 2005/0204717 | A1 | 9/2005 | Colens | |
| 2005/0209736 | A1 | 9/2005 | Kawagoe | |
| 2005/0215459 | A1 | 9/2005 | Policicchio et al. | |
| 2005/0217061 | A1 | 10/2005 | Reindle | |
| 2005/0229340 | A1 | 10/2005 | Sawalski et al. | |
| 2005/0229344 | A1 | 10/2005 | Mittelstaedt et al. | |

(56) References Cited

U.S. PATENT DOCUMENTS

| | | | |
|---|---|---|---|
| 2005/0278888 A1 | 12/2005 | Reindle et al. | |
| 2006/0009879 A1 | 1/2006 | Lynch et al. | |
| 2006/0085095 A1 | 4/2006 | Reindle et al. | |
| 2006/0103523 A1 | 5/2006 | Field | |
| 2006/0123587 A1 | 6/2006 | Parr et al. | |
| 2006/0140703 A1* | 6/2006 | Sacks | A47L 13/22 401/139 |
| 2006/0185690 A1 | 8/2006 | Song et al. | |
| 2006/0190134 A1 | 8/2006 | Ziegler et al. | |
| 2006/0200281 A1 | 9/2006 | Ziegler et al. | |
| 2006/0207053 A1 | 9/2006 | Beynon | |
| 2006/0241812 A1 | 10/2006 | Jung | |
| 2006/0288519 A1 | 12/2006 | Jaworski et al. | |
| 2006/0293794 A1 | 12/2006 | Harwig et al. | |
| 2006/0293809 A1 | 12/2006 | Harwig et al. | |
| 2007/0016328 A1 | 1/2007 | Ziegler et al. | |
| 2007/0044821 A1 | 3/2007 | Bertram et al. | |
| 2007/0061040 A1 | 3/2007 | Augenbraun et al. | |
| 2007/0094836 A1 | 5/2007 | Sepke et al. | |
| 2007/0226943 A1 | 10/2007 | Lenkiewicz et al. | |
| 2007/0234492 A1 | 10/2007 | Svendsen et al. | |
| 2007/0266508 A1 | 11/2007 | Jones et al. | |
| 2007/0298697 A1 | 12/2007 | Charmoille et al. | |
| 2008/0039974 A1 | 2/2008 | Sandin et al. | |
| 2008/0096089 A1 | 4/2008 | Kim et al. | |
| 2008/0104783 A1 | 5/2008 | Crawford et al. | |
| 2008/0109126 A1 | 5/2008 | Sandin et al. | |
| 2008/0127446 A1 | 6/2008 | Ziegler et al. | |
| 2008/0140255 A1 | 6/2008 | Ziegler et al. | |
| 2008/0155768 A1 | 7/2008 | Ziegler et al. | |
| 2008/0188984 A1 | 8/2008 | Harwig et al. | |
| 2008/0244846 A1 | 10/2008 | Bayon et al. | |
| 2008/0307590 A1 | 12/2008 | Jones et al. | |
| 2009/0133720 A1 | 5/2009 | Van Den Bogert | |
| 2009/0281661 A1 | 11/2009 | Dooley et al. | |
| 2009/0306822 A1 | 12/2009 | Augenbraun et al. | |
| 2010/0049365 A1 | 2/2010 | Jones et al. | |
| 2010/0223748 A1 | 9/2010 | Lowe et al. | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2011/0077802 A1 | 3/2011 | Halloran et al. | |
| 2011/0160903 A1 | 6/2011 | Romanov et al. | |
| 2011/0162157 A1 | 7/2011 | Dooley et al. | |
| 2011/0202175 A1 | 8/2011 | Romanov et al. | |
| 2013/0247938 A1 | 9/2013 | Walz et al. | |
| 2014/0166047 A1 | 6/2014 | Hillen et al. | |
| 2014/0188325 A1 | 7/2014 | Johnson et al. | |
| 2014/0209122 A1 | 7/2014 | Jung et al. | |
| 2014/0245556 A1 | 9/2014 | Kaminer et al. | |
| 2014/0259511 A1 | 9/2014 | Ziegler et al. | |
| 2014/0289992 A1 | 10/2014 | Ziegler et al. | |
| 2015/0040332 A1 | 2/2015 | Dooley et al. | |
| 2015/0046016 A1 | 2/2015 | Dooley et al. | |
| 2015/0082562 A1 | 3/2015 | Kamada | |
| 2015/0128364 A1 | 5/2015 | Dooley et al. | |
| 2015/0128996 A1 | 5/2015 | Dooley et al. | |
| 2015/0143646 A1 | 5/2015 | Jeong et al. | |
| 2015/0182089 A1 | 7/2015 | Jeong et al. | |
| 2015/0335221 A1 | 11/2015 | Dooley et al. | |
| 2016/0270618 A1 | 9/2016 | Lu et al. | |
| 2016/0270619 A1 | 9/2016 | Lu et al. | |
| 2017/0100010 A1 | 4/2017 | Lu et al. | |
| 2017/0332857 A1 | 11/2017 | Nam et al. | |
| 2018/0064305 A1 | 3/2018 | Lu et al. | |
| 2019/0008352 A1 | 1/2019 | Lu et al. | |
| 2019/0248007 A1 | 8/2019 | Duffy et al. | |
| 2020/0060500 A1 | 2/2020 | Lu et al. | |
| 2022/0257080 A1 | 8/2022 | Lu et al. | |

FOREIGN PATENT DOCUMENTS

| | | |
|---|---|---|
| CN | 1721815 | 1/2006 |
| CN | 100411827 | 8/2008 |
| CN | 101297267 | 10/2008 |
| CN | 100589745 | 2/2010 |
| CN | 102083352 | 6/2011 |
| CN | 102984984 | 3/2013 |
| CN | 103167821 | 6/2013 |
| CN | 103799921 | 5/2014 |
| CN | 103853154 | 6/2014 |
| CN | 103961037 | 8/2014 |
| CN | 104363810 | 2/2015 |
| CN | 205181252 | 4/2016 |
| CN | 106805851 | 7/2019 |
| DE | 19545242 | 5/1997 |
| DE | 102005041133 | 1/2007 |
| DE | 102007050351 | 4/2009 |
| EP | 1625949 | 2/2006 |
| EP | 1909630 | 7/2014 |
| EP | 2762051 | 8/2014 |
| EP | 2888981 | 7/2015 |
| JP | S51-144963 | 12/1976 |
| JP | H 07-000328 | 1/1995 |
| JP | H 07-213479 | 8/1995 |
| JP | H 09-269966 | 10/1997 |
| JP | H10-155713 | 6/1998 |
| JP | 2001258806 | 9/2001 |
| JP | 2002017641 | 1/2002 |
| JP | 2002119451 | 4/2002 |
| JP | 2002302640 | 10/2002 |
| JP | 2003010088 | 1/2003 |
| JP | 2005304630 | 5/2004 |
| JP | 2004194984 | 7/2004 |
| JP | 2005137635 | 6/2005 |
| JP | 2005342259 | 12/2005 |
| JP | 2005346700 | 12/2005 |
| JP | 2006260161 | 9/2006 |
| JP | 2007520323 | 7/2007 |
| JP | 2008284052 | 11/2008 |
| JP | 2009506793 | 2/2009 |
| JP | 2009509220 | 3/2009 |
| JP | 2009099137 | 5/2009 |
| JP | 2009207790 | 9/2009 |
| JP | 2013236760 | 11/2013 |
| JP | 2014086878 | 5/2014 |
| JP | 2014113488 | 6/2014 |
| JP | 2014147693 | 8/2014 |
| JP | 2015128733 | 7/2015 |
| JP | 2016511670 | 4/2016 |
| JP | 2016520354 | 7/2016 |
| JP | 2016201096 | 12/2016 |
| JP | 2017038926 | 2/2017 |
| JP | 2017060884 | 3/2017 |
| JP | 2017080522 | 5/2017 |
| KR | 20110026414 | 3/2011 |
| KR | 1020140098619 | 8/2014 |
| WO | WO 2001082766 | 11/2001 |
| WO | WO 20010087266 | 11/2001 |
| WO | WO 20010091623 | 12/2001 |
| WO | WO 20010091624 | 12/2001 |
| WO | WO 20060089307 | 8/2006 |
| WO | WO 20060121805 | 11/2006 |
| WO | WO 2007028049 | 3/2007 |
| WO | WO 20150073429 | 5/2015 |

OTHER PUBLICATIONS

Anderson, "IMU Odometry," Jul. 27, 2006, [retrieved on Aug. 4, 2015], available at URL: http://www.geology.smu.edu/dpa-www/robo/Encoder/imu_odo/, 19 pages.

Dooley et al., U.S. Appl. No. 61/902,838, filed Nov. 12, 2013, titled "Cleaning Pad," 32 pages.

Dooley et al., U.S. Appl. No. 62/059,637, filed Oct. 3, 2014, titled "Surface Cleaning Pad," 72 pages.

European Search Report in European Application No. 18207860.0, dated Mar. 22, 2019, 4 pages.

European Search Report in European Application No. 19157686.7, dated Jul. 25, 2019, 4 pages.

European Search Report issued in European Application No. 15180917.5 on Jul. 26, 2016, 4 pages.

(56) References Cited

OTHER PUBLICATIONS

European Search Report issued in European Application No. 15195684.4 on Jul. 27, 2016, 4 pages.
European Search Report issued in European Application No. 16200763.7 on Apr. 21, 2017, 4 pages.
Extended European Search Report in European Application No. 21157190.6, dated Aug. 18, 2021, 4 pages.
International Preliminary Report in International Application No. PCT/US2015/061277, mailed Sep. 28, 2017, 8 pages.
International Preliminary Report on Patentability in International Application No. PCT/US2015/061866, mailed on Sep. 19, 2017, 6 pages.
International Search Report and Written Opinion in International Application No. PCT/US15/61866, mailed Feb. 2, 2015, 14 pages.
International Search Report and Written Opinion in International Application No. PCT/US2015/061277, mailed Mar. 4, 2016, 16 pages.
International Search Report and Written Opinion issued in International Application No. PCT/US2014/062096, dated Feb. 4, 2015, 17 pages.
Schur et al., "Robotics and Artificial Lifeforms: Stasis Logic," Feb. 5, 2007, [retrieved on Aug. 4, 2015], available at URL: http://www.schursastrophotography.com/robotics/stasislogic.html, 4 pages.

* cited by examiner

AUTONOMOUS FLOOR CLEANING WITH REMOVABLE PAD

CROSS-REFERENCE TO RELATED APPLICATION

This application is a continuation of and claims priority to U.S. application Ser. No. 16/117,416, filed Aug. 30, 2018, which is a continuation of and claims priority to U.S. application Ser. No. 15/383,008, now U.S. Pat. No. 10,064, 533, filed Dec. 19, 2016, which is a divisional of and claims priority to U.S. application Ser. No. 15/085,505, now U.S. Pat. No. 9,565,984, filed Mar. 30, 2016, which is a continuation of and claims priority to U.S. application Ser. No. 14/936,236, now U.S. Pat. No. 9,320,409, filed Nov. 9, 2015, which is a divisional of and claims priority to U.S. application Ser. No. 14/828,285, now U.S. Pat. No. 9,265, 396, filed Aug. 17, 2015, which is a continuation-in-part of and claims priority to U.S. application Ser. No. 14/658,820, now U.S. Pat. No. 9,907,449, filed on Mar. 16, 2015. The contents of the foregoing are incorporated herein by reference, in their entirety.

TECHNICAL FIELD

This disclosure relates to floor cleaning by an autonomous robot using a cleaning pad.

BACKGROUND

Tiled floors and countertops routinely need cleaning, some of which entails scrubbing to remove dried in soils. Various cleaning implements can be used for cleaning hard surfaces. Some implements include a cleaning pad that may be removably attached to the implement. The cleaning pads may be disposable or reusable. In some examples, the cleaning pads are designed to fit a specific implement or may be designed for more than one implement.

Traditionally, wet mops are used to remove dirt and other dirty smears (e.g., dirt, oil, food, sauces, coffee, coffee grounds) from the surface of a floor. A person dips the mop in a bucket of water and soap or a specialized floor cleaning solution and rubs the floor with the mop. In some examples, the person may have to perform back and forth scrubbing movements to clean a specific dirt area. The person then dips the mop in the same bucket of water to clean the mop and continues to scrub the floor. Additionally, the person may need to kneel on the floor to clean the floor, which could be cumbersome and exhausting, especially when the floor covers a large area.

Floor mops are used to scrub floors without the need for a person go on their knees. A pad attached to the mop or an autonomous robot can scrub and remove solids from surfaces and prevent a user from bending over to clean the surface.

SUMMARY

In some examples, an autonomous floor cleaning robot includes a robot body, a controller, a drive, a pad holder, and a pad sensor. The robot body defines a forward drive direction and supports the controller. The drive supports the robot body and is configured to maneuver the robot across a surface in response to commands from the controller. The pad holder is disposed on an underside of the robot body and is configured to retain a removable cleaning pad during operation of the cleaning robot. The pad sensor is arranged to sense a feature of a cleaning pad held by the pad holder and generate a corresponding signal. The controller is responsive to the signal generated by the pad sensor and is configured to control the robot according to a cleaning mode selected from a set of multiple robot cleaning modes as a function of the signal generated by the pad sensor.

In some examples, the pad sensors includes at least one of a radiation emitter and a radiation detector. The radiation detector may exhibit a peak spectral response in a visible light range. The feature may be a colored ink disposed on a surface of the cleaning pad, the pad sensor senses a spectral response of the feature, and the signal corresponds to the sensed spectral response.

In some cases, the signal includes the sensed spectral response, and the controller compares the sensed spectral response to a stored spectral response in an index of colored inks stored on a memory storage element operable with the controller. The pad sensor may include a radiation detector having first and second channels responsive to radiation, the first channel and the second channel each sensing a portion of the spectral response of the feature. The first channel may exhibit a peak spectral response in a visible light range. The pad sensor may include a third channel that senses another portion of the spectral response of the feature. The first channel may exhibit a peak spectral response in an infrared range. The pad sensor may include a radiation emitter configured to emit a first radiation and a second radiation, and the pad sensor may sense a reflection of the first and the second radiations off of the feature to sense the spectral response of the feature. The radiation emitter may be configured to emit a third radiation, and the pad sensor may sense the reflection of the third radiation off of the feature to sense the spectral response of the feature.

In some implementations, the feature includes identification elements each having a first region and a second region. The pad sensor may be arranged to independently sense a first reflectivity of the first region and a second reflectivity of the second region. The pad sensor may include a first radiation emitter arranged to illuminate the first region, a second radiation emitter arranged to illuminate the second region, and a photodetector arranged to receive reflected radiation from both the first region and the second region. The first reflectivity may be substantially greater than the second reflectivity.

In some examples, the multiple robot cleaning modes each define a spraying schedule and navigational behavior.

In some examples, a floor cleaning robot cleaning pad includes a pad body and a mounting plate. The pad body has opposite broad surfaces, including a cleaning surface and a mounting surface. The mounting plate is secured across the mounting surface of the pad body and has opposite edges defining mounting locator notches. The cleaning pad is of one of a set of available cleaning pad types having different cleaning properties. The mounting plate has a feature unique to the type of the cleaning pad and that is positioned to be sensed by a feature sensor of a robot to which the pad is mounted.

In some examples, the feature is a first feature, and the mounting plate has a second feature rotationally symmetric to the first feature. The feature may have a spectral response attribute unique to the type of the cleaning pad. The feature may have a reflectivity unique to the type of the cleaning pad. The feature may have has a radiofrequency characteristic unique to the type of the cleaning pad. The feature may include a readable barcode unique to the type of the cleaning pad. The feature may include an image with an orientation unique to the type of the cleaning pad. The feature may have a color unique to the type of the cleaning pad. The feature may include identification elements having first and second portions, the first portion having a first reflectivity and the second portion having a second reflectivity, the first reflectivity being greater than the second reflectivity. The feature may include a radiofrequency identification tag unique to the cleaning pad. The feature may include cutouts defined by the mounting plate, where a distance between the cutouts is unique to the type of the cleaning pad.

In some examples, in a set of autonomous robot cleaning pads of different types, each of the cleaning pads includes a pad body and a mounting plate. The pad body has opposite broad surfaces, including a cleaning surface and a mounting surface. The mounting plate is secured across the mounting surface of the pad body and has opposite edges defining mounting locator features. The mounting plate of each cleaning pad has a pad type identification feature unique to the type of the cleaning pad and that is positioned to be sensed by a robot to which the pad is mounted.

In some cases, the feature is a first feature, and the mounting plate has a second feature rotationally symmetric to the first feature. The feature may have a spectral response attribute unique to the type of the cleaning pad. The feature may have a reflectivity unique to the type of the cleaning pad. The feature may have has a radiofrequency characteristic unique to the type of the cleaning pad. The feature may include a readable barcode unique to the type of the cleaning pad. The feature may include an image with an orientation unique to the type of the cleaning pad. The feature may have a color unique to the type of the cleaning pad. The feature may include identification elements having first and second portions, the first portion having a first reflectivity and the second portion having a second reflectivity, the first reflectivity being greater than the second reflectivity for a first cleaning pad of the set, and the second reflectivity being greater than the first reflectivity for a second cleaning pad of the set. The feature may include a radiofrequency identification tag unique to the cleaning pad. The feature may include cutouts defined by the mounting plate, where a distance between the cutouts is unique to the type of the cleaning pad.

In some examples, a method of cleaning a floor includes attaching a cleaning pad to an underside surface of an autonomous floor cleaning robot, placing the robot on a floor to be cleaned, and initiating a floor cleaning operation. In the floor cleaning operation, the robot senses the attached cleaning pad and identifies a type of the pad from among a set of multiple pad types and then autonomously cleans the floor in a cleaning mode selected according to the identified pad type.

In some cases, the cleaning pad includes an identification mark. The identification mark may include a colored ink. The robot may sense the attached cleaning pad by sensing the identification mark of the cleaning pad. Sensing the identification mark of the cleaning pad may include sensing a spectral response of the identification mark.

In other implementations, the method further includes ejecting the cleaning pad from the underside surface of the autonomous floor cleaning robot.

In some examples, an autonomous floor cleaning robot includes a robot body, a controller supported by the robot body, and a drive supporting the robot body to maneuver the robot across a floor surface in response to commands from the controller. The robot also includes a pad holder attached to an underside of the robot body and to hold a removable cleaning pad during operation of the cleaning robot. The removable cleaning pad includes a mounting plate and a mounting surface. The mounting plate is attached to the mounting surface. The robot also includes a pad sensor to sense a feature on the removable cleaning pad and to generate a signal based on the feature. The feature is defined at least in part by a cutout on the card backing. The mounting plate enables the pad sensor to detect the feature, and the controller is responsive to the signal generated by the pad sensor to perform operations. The operations include selecting a cleaning mode from among cleaning modes based on the signal, and controlling the robot according to a selected cleaning mode.

In some examples, the mounting surface can include a wrap layer wrapped around absorptive layers that absorb fluid on the floor surface. The feature can be further defined by a marking on the wrap layer. The marking can occupy an area greater than an area of the cutout. The cutout can enable the pad sensor to detect the marking.

In some examples, the feature can include identification elements defined at least in part by the marking and the cutout. Each identification element can have a first region and a second region. The pad sensor can be arranged to independently sense a first reflectivity of the first region and a second reflectivity of the second region.

In some examples, at least one of the first and second reflectivities can be defined by a reflectivity of the card backing. At least one of the first and second reflectivities can be defined by a reflectivity of the marking.

In some examples, the identification elements can define a perimeter, and the marking can occupy an area that extends beyond the perimeter.

In some examples, the pad sensor can include a first radiation emitter to illuminate the first region, a second radiation emitter to illuminate the second region, and a photodetector to receive reflected radiation from both the first region and the second region and to generate the signal based on the reflected radiation.

In some examples, the controller can be configured to select the cleaning mode by performing operations. The operations can include determining a state of each of the identification elements based on the first reflectivity and the second reflectivity, determining a state of the feature based on the state of each of the identification elements, comparing the state of the feature to an index of states stored in a memory, and selecting the cleaning mode from among the cleaning modes based on the comparing.

In some examples, the state of each of the identification elements can be based on a detectability of the marking on the wrap layer.

In some examples, the first reflectivity can be substantially greater than the second reflectivity.

In some examples, the marking can include a colored ink. The pad sensor can be for sensing a spectral response of the marking. The signal can correspond to the sensed spectral response.

In some examples, the pad sensor can include a radiation detector having first and second channels responsive to radiation. The first channel and the second channel each can sense a portion of the spectral response of the marking.

In some examples, the first channel can exhibit a peak spectral response in a visible light range.

In some examples, the pad sensor can include a radiation emitter configured to emit a first radiation and a second radiation. The pad sensor can include a reflection of the first and the second radiations off of the marking to sense the spectral response of the marking.

In some examples, the cleaning modes can each define a spraying schedule and navigational behavior.

In some examples, in a set of autonomous robot cleaning pads of different types, each of the cleaning pads includes a pad body having opposite broad surfaces, including a cleaning surface and a mounting surface. Each of the cleaning pads further includes a pad type identification feature indicative of a type of a cleaning pad and a mounting plate secured across the mounting surface of the pad body. The mounting plate includes a cutout that defines at least in part the pad type identification feature. The mounting plate enables a pad sensor of the robot to detect the pad type identification feature.

In some examples, the mounting surface can include a wrap layer wrapped around absorptive layers that absorb fluid on the floor surface. The pad type identification feature can be further defined by a marking on the wrap layer. The marking can occupy an area greater than an area of the cutout. The cutout can enable the pad sensor to detect the marking.

In some examples, the feature can include identification elements defined at least in part by the marking and the cutout. Each identification element can have a first region and a second region. The pad sensor can be arranged to independently sense a first reflectivity of the first region and a second reflectivity of the second region.

In some examples, at least one of the first and second reflectivities can be defined by a reflectivity of the card backing. At least one of the first and second reflectivities can be defined by a reflectivity of the marking.

In some examples, the identification elements can define a perimeter, and the marking can occupy an area that extends beyond the perimeter.

In some examples, the marking can include a colored ink. The pad sensor can be for sensing a spectral response of the marking.

The implementations described in this disclosure include the following features. The cleaning pad includes an identification mark with characteristics that allows the cleaning pad to be distinguished from other cleaning pads having an identifying mark with different characteristics. The robot includes sensing hardware to sense the identification mark to determine the type of the cleaning pad, and the controller of the robot can implement a sensing algorithm that judges the type of the cleaning pad based on what the sensing hardware detects. The robot selects a cleaning mode, which includes, for example, navigational behavior and spraying schedule information that the robot uses to clean the room. As a result, a user simply attaches the cleaning pad to the robot, and the robot can then select the cleaning mode. In some cases, the robot can fail to detect the identification mark and determine an error has occurred.

The implementations further derive the following advantages from the above described features and other features described in this disclosure. For example, use of the robot requires a reduced number of user interventions. The robot can better operate in an autonomous manner because the robot can autonomously make decisions regarding cleaning modes without user input. Additionally, fewer user errors can occur because the user does not need to manually select a cleaning mode. The robot can also identify errors that the user may not notice, such as undesirable movement of the cleaning pad relative to the robot. The user does not need to visually identify the type of the cleaning pad by, for example, carefully examining the material or the fibers of the cleaning pad. The robot can simply detect the unique identification mark. The robot can also quickly initiate cleaning operations by sensing the type of the cleaning pad used.

The details of one or more implementations are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Described in more detail below is an autonomous mobile cleaning robot that can clean a floor surface of a room by navigating about the room while scrubbing the floor surface. The robot can spray a cleaning fluid onto the floor surface and use a cleaning pad attached to the bottom of the robot to scrub the floor surface. The cleaning fluid can, for example, dissolve and suspend debris on the floor surface. The robot can automatically select a cleaning mode based on the cleaning pad attached to the robot. The cleaning mode can include, for example, an amount of the cleaning fluid distributed by the robot and/or a cleaning pattern. In some cases, the cleaning pad can clean the floor surface without the use of cleaning fluid, so the robot does not need to spray cleaning fluid onto the floor surface as part of the selected cleaning mode. In other cases, the amount of cleaning fluid used to clean the surface can vary based on the type of pad identified by the robot. Some cleaning pads may require a larger amount of cleaning fluid to improve scrubbing performance, and other cleaning pads may require a relatively smaller amount of cleaning fluid. The cleaning mode may include a selection of navigational behavior that cause the robot to employ certain movement patterns. For example, if the robot sprays cleaning fluid onto the floor as part of the cleaning mode, the robot can follow movement patterns that encourage a back-and-forth scrubbing motion to sufficiently spread and absorb the cleaning fluid, which may contain suspended debris. The navigational and spraying characteristics of the cleaning modes can widely vary from one type of cleaning pad to another type of cleaning pad. The robot can select these characteristics upon detecting the type of the cleaning pad attached to the robot. As will be described in detail below, the robot automatically detects identifying features of the cleaning pad to identify the type of the cleaning pad attached and selects a cleaning mode according to the identified type of the cleaning pad.

Overall Robot Structure

Figure 1A:
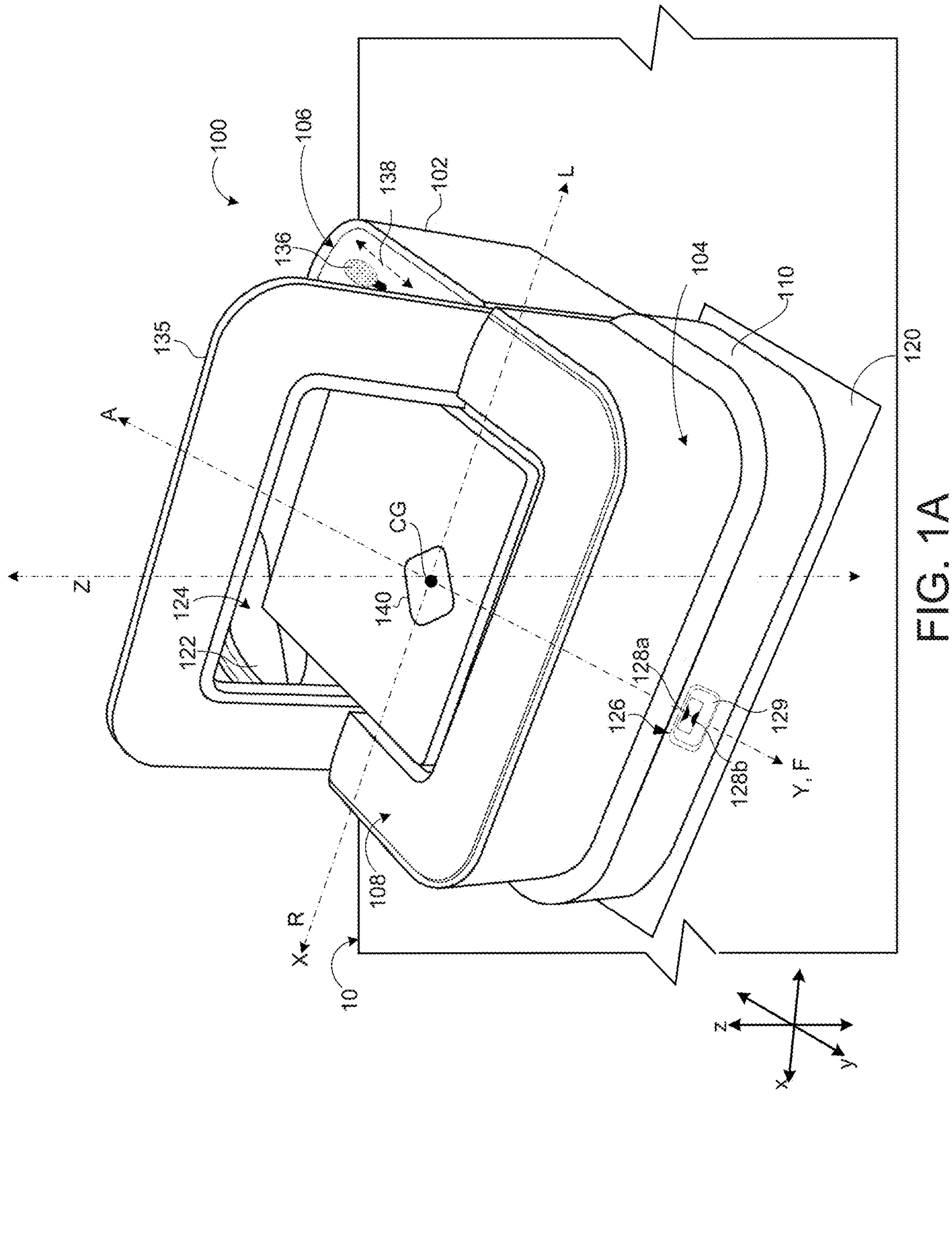
FIG. 1A is a perspective view of an autonomous mobile robot for cleaning using an exemplary cleaning pad.

Referring to FIG. 1A, in some implementations, an autonomous mobile robot 100, weighing less than 5 lbs (e.g., less than 2.26 kg) and having a center of gravity CG, navigates and cleans a floor surface 10. The robot 100 includes a body 102 supported by a drive (not shown) that can maneuver the robot 100 across the floor surface 10 based on, for example, a drive command having x, y, and 0 components. As shown, the robot body 102 has a square shape. In other implementations, the body 102 can have other shapes, such as a circular shape, an oval shape, a tear drop shape, a rectangular shape, a combination of a square or rectangular front and a circular back, or a longitudinally asymmetrical combination of any of these shapes. The robot body 102 has a forward portion 104 and a rearward (toward the aft) portion 106. The body 102 also includes a bottom portion (not shown) and a top portion 108.

Along the bottom portion of the robot body 102, one or more rear cliff sensors (not shown) located in one or both of the two rear corners of the robot 100 and one or more forward cliff sensors (not shown) located in one or both of the front corners of the mobile robot 100 detect ledges or other steep elevation changes of the floor surface 10 and prevents the robot 100 from falling over such floor edges. The cliff sensors may be mechanical drop sensors or light-based proximity sensors, such as an IR (infrared) pair, a dual emitter, single receiver or dual receiver, single emitter IR light based proximity sensor aimed downward at a floor surface 10. In some examples, the cliff sensors are placed at an angle relative to the corners of the robot body 102, such that they cut the corners, spanning between sidewalls of the robot 100 and covering the corner as closely as possible to detect flooring height changes beyond a height threshold. Placing the cliff sensors proximate the corners of the robot 100 ensures that they will trigger immediately when the robot 100 overhangs a flooring drop and prevent the robot wheels from advancing over the drop edge.

Figure 1B:
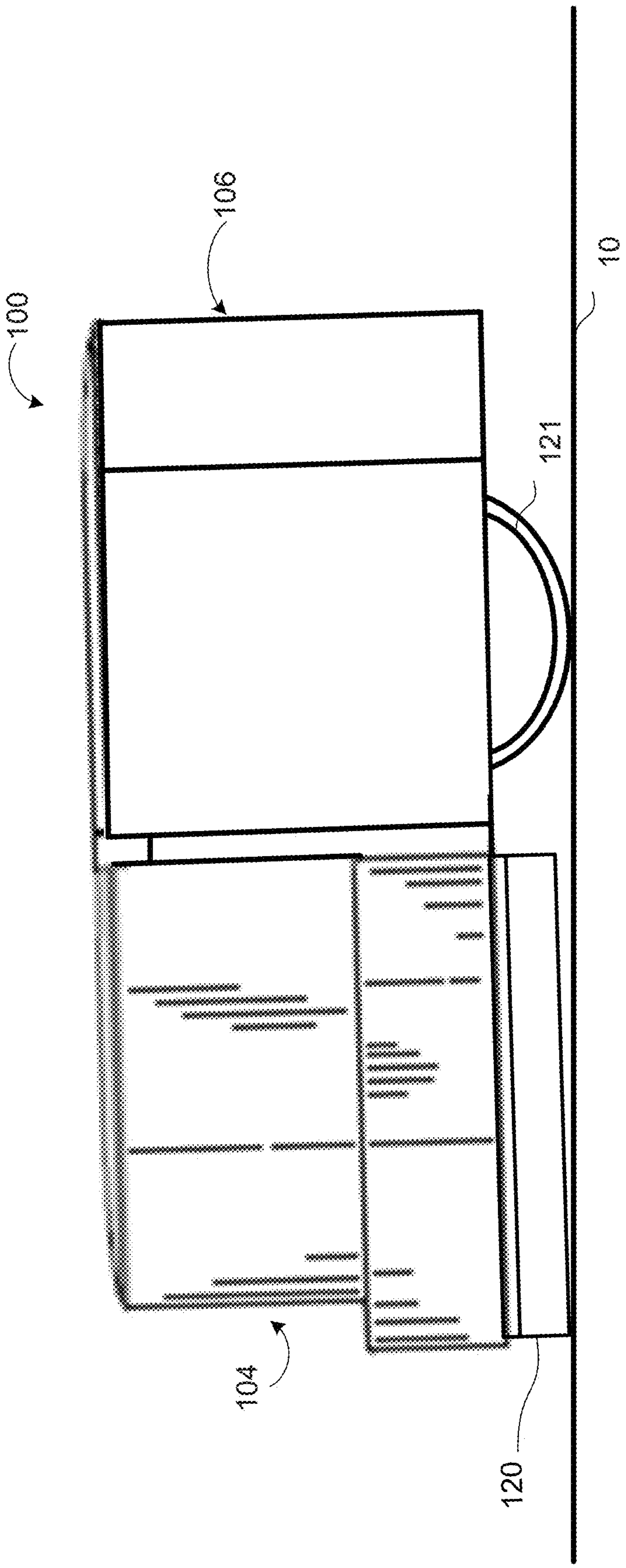
FIG. 1B is a side view of the autonomous mobile robot of FIG. 1A.

The forward portion 104 of the body 102 carries a movable bumper 110 for detecting collisions in longitudinal (A, F) or lateral (L, R) directions. The bumper 110 has a shape complementing the robot body 102 and extends forward the robot body 102 making the overall dimension of the forward portion 104 wider than the rearward portion 106 of the robot body 102. The bottom portion of the robot body 102 carries an attached cleaning pad 120. Referring briefly to FIG. 1B, the bottom portion of the robot body 102 includes wheels 121 that rotatably support the rearward portion 106 of the robot body 102 as the robot 100 navigates about the floor surface 10. The cleaning pad 120 supports the forward portion 104 of the robot body 102 as the robot 100 navigations about the floor surface 10. In one implementation, the cleaning pad 120 extends beyond the width of the bumper 110 such that the robot 100 can position an outer edge of the pad 120 up to and along tough-to-reach surfaces or into crevices, such as at a wall-floor interface. In another implementation, the cleaning pad 120 extends up to the edges and does not extend beyond a pad holder (not shown) of the robot. In such examples, the pad 120 can be bluntly cut on the ends and absorbent on the side surfaces. The robot 100 can push the edge of the pad 120 against wall surfaces. The position of the cleaning pad 120 further allows the cleaning pad 120 to clean the surfaces or crevices of a wall by the extended edge of the cleaning pad 120 while the robot 100 moves in a wall following motion. The extension of the cleaning pad 120 thus enables the robot 100 to clean in cracks and crevices beyond the reach of the robot body 102.

A reservoir 122 within the robot body 102 holds a cleaning fluid 124 (e.g., cleaning solution, water, and/or detergent) and can hold, for example, 170-230 mL of the cleaning fluid 124. In one example, the reservoir 122 has a capacity of 200 mL of fluid. The robot 100 has a fluid applicator 126 connected to the reservoir 122 by a tube within the robot body 102. The fluid applicator 126 can be a sprayer or spraying mechanism, having a top nozzle **128*a* and a bottom nozzle 128*b*. The top nozzle 128*a* and the bottom nozzle 128*b* are vertically stacked in a recess 129 in the fluid applicator 126 and angled from a horizontal plane parallel to the floor surface 10. The nozzles 128*a*-128*b* are spaced apart from one another such that the top nozzle 128*a* sprays relatively longer lengths of fluid forward and downward to cover an area of the floor surface 10 in front of the robot 100, and the other nozzle 128*b* sprays relatively shorter lengths fluid forward and downward to leave a rearward supply of applied fluid on an area of the floor surface 10 in front of, but closer to, the robot 100 than the area of applied fluid dispensed by the top nozzle 128*a*. In some cases, the nozzles 128, 128*b* complete each spray cycle by sucking in a small volume of fluid at the opening of the nozzle so that the cleaning fluid 124 does not leak or dribble from the nozzles 128*a*, 128*b*** following each instance of spraying.

In other examples of the fluid applicator 126, multiple nozzles are configured to spray fluid in different directions. The fluid applicator may apply fluid downward through a bottom portion of the bumper 110 rather than outward, dripping or spraying the cleaning fluid directly in front of the robot 100. In some examples, the fluid applicator is a microfiber cloth or strip, a fluid dispersion brush, or a sprayer. In other cases, the robot 100 includes a single nozzle.

The cleaning pad 120 and robot 100 are sized and shaped such that the process of transferring the cleaning fluid from the reservoir 122 to the absorptive cleaning pad 120 maintains the forward and aft balance of the robot 100 during dynamic motion. The fluid is distributed so that the robot 100 continually propels the cleaning pad 120 over a floor surface 10 without the increasingly saturated cleaning pad 120 and decreasingly occupied fluid reservoir 122 lifting the rearward portion 106 of the robot 100 and pitching the forward portion 104 of the robot 100 downward, which can apply movement-prohibitive downward force to the robot 100. Thus, the robot 100 is able to move the cleaning pad 120 across the floor surface 10 even when the cleaning pad 120 is fully saturated with fluid and the reservoir is empty. The robot 100 can track the amount of floor surface 10 travelled and/or the amount of fluid remaining in the reservoir 122, and provide an audible and/or visible alert to a user to replace the cleaning pad 120 and/or to refill the reservoir 122. In some implementations, the robot 100 stops moving and remains in place on the floor surface 10 if the cleaning pad 120 is fully saturated or otherwise needs to be replaced, if there remains floor to be cleaned.

The top portion 108 of the robot 100 includes a handle 135 for a user to carry the robot 100. The handle 135 is shown in FIG. 1A extended for carrying. When folded, the handle 135 nests in a recess in the top portion 108 of the robot 100. The top portion 108 also includes a toggle button 136 disposed beneath the handle 135 that activates a pad release mechanism, which will be described in more detail below. Arrow 138 indicates the direction of the toggle motion. As will be described in more detail below, toggling the toggle button 136 actuates the pad release mechanism to release the cleaning pad 120 from a pad holder of the robot 100. The user can also press a clean button 140 to turn on the robot 100 and to instruct the robot 100 to begin a cleaning operation. The clean button 140 can be used for other robot operations as well, such as turning off the robot 100.

Other details of the overall structure of robot 100 can be found in U.S. patent application Ser. No. 14/077,296 entitled "Autonomous Surface Cleaning Robot" filed Nov. 12, 2013, U.S. Provisional Patent Application Ser. No. 61/902,838 entitled "Cleaning Pad" filed Nov. 12, 2013, and U.S. Provisional Patent Application Ser. No. 62/059,637 entitled "Surface Cleaning Pad" filed Oct. 3, 2014, the entire contents of each of which are incorporated herein by reference.

Cleaning Pad Structure

Figure 2C:
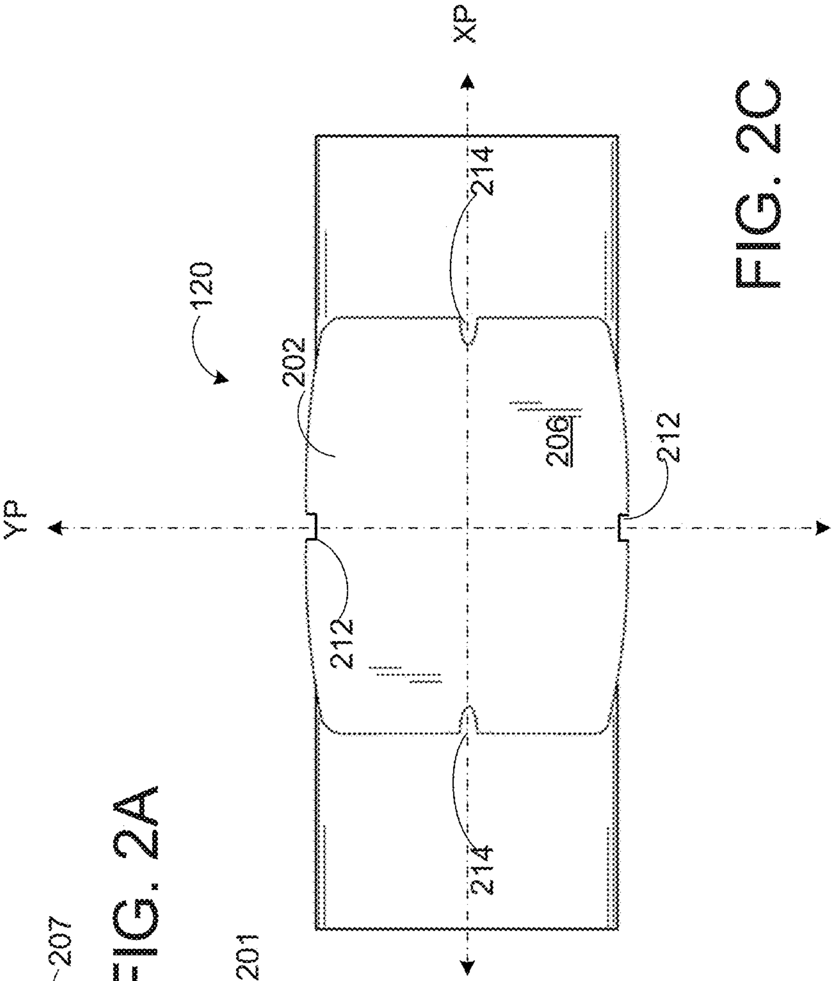
FIG. 2C is a top view of the exemplary cleaning pad of FIG. 2A.
Figure 2A:
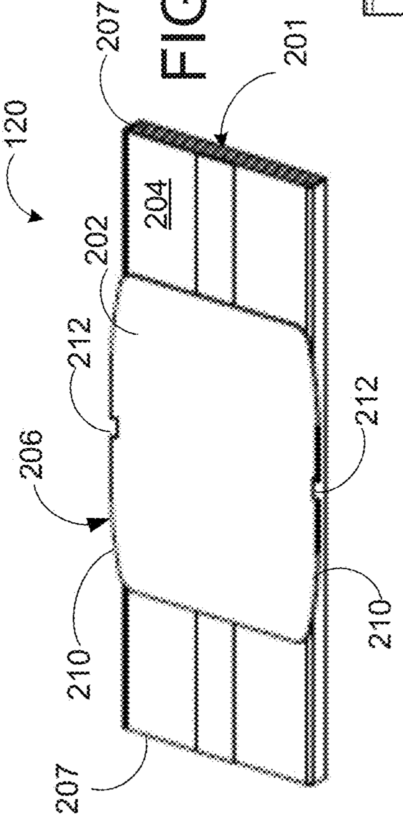
FIG. 2A is a perspective view of the exemplary cleaning pad of FIG. 1A.

Referring to FIG. 2A, the cleaning pad 120 includes absorptive layers 201, an outer wrap layer 204, and a card backing 206. Together, the absorptive layers 201 and the wrap layer 204 form a pad body of the cleaning pad 120 that absorbs fluid from a floor surface and supports the card backing 206. The pad 120 has bluntly cut ends such that the absorptive layers 201 are exposed at both ends of the pad 120. Instead of the wrap layer 204 being sealed at ends 207 of the pad 120 and compressing the ends 207 of the absorptive layers 201, the full length of the pad 120 is available for fluid absorption and cleaning. No portion of the absorptive layers 201 is compressed by the wrap layer 204 and therefore unable to absorb the cleaning fluid. Additionally, at the end of a cleaning operation, the absorptive layers 201 of the cleaning pad 120 prevent the cleaning pad 120 from becoming soaking wet and prevent the ends 207 from deflecting at the completion of a cleaning run due to excess weight of the absorbed cleaning fluid. The absorbed cleaning fluid is securely held by the absorptive layers 201 so that the cleaning fluid does not drip from the cleaning pad 120.

Figure 2B:
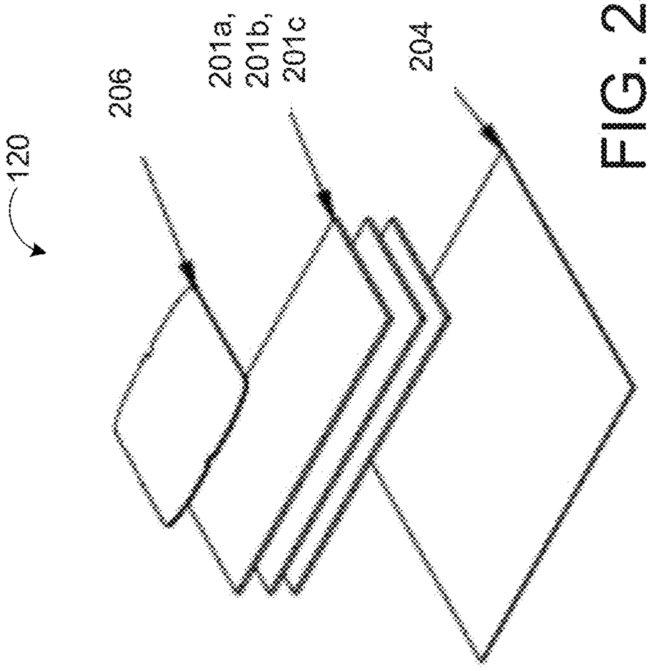
FIG. 2B is an exploded perspective view of the exemplary cleaning pad of FIG. 2A.

Referring also to FIG. 2B, the absorptive layers 201 include first, second and third layers 201*a*, 201*b*, and 201*c*, but additional or fewer layers are possible. In some implementations, the absorptive layers 201*a*-201*c* can be bonded to one another or fastened to one another.

The wrap layer 204 is a non-woven, porous material that wraps around the absorptive layers 201. The wrap layer 204 can include a spunlace layer and an abrasive layer. The abrasive layer can be disposed on the outer surface of the wrap layer. The spunlace layer can be formed by a process, also known as hydroentangling, water entangling, jet entangling or hydraulic needling in which a web of loose fibers is entangled to form a sheet structure by subjecting the fibers to multiple passes of fine, high-pressure water jets. The hydroentangling process can entangle fibrous materials into composite non-woven webs. These materials offer performance advantages needed for many wipe applications due to their improved performance or cost structure.

The wrap layer 204 wraps around the absorptive layers 201 and prevents the absorptive layers 201 from directly contacting the floor surface 10. The wrap layer 204 can be a flexible material having natural or artificial fibers (e.g., spunlace or spunbond). Fluid applied to a floor 10 beneath the cleaning pad 120 transfers through the wrap layer 204 and into the absorptive layers 201. The wrap layer 204 wrapped around the absorptive layers 201 is a transfer layer that prevents exposure of raw absorbent material in the absorptive layers 201.

If the wrap layer 204 of the cleaning pad 120 is too absorbent, the cleaning pad 120 may generate excessive resistance to motion across the floor 10 and may be difficult to move. If the resistance is too great, a robot, for example, may be unable to overcome such resistance while trying to move the cleaning pad 120 across the floor surface 10. Referring back to FIG. 2A, the wrap layer 204 picks up dirt and debris loosened by the abrasive outer layer and can leave a thin sheen of the cleaning fluid 124 on the floor surface 10 that air dries without leaving streak marks on the floor 10. The thin sheen of cleaning solution may be, for example, between 1.5 and 3.5 ml/square meter and preferably dries within a reasonable amount of time (e.g., 2 minutes to 10 minutes).

Preferably, the cleaning pad 120 does not significantly swell or expand upon absorbing the cleaning fluid 124 and provides a minimal increase in total pad thickness. This characteristic of the cleaning pad 120 prevents the robot 100 from tilting backwards or pitching up if the cleaning pad 120 expands. The cleaning pad 120 is sufficiently rigid to support the weight of the front of the robot. In one example, the cleaning pad 120 can absorb up to 180 ml or 90% of the total fluid contained in the reservoir 122. In another example the cleaning pad 120 holds about 55 to 60 ml of the cleaning fluid 124 and a fully saturated outer wrap layer 204 holds about 6 to about 8 ml of the cleaning fluid 124.

The wrap layer 204 of some pads can be constructed to absorb fluid. In some cases, the wrap layer 204 is smooth, such as to prevent scratching delicate floor surfaces. The cleaning pad 120 can include one or more of the following cleaning agent constituents: butoxypropanol, alkyl polyglycoside, dialkyl dimethyl ammonium chloride, polyoxyethylene castor oil, linear alkylbenzene sulfonate, glycolic acid—which serve as surfactants, and to attack scale and mineral deposits, among other things. Various pads may also include scent, antibacterial or antifungal preservatives.

Referring to FIGS. 2A to 2C, the cleaning pad 120 includes the cardboard backing layer or card backing 206 adhered to the top surface (e.g., the wrap layer 204) of the cleaning pad 120. As will be described below in detail, when the card backing 206 (and thus the cleaning pad 120) is loaded onto the robot 100, a mounting surface 202 of the card backing 206 faces the robot 100. The robot 100 can identify the type of cleaning pad 120 loaded by sensing features on the card backing 206 or the mounting surface 202. While the card backing 206 has been described as cardboard material, in other implementations, the material of the card backing can be any stiff material that holds the cleaning pad in place such that the cleaning pad does not translate significantly during robot motion. In some cases, the cleaning pad can be a rigid plastic material that can be washable and reusable, such as polycarbonate.

The card backing 206 protrudes beyond the longitudinal edges of the cleaning pad 120 and protruding longitudinal edges 210 of the card backing 206 attach to the pad holder (which will be described below with respect to FIGS. 3A-3D) of the robot 100. The card backing 206 can be between 0.02 and 0.03 inch thick (e.g., between 0.5 mm and 0.8 mm), between 68 and 72 mm wide and between 90 and 94 mm long. In one implementation, the card backing 206 is 0.026 inch thick (e.g., 0.66 mm), 70 mm wide and 92 mm long. The card backing 206 is coated on both sides with a water resistant coating, such as wax or polymer or a combination of water resistant materials, such as wax/polyvinyl alcohol, polyamine, to help prevent the card backing 206 from disintegrating when wetted.

The card backing 206 defines cutouts 212 centered along the protruding longitudinal edges 210 of the card backing 206. The card backing also includes a second set of cutouts 214 on the lateral edges of the card backing 206. The cutouts 212, 214 are symmetrically centered along the longitudinal center axis YP of the pad 120 and lateral center axis XP of the pad 120.

In some cases, the cleaning pad 120 is disposable. In other cases, the cleaning pad 120 is a reusable microfiber cloth pad with a durable plastic backing. The cloth pad can be washable, and machine dried without melting or degrading the backing. In another example, the washable microfiber cloth pad includes an attachment mechanism to secure the cleaning pad to a plastic backing allowing the backing to be removed before washing. One exemplary attachment mechanism can include Velcro or other hook-and-loop attachment mechanism devices attached to both the cleaning pad and the plastic backing. Another cleaning pad 120 is intended for use as a disposable dry cloth and includes a single layer of needle punched spunbond or spunlace material having exposed fibers for entrapping hair. The cleaning pad 120 can include a chemical treatment that adds a tackiness characteristic for retaining dirt and debris.

For an identified type of cleaning pad 120, the robot 100 selects a corresponding navigation behavior and a spraying schedule. The cleaning pad 120 can be identified, for example, as one of the following:

- A wet mopping cleaning pad that can be scented and pre-soaped.
- A damp mopping cleaning pad that can be scented, pre-soaped, and requires less cleaning fluid than the wet mopping cleaning pad.
- A dry dusting cleaning pad that can be scented, infiltrated with mineral oil, and does not require any cleaning fluid.
- A washable cleaning pad that can be re-used and can clean a floor surface using water, cleaning solution, scented solution, or other cleaning fluids.

In some examples, the wet mopping cleaning pad, the damp mopping cleaning pad, and the dry dusting cleaning pad are single-use disposable cleaning pads. The wet mopping cleaning pad and the damp mopping cleaning pad can be pre-moistened or pre-wet such that a pad, upon removal from its packaging, contains water or other cleaning fluid. The dry dusting cleaning pad can be separately infiltrated with the mineral oil. The navigational behaviors and spraying schedules that can be associated with each type of cleaning pad will be described in more detail later with respect to FIGS. 4A-4E and TABLES 1-3.

Cleaning Pad Holding and Attachment Mechanism

Figure 3A:
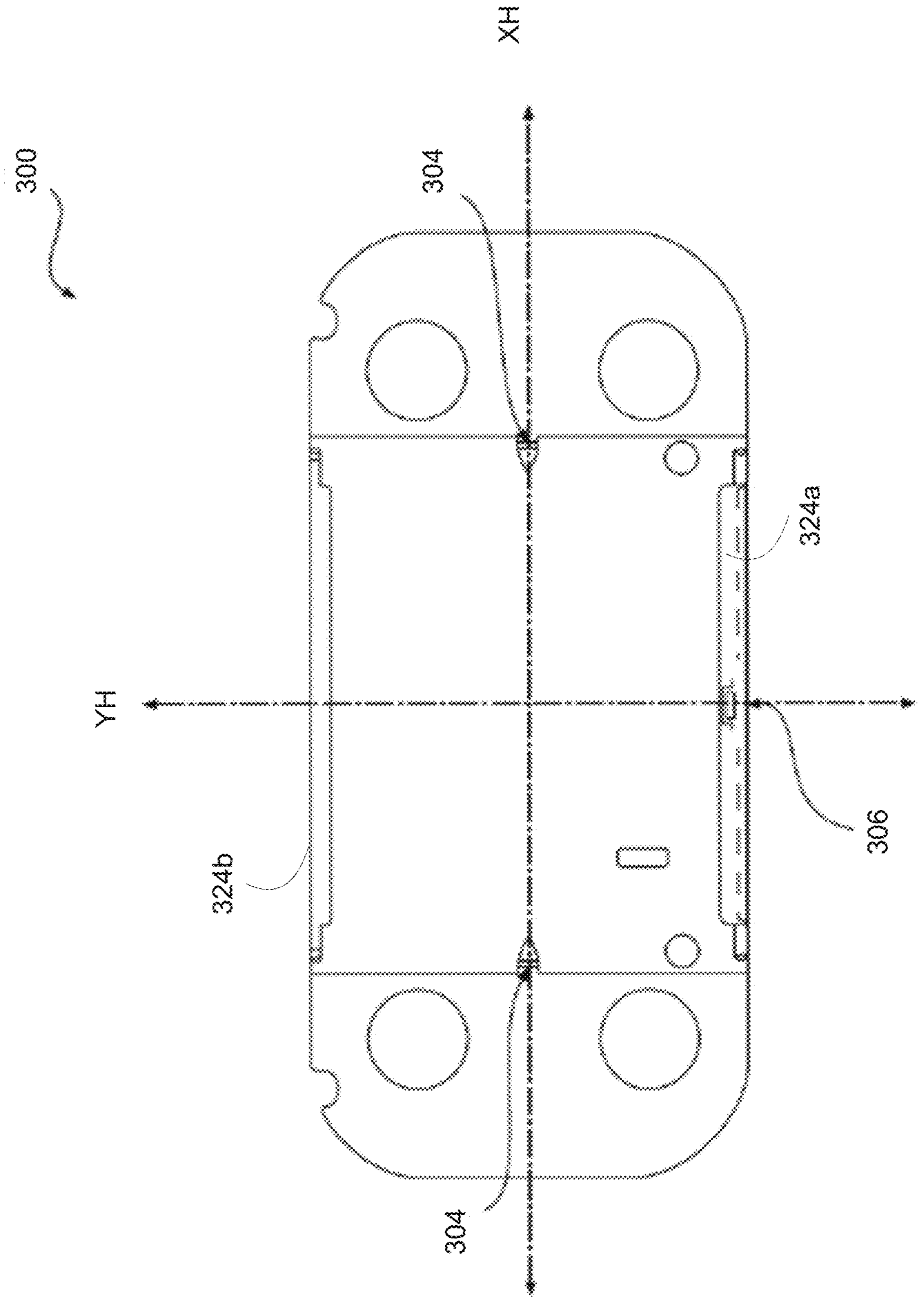
FIG. 3A is a bottom view of an exemplary attachment mechanism for the pad.

Now also referring to FIGS. 3A-3D, the cleaning pad 120 is secured to the robot 100 by a pad holder 300. The pad holder 300 includes protrusions 304 centered relative to the longitudinal center axis YH on the underside of the pad holder 300 and located along the lateral center axis XH on the underside of the pad holder 300. The pad holder 300 also includes a protrusion 306 located along a longitudinal center axis YH on the underside of the pad holder 300 and centered relative to a lateral center axis XH on the underside of the pad holder 300. In FIG. 3A, the raised protrusion 306 on the longitudinal edge of the pad holder 300 is obscured by a retention clip 324*a*, which is shown in phantom view so that the raised protrusion 306 is visible.

The cutouts 214 of the cleaning pad 120 engage with the corresponding protrusions 304 of the pad holder 300, and the cutouts 212 of the cleaning pad 120 engage with the corresponding protrusion 306 of the pad holder 300. The protrusions 304, 306 align the cleaning pad 120 to the pad holder 300 and retain the cleaning pad 120 relatively stationary to the pad holder 300 by preventing lateral and/or transverse slippage. The configuration of the cutouts 212, 214 and the protrusions 304, 306 allow the cleaning pad 120 to be installed into the pad holder 300 from either of two identical directions (180 degrees opposite to one another). The pad holder 300 can also more easily release the cleaning pad 120 when the release mechanism 322 is triggered. The number of cooperating raised protrusions and cut outs may vary in other examples.

Because the raised protrusions 304, 306 extend into the cutouts 212, 214, the cleaning pad 120 is consequently held in place against rotational forces by the cutout-protrusion retention system. In some cases, the robot 100 moves in a scrubbing motion, as described herein, and, in some embodiments, the pad holder 300 oscillates the cleaning pad 120 for additional scrubbing. For example, the robot 100 may oscillate the attached cleaning pad 120 in an orbit of 12 to 15 mm to scrub the floor 10. The robot 100 can also apply one pound or less of downward pushing force to the pad. By aligning cutouts 212, 214 in the card backing 206 with protrusions 304, 306, the pad 120 remains stationary relative to the pad holder 300 during use, and the application of scrubbing motion, including oscillation motion, directly transfers from the pad holder 300 through the layers of the pad 120 without loss of transferred movement.

Figure 3B:
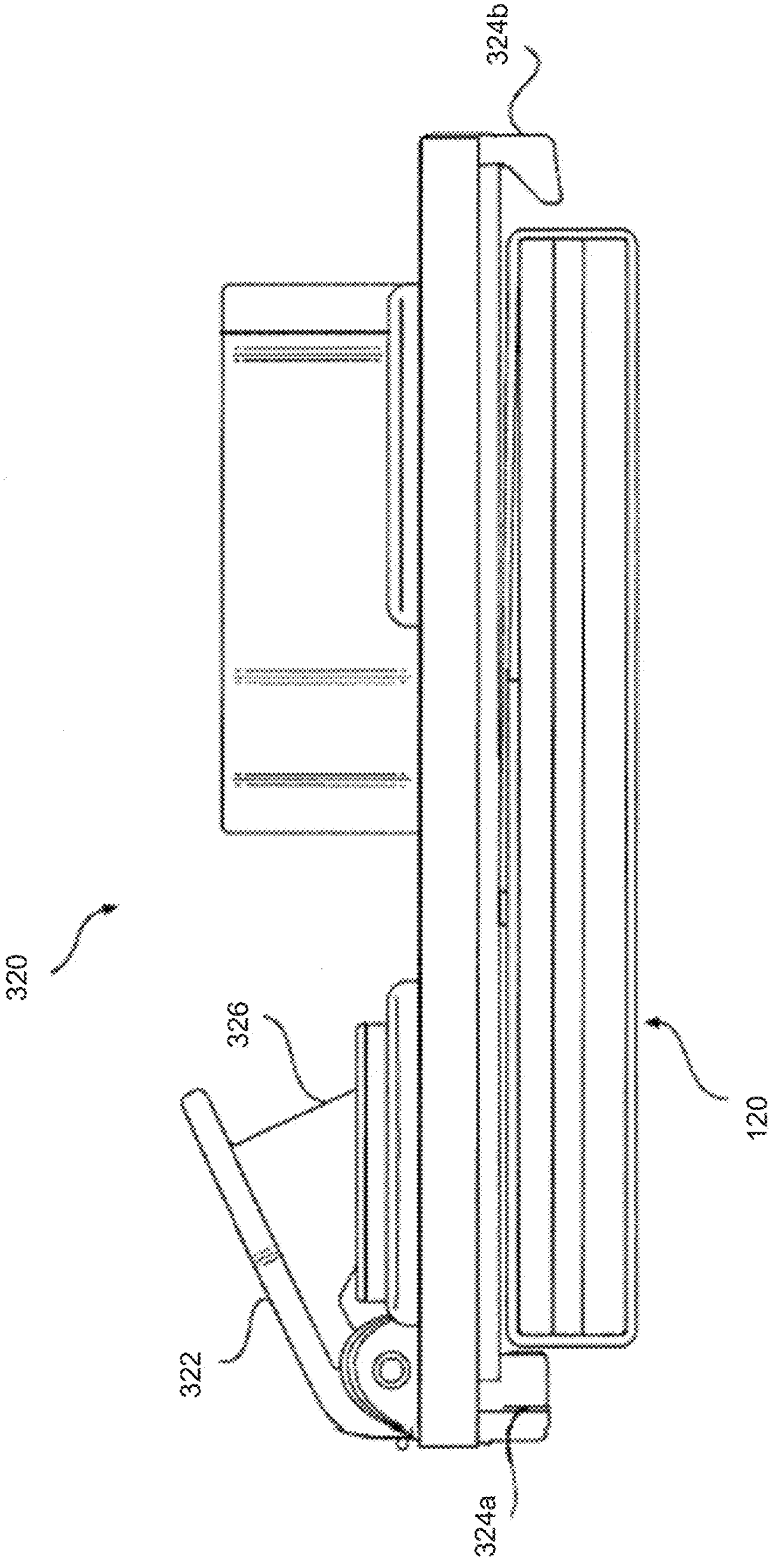
FIG. 3B is a side view of the attachment mechanism in a secure position.
Figure 3C:
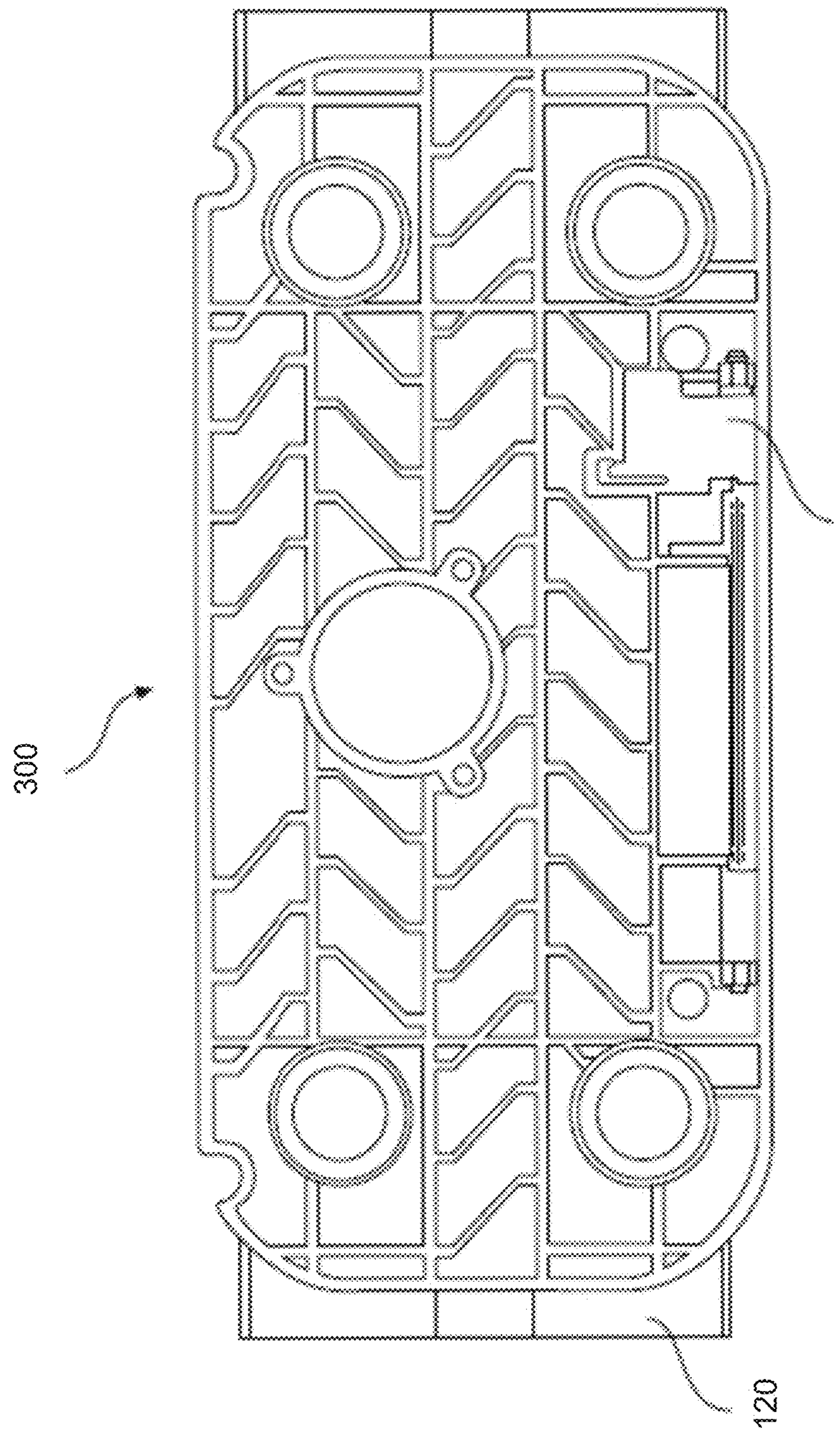
FIG. 3C is a top view of the attachment mechanism for the pad.
Figure 3D:
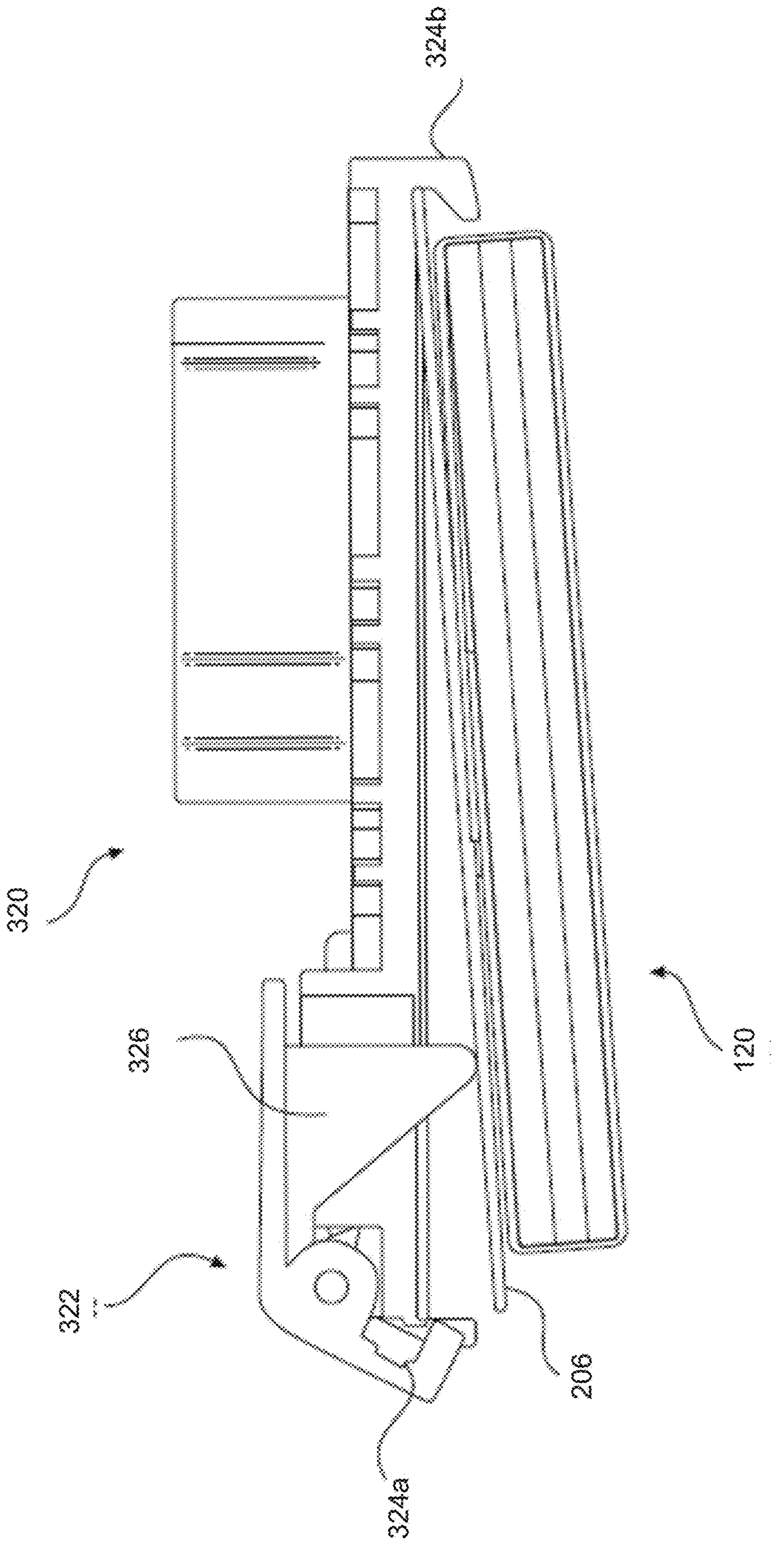
FIG. 3D is a cut away side view of the attachment mechanism for the pad in a release position.

Referring to FIGS. 3B-3D, a pad release mechanism 322 includes a movable retention clip 324*a*, or lip, that holds the cleaning pad 120 securely in place by grasping the protruding longitudinal edges 210 of the card backing 206. A non-movable retention clip 324*b* also supports the cleaning pad 120. The pad release mechanism 322 includes a moveable retention clip 324*a* and an eject protrusion 326 that slides up through a slot or opening in the pad holder 300. In some implementations, the retention clips 324*a*, 324*b* can include hook-and-loop fasteners, and in another embodiment, the retaining clips 324*a*, 324*b* can include clips, or retention brackets, and selectively moveable clips or retention brackets for selectively releasing the pad for removal. Other types of retainers may be used to connect the cleaning pad 120 to the robot 100, such as snaps, clamps, brackets, adhesive, etc., which may be configured to allow the release of the cleaning pad 120, such as upon activation of the pad release mechanism 322.

The pad release mechanism 322 can be pushed into a down position (FIG. 3D) to release the cleaning pad 120. The eject protrusion 326 pushes down on the card backing 206 of the cleaning pad 120. As described above with respect to FIG. 1A, the user can toggle the toggle button 136 to actuate the pad release mechanism 322. Upon toggling the toggle button, a spring actuator (not shown) rotates the pad release mechanism 322 to move the retention clip 324*a* away from the card backing 206. Eject protrusion 326 then moves through the slot of the pad holder 300 and pushes card backing 206 and consequently cleaning pad 120 out of pad holder 300.

The user typically slides the cleaning pad 120 into the pad holder 300. In the illustrated example, the cleaning pad 120 can be pushed into the pad holder 300 to engage with the retention clips 324.

Navigational Behaviors and Spraying Schedules

Referring back to FIGS. 1A-1B, the robot 100 can execute a variety of navigational behaviors and spraying schedules depending on the type of the cleaning pad 120 that has been loaded on the pad holder 300. A cleaning mode—which can include a navigational behavior and a spraying schedule—varies according to the cleaning pad 120 loaded into the pad holder 300.

Navigational behaviors can include a straight motion pattern, a vine pattern, a cornrow pattern, or any combinations of these patterns. Other patterns are also possible. In the straight motion pattern, the robot 100 generally moves in a straight path to follow an obstacle defined by straight edges, such as a wall. The continuous and repeated use of the birdfoot pattern is referred to as the vine pattern or the vining pattern. In the vine pattern, the robot 100 executes repetitions of a birdfoot pattern in which the robot 100 moves back and forth while advancing incrementally along a generally forward trajectory. Each repetition of the birdfoot pattern advances the robot 100 along a generally forward trajectory, and repeated execution of the birdfoot pattern can allow the robot 100 to traverse across the floor surface in the generally forward trajectory. The vine pattern and birdfoot pattern will be described in more detail below with respect to FIGS. 4A-4E. In the cornrow pattern, the robot 100 moves back and forth across a room so that the robot 100 moves perpendicular to the longitudinal movement of the pattern slightly between each traversal of the room to form a series of generally parallel rows that traverse the floor surface.

In the example described below, each spraying schedule generally defines a wetting out period, a cleaning period, and ending period. The different periods of each spraying schedule define a frequency of spraying (based on distance travelled) and a duration of spraying. The wetting out period occurs immediately after turning on the robot 100 and initiating the cleaning operation. During the wetting out period, the cleaning pad 120 requires additional cleaning fluid to sufficiently wet the cleaning pad 120 so that the cleaning pad 120 has enough absorbed cleaning fluid to initiate the cleaning period of the cleaning operation. During the cleaning period, the cleaning pad 120 requires less cleaning fluid than is required in the wetting out period. The robot 100 generally sprays the cleaning fluid in order to maintain the wetness of the cleaning pad 120 without causing the cleaning fluid to puddle on the floor 10. During the ending period, the cleaning pad 120 requires less cleaning fluid than is required in the cleaning period. During the ending period, the cleaning pad 120 generally is fully saturated and only needs to absorb enough fluid to accommodate for evaporation or other drying that might otherwise impede removal of dirt and debris from the floor 10.

Referring to TABLE 1 below, the type of the cleaning pad 120 identified by the robot 100 determines the spraying schedule and the navigational behavior of the cleaning mode to be executed on the robot 100. The spraying schedule—including the wetting out period, the cleaning period, and the ending period—differs depending on the type of the cleaning pad 120. If the robot 100 determines that the cleaning pad 120 is the wet mopping cleaning pad, the damp mopping cleaning pad, or the washable cleaning pad, the robot 100 executes a spraying schedule having periods defining a certain duration of spray for every fraction of or multiple of one birdfoot pattern. The robot 100 executes a navigation behavior that uses vine and cornrow patterns as the robot 100 traverses the room, and a straight motion pattern as the robot 100 moves about a perimeter of the room or edges of objects within the room. While the spraying schedules have been described as having three distinct periods, in some implementations, the spraying schedule can include more than three periods or fewer than three periods. For example, the spraying schedule can have first and second cleaning periods in addition to the wetting out period and the ending period. In other cases, if the robot is configured to function with pre-moistened cleaning pad, the wetting out period may not be needed. Similarly, the navigational behavior can include other movement patterns, such as zig-zag or spiral patterns. While the cleaning operation has been described to include the wetting out period, the cleaning period, and the ending period, in some implementations, the cleaning operation may only include the cleaning period and the ending period, and the wetting out period may be a separate operation that occurs before the cleaning operation.

If the robot 100 determines that the cleaning pad 120 is the dry dusting cleaning pad, the robot can execute a spraying schedule in which the robot 100 simply does not spray the cleaning fluid 124. The robot 100 can execute a navigational behavior that uses the cornrow pattern as the robot 100 traverses the room, and a straight motion pattern as the robot 100 navigates about the perimeter of the room.

TABLE 1

Exemplary Spraying Schedules and Navigational Behaviors

| | | Cleaning Pad Type | | | | |
|---|---|---|---|---|---|---|
| | | Wet Mopping | Damp Mopping | Washable | Dry Dusting | Pre-moistened |
| Spraying Schedule | Wetting Out Period | 1-second spray every 0.5 birdfoot | 0.6-second spray every 0.5 birdfoot | 0.6-second spray every 0.5 birdfoot | No spraying | 1-second spray every 0.5 birdfoot |

TABLE 1-continued

| Exemplary Spraying Schedules and Navigational Behaviors | | | | | | |
|---|---|---|---|---|---|---|
| | | Cleaning Pad Type | | | | |
| | | Wet Mopping | Damp Mopping | Washable | Dry Dusting | Pre-moistened |
| | Cleaning Period | 1-second spray every 0.5 birdfoot | 0.5-second spray every 1 birdfoot | 0.5-second spray every 1 birdfoot | No spraying | 1-second spray every 0.5 birdfoot |
| | Ending Period | 0.5-second spray every 2 birdfoot | 0.3-second spray every 2 birdfoot | 0.3 second spray every 2 birdfoot | No spraying | 0.5-second spray every 2 birdfoot |
| Navigational Behavior | Room Cleaning | Vine and cornrow patterns | Vine and cornrow patterns | Vine and cornrow patterns | Cornrow pattern | Vine and cornrow patterns |
| | Perimeter Cleaning | Straight motion pattern | Straight motion pattern | Straight motion pattern | Straight motion pattern | Straight motion pattern |

In the examples described in TABLE 1, while the robot is described to use the same pattern during the wetting out period and the cleaning periods (e.g., the vine pattern, the cornrow pattern), in some examples, the wetting out period can use a different pattern. For example, during the wetting out period, the robot can deposit a larger puddle of cleaning fluid and advance forward and backward across the liquid to wet the pad. In such an implementation, the robot does not initiate the cornrow pattern to traverse the floor surface until the cleaning period. Referring to FIGS. 4A-4D, the cleaning pad 120 of the robot 100 scrubs a floor surface 10 and absorb fluids on the floor surface 10. As described above with respect to FIG. 1A, the robot 100 includes the fluid applicator 126 that sprays the cleaning fluid 124 on the floor surface 10. The robot 100 scrubs and removes smears 22 (e.g., dirt, oil, food, sauces, coffee, coffee grounds) that are being absorbed by the pad 120 along with the applied fluid 124 that dissolves and/or loosens the smears 22. Some of the smears 22 can have viscoelastic properties, which exhibit both viscous and elastic characteristics (e.g., honey). The cleaning pad 120 is absorbent and can be abrasive in order to abrade the smears 22 and loosen them from the floor surface 10.

Figure 4A:
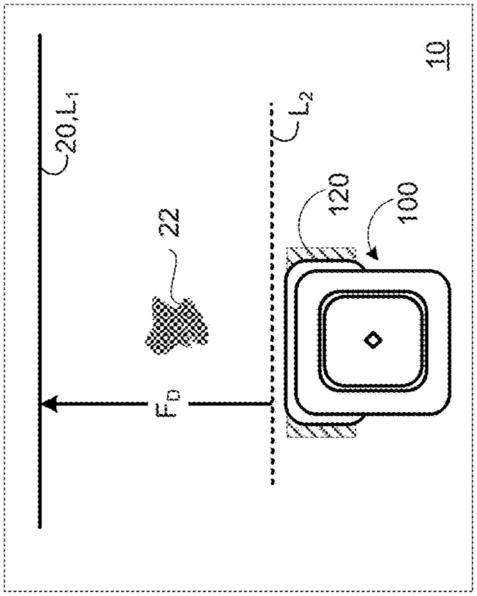
FIGS. 4A to 4C are top views of the robot as it sprays a floor surface with a fluid.
Figure 4B:
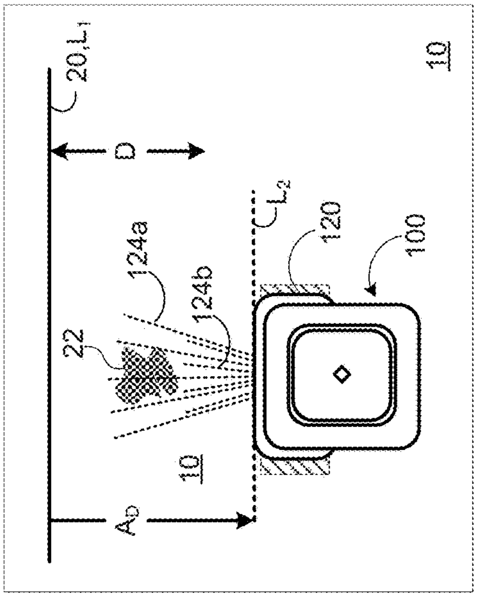
Figure 4C:
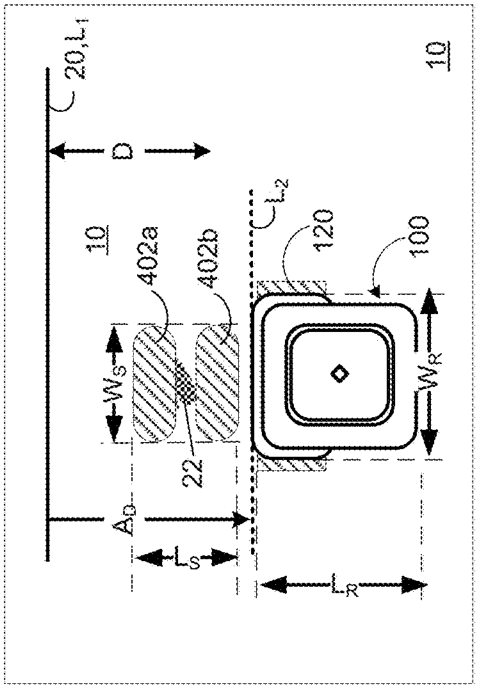

Also described above, the fluid applicator 126 includes the top nozzle 128*a* and the bottom nozzle 128*b* to distribute the cleaning fluid 124 over the floor surface 10. The top nozzle 128*a* and the bottom nozzle 128*b* can be configured to spray the cleaning fluid 124 at an angle and distance different than each other. Referring to FIGS. 1 and 4B, the top nozzle 128*a* is angled and spaced in the recess 129 such that the top nozzle 128*a* sprays relatively longer lengths of the cleaning fluid 124*a* forward and downward to cover an area in front of the robot 100. The bottom nozzle 128*b* is angled and spaced in the recess 129 such that the bottom nozzle 128*b* sprays relatively shorter lengths fluid 124*b* forward and downward to cover an area in front of but closer to the robot 100. Referring to FIG. 4C, the top nozzle 128*a*— after spraying the cleaning fluid 124*a*—dispenses the cleaning fluid 124*a* in a forward area of applied fluid 402*a*. The bottom nozzle 128*b*—after spraying the cleaning fluid 124*b*—dispenses the cleaning fluid 124*b* in a rearward area of applied fluid 402*b*.

Referring to FIGS. 4A-4D, the robot 100 can execute a cleaning operation by moving in a forward direction F toward an obstacle or wall 20, followed by moving in a backward or reverse direction A. The robot 100 can drive in a forward drive direction a first distance $F_d$ to a first location $L_1$. As the robot 100 moves backwards a second distance $A_d$ to a second location $L_2$, the nozzles 128*a*, 128*b* simultaneously spray longer lengths of the cleaning fluid 124*a* and shorter lengths of fluid 124*b* onto the floor surface 10 in a forward and/or downward direction in front of the robot 100 after the robot 100 has moved at least a distance D across an area of the floor surface 10 that was already traversed in the forward drive direction F. The fluid 124 can be applied to an area substantially equal to or less than the area footprint AF of the robot 100. Because the distance D is the distance spanning at least the length $L_R$ of the robot 100, the robot 100 can determine that the area of the floor 10 traversed by the robot 100 is unoccupied by furniture, walls 20, cliffs, carpets or other surfaces or obstacles onto which cleaning fluid 124 would be applied if the robot 100 had not already determined the presence of a clear floor 10. By moving in the forward direction F and then moving in the reverse direction A before applying cleaning fluid 124, the robot 100 identifies boundaries, such as a flooring changes and walls, and prevents fluid damage to those items.

In some implementations, the nozzles 128*a*, 128*b* dispense the cleaning fluid 124 in an area pattern that extends one robot width $W_R$ and at least one robot length L R in dimension. The top nozzle 128*a* and bottom nozzle 128*b* apply the cleaning fluid 124 in two distinct spaced apart strips of applied fluid 402*a*, 402*b* that do not extend to the full width $W_R$ of the robot 100 such that the cleaning pad 120 can pass through the outer edges of the strips of applied fluid 402*a*, 402*b* in forward and backward angled scrubbing motions (as will be described below with respect to FIGS. 4D-4E). In other implementations, the strips of applied fluid 402*a*, 402*b* cover a width $W_S$ of 75-95% of the robot width $W_R$ and a combined length $L_S$ of 75-95% of the robot length $L_R$. In some examples, the robot 100 only sprays on traversed areas of the floor surface 10. In other implementations, the robot 100 only applies the cleaning fluid 124 to areas of the floor surface 10 that the robot 100 has already traversed. In some examples, the strips of applied fluid 402*a*, 402*b* may be substantially rectangular or ellipsoid.

Figure 4D:
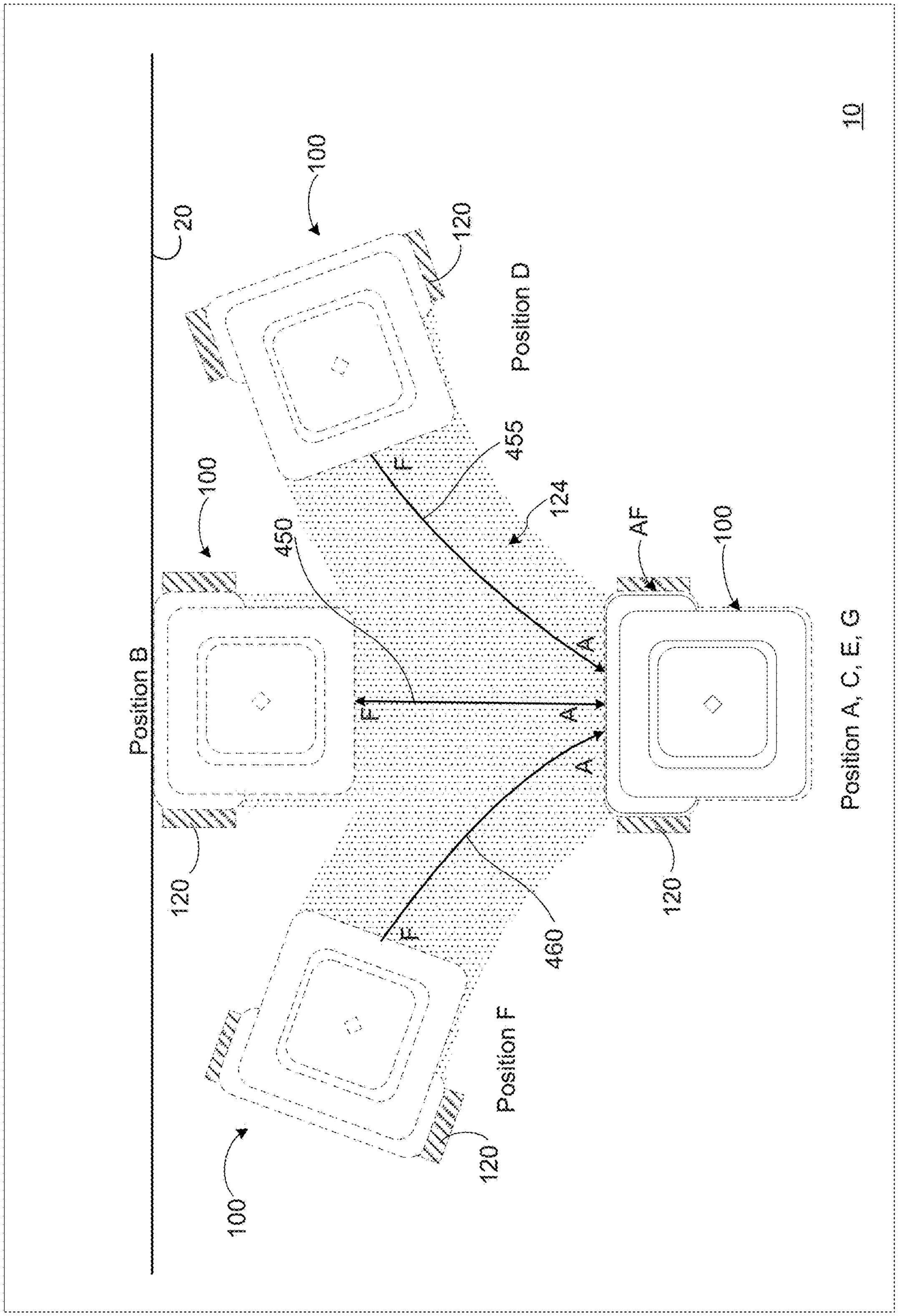
FIG. 4D is a top view of the robot as it scrubs a floor surface.

The robot 100 can move in a back-and-forth motion to moisten the cleaning pad 120 and/or scrub the floor surface 10 on which the cleaning fluid 124 has been applied. Referring to FIG. 4D, in one example, the robot 100 moves in a birdfoot pattern through the footprint area AF on the floor surface 10 on which the cleaning fluid 124 has been applied. The birdfoot pattern depicted involves moving the robot 100 (*i*) in a forward direction F and a backward or reverse direction A along a center trajectory 450, (ii) in a forward direction F and a reverse direction A along a left trajectory 460, and (iii) in a forward direction F and a reverse direction A along a right trajectory 455. The left trajectory 460 and the right trajectory 455 are arcuate, extending outward in an arc from a starting point along the center trajectory 450. While the left and right trajectories 455, 460 have been described and shown as arcuate, in other implementations, the left trajectory and the right trajectory can be straight line trajectories that extend outward in a straight line from the center trajectory.

In the example of FIG. 4D, the robot 100 moves in a forward direction F from Position A along the center trajectory 450 until it encounters a wall 20 and triggers the bump sensor at Position B. The robot 100 then moves in a backward direction A along the center trajectory to a distance equal to or greater than the distance to be covered by fluid application. For example, the robot 100 moves backward along the center trajectory 450 by at least one robot length $L_R$ to Position G, which may be the same position as Position A. The robot 100 applies the cleaning fluid 124 to an area substantially equal to or less than the footprint area AF of the robot 100 and returns to the wall 20. As the robot returns to the wall 20, the cleaning pad 120 passes through the cleaning fluid 124 and cleans the floor surface 10. From Position B, the robot 100 retracts either along a left trajectory 460 or a right trajectory 455 to Position F or Position D, respectively, before going to Position E or Position C, respectively. In some cases, Positions C, E may correspond to Position B. The robot 100 can then continue to complete its remaining trajectories. Each time the robot 100 moves forward and backward along the center trajectory 450, left trajectory 460 and right trajectory 455, the cleaning pad 120 passes through the applied fluid 124, scrubs dirt, debris and other particulate matter from the floor surface 10, and absorbs the dirty fluid away from the floor surface 10. The scrubbing motion of the cleaning pad 120 combined with the solvent characteristics of the cleaning fluid 124 breaks down and loosens dried stains and dirt. The cleaning fluid 124 applied by the robot 100 suspends loosened debris such that the cleaning pad 120 absorbs the suspended debris and wicks it away from the floor surface 10.

As the robot 100 drives back and forth, it cleans the area it is traversing and therefore provides a deep scrub to the floor surface 10. The back and forth movement of the robot 100 can break down stains (e.g., the smears 22 of FIGS. 4A to 4C) on the floor 10. The cleaning pad 120 then can absorb the broken down stains. The cleaning pad 120 can pick up enough of the sprayed fluid to avoid uneven streaks if the cleaning pad 120 picks up too much liquid, e.g., the cleaning fluid 124. The cleaning pad 120 can leave a residue of the fluid, which could be water or some other cleaning agent including solutions containing cleansing agents, to provide a visible sheen on the surface floor 10 being scrubbed. In some examples, the cleaning fluid 124 contains antibacterial solution, e.g., an alcohol containing solution. A thin layer of residue, therefore, is not absorbed by the cleaning pad 120 to allow the fluid to kill a higher percentage of germs.

In one implementation, when the robot 100 uses a cleaning pad 120 that requires the use of the cleaning fluid 124 (e.g., the wet mopping cleaning pad, the damp mopping cleaning pad, and the washable cleaning pad), the robot 100 can switch back and forth between the vine and cornrow pattern and the straight motion pattern. The robot 100 uses the vine and cornrow pattern during room cleaning and uses the straight motion pattern during perimeter cleaning.

Figure 4E:
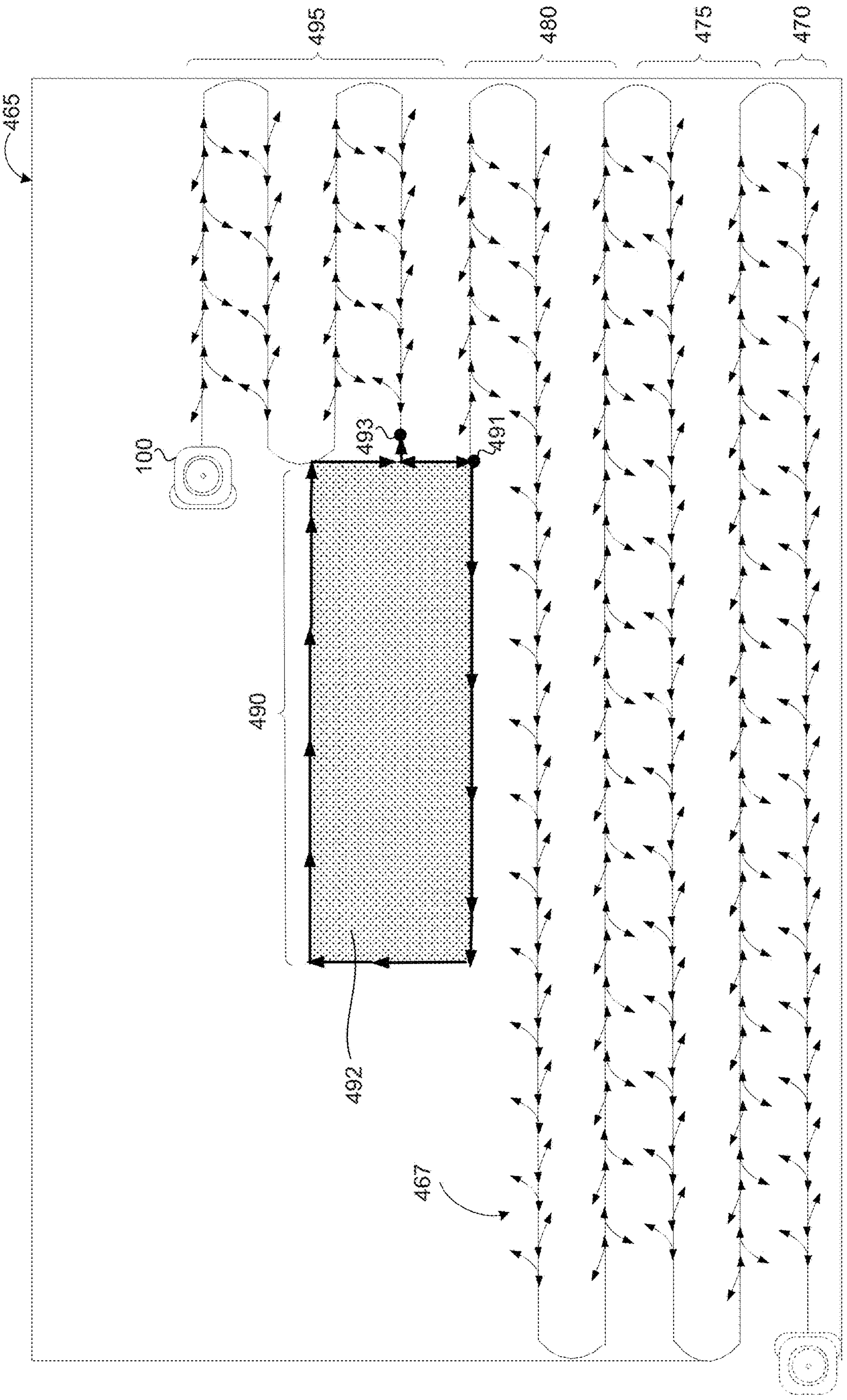
FIG. 4E illustrates the robot implementing a vining behavior as it maneuvers about a room.

Referring to FIG. 4E, in another implementation, the robot 100 navigates about a room 465 executing a combination of the vine pattern described above and straight-motion pattern, following a path 467. In this example, the robot 100 is applying the cleaning fluid 124 in bursts ahead of the robot 100 along the path 467. In the example shown in FIG. 4E, the robot 100 is operating in a cleaning mode requiring use of the cleaning fluid 124. The robot 100 advances along the path 467 by performing the vine pattern, which includes repetitions of the birdfoot pattern. With each birdfoot pattern, as described in more detail above, the robot 100 ends up at a location that is generally in a forward direction relative to its initial location. The robot 100 operates according to the spray schedule shown in TABLE 2 and TABLE 3 below, which respectively correspond to the vine and cornrow pattern spray schedule and the straight motion pattern spray schedule. In TABLES 2 and 3, the distance traveled can be computed as the total distance traveled in the vine pattern, which accounts for the arcuate trajectories of the robot 100 in the vine pattern. In this example, the spray schedule includes a wetting out period, a first cleaning period, a second cleaning period, and an ending period. In some cases, the robot 100 can compute the distance traveled as simply the forward distance traveled.

TABLE 2

Vine and Cornrow Pattern Spray Schedule

| Period | Number of sprays | Min distance traveled | Max Distance traveled | Spray duration |
|---|---|---|---|---|
| Wetting Out Period | 15 times | 344 mm | 344 mm | 1.0 seconds |
| First Cleaning Period | 20 times | 600 mm | 1100 mm | 1.0 seconds |
| Second Cleaning Period | 30 times | 900 mm | 1600 mm | 0.5 second |
| Ending Period | Remainder of the run | 1200 mm | 2250 mm | 0.5 second |

TABLE 3

Straight Motion Pattern Spray Schedule

| Period | # sprays | Min distance traveled | Max Distance traveled | Spray duration |
|---|---|---|---|---|
| Wetting Out Period | 4 times | 172 mm | 172 mm | 4.0 seconds |
| First Cleaning Period | 12 times | 400 mm | 750 mm | 3.0 seconds |
| Second Cleaning Period | 65 times | 400 mm | 750 mm | 0.6 second |
| Ending Period | Remainder of the run | 600 mm | 1100 mm | 0.6 second |

The first fifteen times the robot 100 applies fluid to the floor surface—which corresponds to the wetting out period of the spraying schedule—the robot 100 sprays the cleaning fluid 124 at least at every 344 mm (13.54 inches, or a little over a foot) of distance traveled. Each spray lasts a duration of approximately 1 second. The wetting out period generally corresponds to the path 467 contained in the region 470 of the room 465, where the robot 100 executes a navigational behavior combining the vine pattern and the cornrow pattern.

Once the cleaning pad 120 is fully wet—which generally corresponds to when the robot 100 executes the first cleaning period of the spraying schedule—the robot 100 will spray every 600-1100 mm (~23.63-43.30 inches, or between two and four feet) of distance traveled and for a duration of 1 second. This relatively slower spray frequency ensures the pad stays wet without overwetting or puddling. The cleaning period is represented as the path 467 contained in a region 475 of the room 465. The robot follows spray frequency and duration of the cleaning period for a predetermined number of sprays (e.g., 20 sprays).

When the robot 100 enters a region 480 of the room 465, the robot 100 begins the second cleaning period and sprays every 900-1600 mm (~35.43-~63 inches, or between approximately three and five feet) of distance traveled for a duration of half of a second. This relatively slower spray frequency and spray duration maintains the pad wetness without overwetting, which, in some examples, may prevent the pad from absorbing additional cleaning fluid that may contain suspended debris.

As indicated in the drawing, at a point 491 of the region 480, the robot 100 encounters an obstacle having a straight edge, for example, a kitchen center island 492. Once the robot 100 reaches the straight edge of the center island 492, the navigation behavior switches from the vine and cornrow pattern to the straight motion pattern. The robot 100 sprays according to the duration and frequency in the spray schedule that corresponds to the straight motion pattern.

The robot 100 implements the period of the straight motion pattern spray schedule that corresponds to the aggregate spray number count the robot 100 is at in the overall in the cleaning operation. The robot 100 can track the number of sprays and therefore can select the period of the straight motion pattern spray schedule that corresponds to the number of sprays that the robot 100 has sprayed at the point 491. For example, if the robot 100 has sprayed 36 times when it reaches the point 491, the next spray will the 37th spray and will fall under the straight motion schedule corresponding to the 37th spray.

The robot 100 executes the straight motion pattern to move about the center island 492 along the path 467 contained in the region 490. The robot 100 also can execute the period corresponding to the $37^{th}$ spray, which is the first cleaning period of the straight motion pattern spray schedule shown in TABLE 3. The robot 100 therefore applies fluid for 0.6 second every 400 mm-750 mm (15.75-29.53 inches) of distance traveled while moving in a straight motion along the edges of the center island 492. In some implementations, the robot 100 applies less cleaning fluid in the straight motion pattern than in the vining pattern because the robot 100 covers a smaller distance in the vining pattern.

Assuming the robot edges around the center island 492 and sprays 10 times, the robot will be at the 47th spray in the cleaning operation when it returns to cleaning the floor using the vine and cornrow patterns at point 493. At the point 493, the robot 100 follows the vine and cornrow pattern spray schedule for the 47th spray, which places the robot 100 back into the second cleaning period. Thus, along the path 467 contained in the region 495 of the room 465, the robot 100 sprays every 900-1600 mm (~35.43 to ~63 inches, or between approximately three and five feet).

The robot 100 continues executing the second cleaning period until the 65th spray, at which point the robot 100 begins executing the ending period of the vine and cornrow pattern spray schedule. The robot 100 applies fluid at a distance traveled of between approximately 1200 to 2250 mm and for a duration of half a second. This less frequent and less voluminous spray can correspond to the end of the cleaning operation when the pad 120 is fully saturated and only needs to absorb enough fluid to accommodate for evaporation or other drying that might otherwise impede removal of dirt and debris from the floor surface.

While in the examples above, the cleaning fluid application and/or the cleaning pattern were modified based on the type of pad identified by the robot, other factors can additionally be modified. For example, the robot can provide vibration to aid in cleaning with certain pad typed. Vibration can be helpful in that it is believed to break up surface tension to help movement and breaks up dirt better than without vibration (e.g., just wiping). For example, when cleaning with a wet pad, the pad holder can cause the pad to vibrate. When cleaning with a dry cloth, the pad holder may not vibrate since vibration could result in dislodging the dirt and hair from the pad. Thus, the robot can identify the pad and based on the pad type determine whether to vibrate the pad. Additionally, the robot can modify the frequency of the vibration, the extent of the vibration (e.g., the amount of pad translation about an axis parallel to the floor) and/or the axis of the vibration (e.g., perpendicular to the direction of movement of the robot, parallel to the direction of movement, or another angle not parallel or perpendicular to the robot's direction of movement).

In some implementations, the disposable wet and damp pads are pre-moistened and/or pre-impregnated with cleaning solvent, antibacterial solvents and/or scent agents. The disposable wet and damp pads may be pre-moistened or pre-impregnated.

In other implementations, the disposable pad is not pre-moistened and the airlaid layer comprises wood pulp. The disposable pad airlaid layer may include a wood pulp and a bonding agent such as polypropylene or polyethylene and this co-form combination is less dense than pure wood pulp and therefore better at fluid retention. In one implementation of the disposable pad, the overwrap is a spunbond material including polypropylene and woodpulp and the overwrap layer is covered with a polypropylene meltblown layer as described above. The meltblown layer may be made from polypropylene treated with a hydrophilic wetting agent that pull dirts and moisture up into the pad and, in some implementations, the spunbond overwrap additionally is hydrophobic such that fluid is wicked upward by the meltblown layer and through the overwrap, into the airlaid without saturating the overwrap. In other implementations, such as damp pad implementations, the meltblown layer is not treated with a hydrophilic wetting agent. For example, running the disposable pad in a damp pad mode on the robot may be desirable to users with hardwood flooring such that less fluid is sprayed on the floor and less fluid is therefore absorbed into the disposable pad. Rapid wicking to the airlaid layer or layers is therefore less critical in this use case.

In some implementations, the disposable pad is a dry pad having an airlaid layer or layers made of either woodpulp or a co-form blend of wood pulp and a bonding agent, such as polypropylene or polyethylene. Unlike the wet and damp version of the disposable pad, the dry pad may be thinner, containing less airlaid material than the disposable wet/damp pad so that the robot rides at an optimal height on a pad that is not compressing because of fluid absorption. In some implementations of the disposable dry pad, the overwrap is a needle punched spundbond material and may be treated with a mineral oil, such as DRAKASOL, that helps dirt, dust and other debris to bind to the pad and not dislodge while the robot is completing a mission. The overwrap may be treated with an electrostatic treatment for the same reasons.

In some implementations, the washable pad is a microfiber pad having a reusable plastic backing layer attached thereto for mating with the pad holder.

In some implementations, the pad is a melamine foam pad.

Control System

Figure 5:
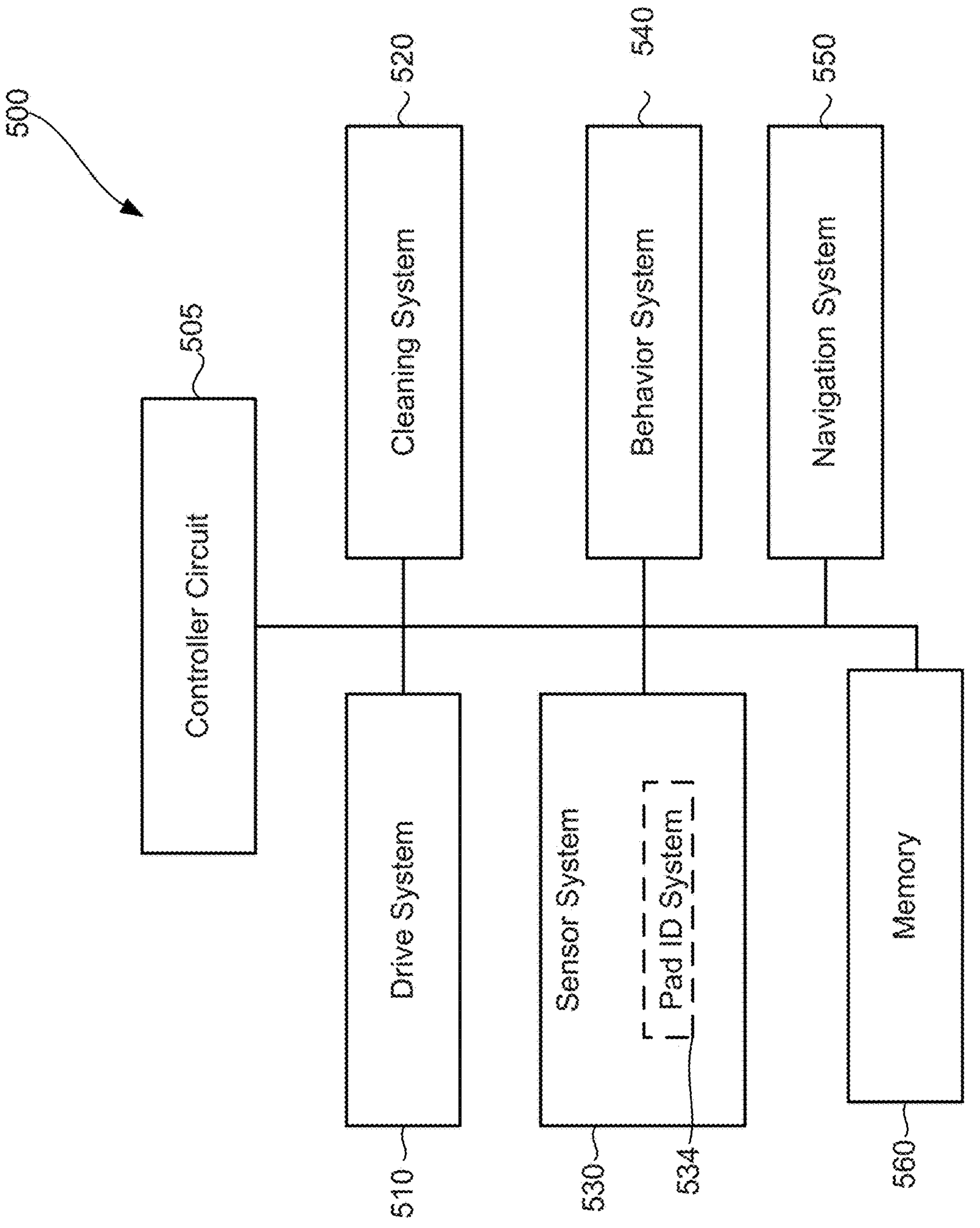
FIG. 5 is a schematic view of the controller of the mobile robot of FIG. 1A.

Referring to FIG. 5, a control system 500 of the robot includes a controller circuit 505 (herein also referred to as a "controller") that operates a drive 510, a cleaning system 520, a sensor system 530 having a pad identification system 534, a behavior system 540, a navigation system 550, and a memory 560.

The drive system 510 can include wheels to maneuver the robot 100 across the floor surface based on a drive command having x, y, and 0 components. The wheels of the drive system 510 support the robot body above the floor surface. The controller 505 can further operate a navigation system 550 configured to maneuver the robot 100 about the floor surface. The navigation system 550 bases its navigational commands on the behavior system 540, which selects navigational behaviors and spray schedules that can be stored in the memory 560. The navigation system 550 also communicates with the sensor system 530, using the bump sensor, accelerometers, and other sensors of the robot, to determine and issue drive commands to the drive system 510.

The sensor system 530 can additionally include a 3-axis accelerometer, a 3-axis gyroscope, and rotary encoders for the wheels (e.g., the wheels 121 shown in FIG. 1B). The controller 505 can utilize sensed linear acceleration from the 3-axis accelerometer to estimate the drift in the x and y directions as well and can utilize the 3-axis gyroscope to estimate the drift in the heading or orientation θ of the robot 100. The controller 505 can therefore combine data collected by the rotary encoders, the accelerometer, and the gyroscope to produce estimates of the general pose (e.g., location and orientation) of the robot 100. In some implementations, the robot 100 can use the encoders, accelerometer, and the gyroscope so that the robot 100 remains on generally parallel rows as the robot 100 implements a cornrow pattern. The gyroscope and rotary encoders together can additionally be used to perform dead reckoning algorithms to determine the location of the robot 100 within its environment.

The controller 505 operates the cleaning system 520 to initiate spray commands for a certain duration at a certain frequency. The spray commands can be issued according to the spray schedules stored on the memory 560.

The memory 560 can further be loaded with spray schedules and navigational behaviors corresponding to specific types of cleaning pads that may be loaded onto the robot during cleaning operations. The pad identification system 534 of the sensor system 530 includes the sensors that detect a feature of the cleaning pad to determine the type of cleaning pad that has been loaded on the robot. Based on the detected features, the control 505 can determine the type of the cleaning pad. The pad identification system 534 will be described in more detail below.

In some examples, the robot knows where it has been based on storing its coverage locations on a map stored on the non-transitory-memory 560 of the robot or on an external storage medium accessible by the robot through wired or wireless means during a cleaning run. The robot sensors may include a camera and/or one or more ranging lasers for building a map of a space. In some examples, the robot controller 505 uses the map of walls, furniture, flooring changes and other obstacles to position and pose the robot at locations far enough away from obstacles and/or flooring changes prior to the application of cleaning fluid. This has the advantage of applying fluid to areas of floor surface having no known obstacles.

Pad Identification Systems

The pad identification system 534 can vary depending on the type of pad identification scheme used to allow the robot to identify the type of the cleaning pad that has been attached to the bottom of the robot. Described below are several different types of pad identification schemes.

Discrete Identification Sequence

Figure 6A:
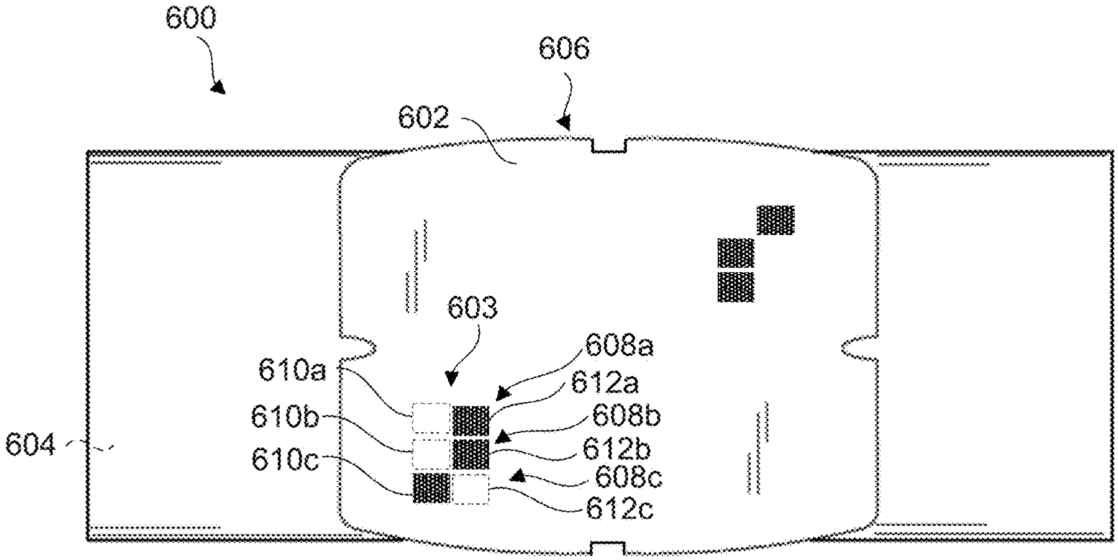
FIG. 6A is a top view of a cleaning pad with a first pad identification feature.

Referring to FIG. 6A, an example cleaning pad 600 includes a mounting surface 602 and a cleaning surface 604. The cleaning surface 604 corresponds to the bottom of the cleaning pad 600 and is generally the surface of the cleaning pad 600 that contacts and cleans the floor surface. A card backing 606 of the cleaning pad 600 serves as a mounting plate that a user can insert into the pad holder of the robot. The mounting surface 602 corresponds to the outer layer of a body of the cleaning pad 600 on which the card backing 606 is mounted. The robot uses the card backing 606 to identify the type of cleaning pad disposed on the robot. The card backing 606 includes an identification sequence 603 marked on the card backing 606. The identification sequence 603 is replicated symmetrically about the longitudinal and horizontal axes of the cleaning pad 600 so that a user can insert the cleaning pad 600 into the robot (e.g., the robot 100 of FIGS. 1A and 1B) in either of two orientations.

The identification sequence 603 is a sensible portion of the card backing 606 that the robot can sense to identify the type of cleaning pad that the user has mounted onto the robot. The identification sequence 603 can have one of a finite number of discrete states, and the robot detects the identification sequence 603 to determine which of the discrete states the identification sequence 603 indicates.

In the example of FIG. 6A, the identification sequence 603 includes three identification elements 608*a*-608*c*, which together define the discrete state of the identification sequence 603. Each of the identification elements 608*a*-608*c* includes a left block 610*a*-610*c* and a right block 612*a*-612*c*, and the blocks 610*a*-610*c*, 612*a*-612*c* can include an ink that contrasts with the color of the card backing 606 (e.g., a dark ink, a light ink). Based on the presence or absence of ink, the blocks 610*a*-610*c*, 612*a*-612*c* can be in one of two states: a dark state or a light state. The elements 608*a*-608*c* can therefore be in one of four states: a light-light state, a light-dark state, a dark-light state, and a dark-dark state. The identification sequence 603 then has 64 discrete states.

Each of the left blocks 610*a*-610*c* and each of the right blocks 612*a*-612*c* can be set (e.g., during manufacturing) to the dark or the light state. In one implementation, each block is placed into the dark state or the light state based on the presence or absence of a dark ink in the area of the block. A block is in the dark state when the ink that is darker than the surrounding material of the card backing 606 is deposited on the card backing 606 in an area defined by the block. A block is typically in a light state when ink is not deposited on the card backing 606 and the block takes on the color of the card backing 606. As a result, a light block typically has a greater reflectivity than the dark block. Although the blocks 610*a*-610*c*, 612*a*-612*c* have been described to be set to light or dark states based on the presence or absence of the dark ink, in some cases, during manufacturing, a block can be set to a light state by bleaching the card backing or applying a light colored ink to the card backing such that the color of the card backing is lightened. A block in the light state would therefore have a greater luminance than the surrounding card backing. In FIG. 6A, the right block 612*a*, the right block 612*b*, and the left block 610*c* are in the dark state. The left block 610*a*, the left block 610*b*, and the right block 612*c* are in the light state. In some cases, the dark state and the light state may have substantially different reflectivities. For example, the dark state may be 20%, 30%, 40%, 50%, etc. less reflective than the light state.

The state of each of the elements 610*a*-610*c* can therefore be determined by the state of its constituent blocks 610*a*-610*c*, 612*a*-612*c*. The elements can be determined to have one of four states:

1. the light-light state in which the left block 610*a*-610*c* is in the light state and the right block 612*a*-612*c* is in the light state;
2. the light-dark state in which the left block 610*a*-610*c* is in the light state and the right block 612*a*-612*c* is in the dark state;
3. the dark-light state in which the left block 610*a*-610*c* is in the dark state and the right block 612*a*-612*c* is in the light state; and
4. the dark-dark state in which the left block 610*a*-610*c* is in the dark state and the right block 612*a*-612*c* is in the dark state.

In FIG. 6A, the element 608*a* is in the light-dark state, the element 608*b* is in the light-dark state, and the element 608*c* is in the dark-light state.

Figure 6B:
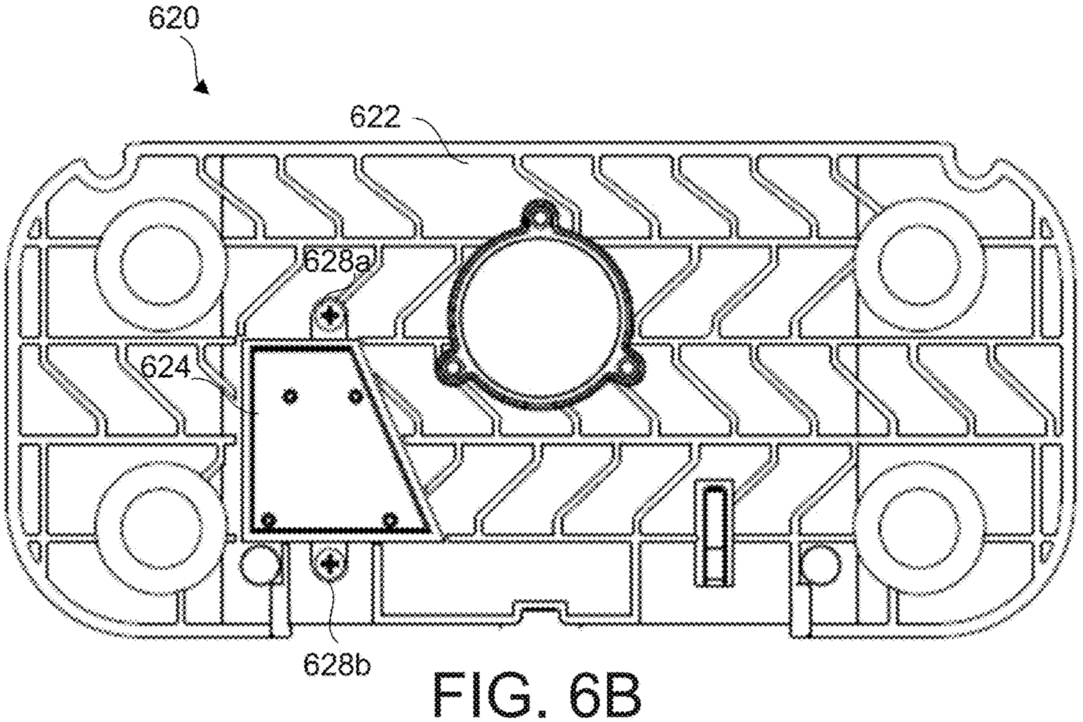
FIG. 6B is a top view of a pad attachment mechanism having a first pad identification reader.
Figure 6C:
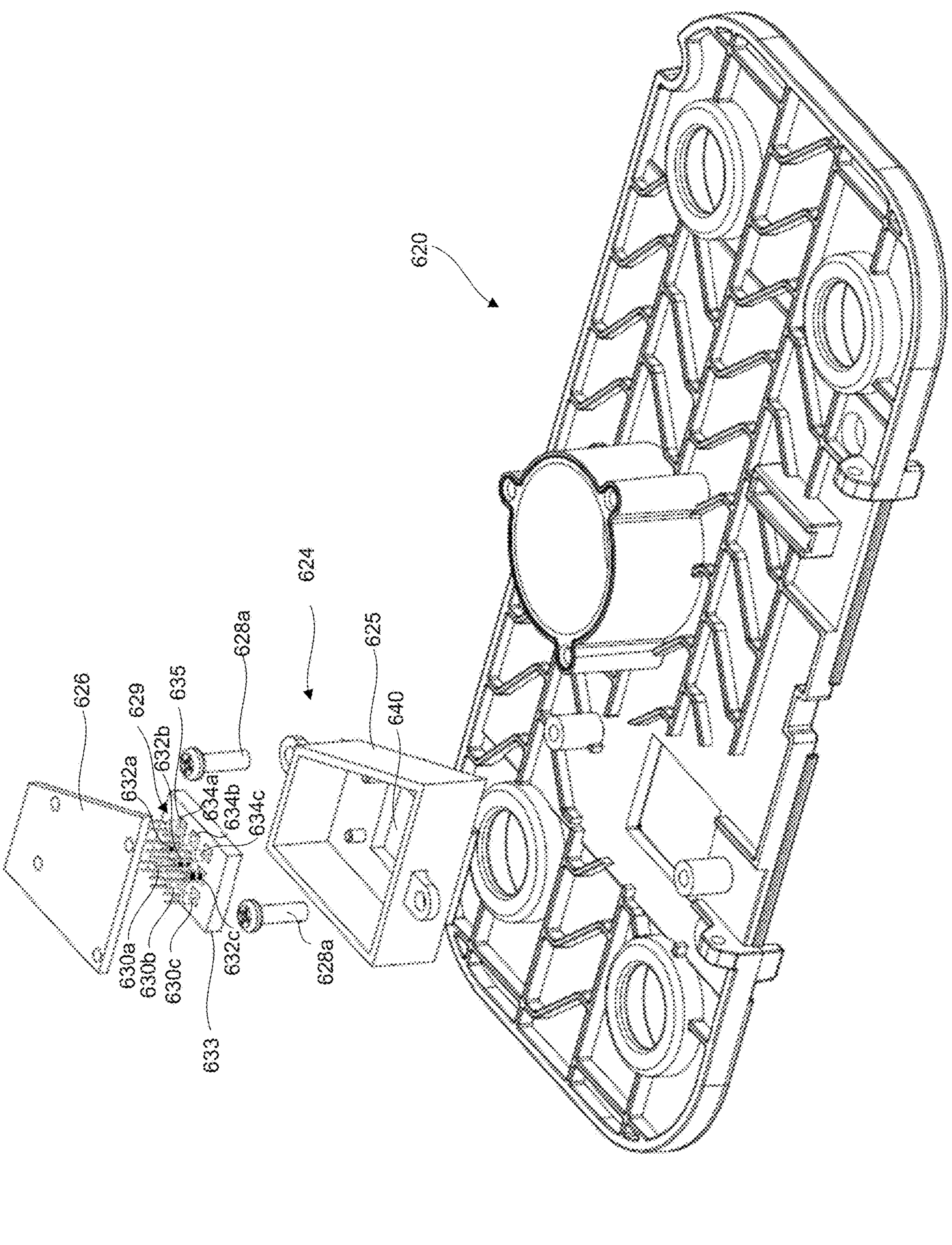
FIG. 6C is an exploded view of the pad attachment mechanism of FIG. 6B.

In the implementation as currently described with respect to FIGS. 6A-6C, the light-light state can be reserved as an error state that the robot controller 505 uses to determine if the cleaning pad 600 has been correctly installed on the robot 100 and to determine if the pad 600 has translated relative to the robot 100. For example, in some cases, during use, the cleaning pad 600 may move horizontally as the robot 100 turns. If the robot 100 detects the color of the card backing 606 instead of the identification sequence 603, the robot 100 can interpret such a detection to mean that the cleaning pad 600 has translated along the pad holder such that the cleaning pad 600 is no longer properly loaded into the pad holder. The dark-dark state is also not used in the implementation described below, to allow the robot to implement an identification algorithm that simply compares the reflectivity of the left block 610*a*-610*c* to the reflectivity of the right block 612*a*-612*c* to determine the state of the element 608*a*-608*c*. For purposes of identifying a cleaning pad using the comparison-based identification algorithm, the elements 610*a*-610*c* serve as bits that can be in one of two states: the light-dark state and the dark-light state. Including the error states and the dark-dark states, the identification sequence 603 can have one of 4^3 or 64 states. Excluding the error states and the dark-dark state, which simplifies the identification algorithm as will be described below, the elements 610*a*-610*c* have two states and the identification sequence 603 can therefore have one of 2^3 or 8 states.

Referring to FIG. 6B, the robot can include a pad holder 620 having a pad holder body 622 and a pad sensor assembly 624 used to detect the identification sequence 603 and to determine the state of the identification sequence 603. The pad holder 620 retains the cleaning pad 600 of FIG. 6A (as described with respect to the pad holder 300 and the cleaning pad 120 of FIGS. 2A-2C and 3A-3D). Referring to FIG. 6C, the pad holder 620 includes a pad sensor assembly housing 625 that houses a printed circuit board 626. Fasteners 628*a*-628*b* join the pad sensor assembly 624 to the pad holder body 622.

The circuit board 626 is part of the pad identification system 534 (described with respect to FIG. 5) and electrically connects an emitter/detector array 629 to the controller 505. The emitter/detector array 629 includes left emitters 630*a*-630*c*, detectors 632*a*-632*c*, and right emitters 634*a*-634*c*. For each of the elements 610*a*-610*c*, a left emitter 630*a*-630*c* is positioned to illuminate the left block 610*a*-610*c* of the element 610*a*-610*c*, a right emitter 634*a*-634*c* is positioned to illuminate the right block 612*a*-612*c* of the element 610*a*-610*c*, and a detector 632*a*-632*c* is positioned to detect reflected light incident on the left blocks 610*a*-610*c* and the right blocks 612*a*-612*c*. When the controller (e.g., the controller 505 of FIG. 5) activates the left emitters 630*a*-630*c* and right emitters 634*a*-634*c*, the emitters 630*a*-630*c*, 634*a*-634*c* emit radiation at a substantially similar wavelength (e.g., 500 nm). The detectors 632*a*-632*c* detect radiation (e.g., visible light or infrared radiation) and generate signals corresponding to the illuminance of that radiation. The radiation of the emitters 630*a*-630*c*, 634*a*-634*c* can reflect off of the blocks 610*a*-610*c*, 612*a*-612*c*, and the detectors 632*a*-632*c* can detect the reflected radiation.

An alignment block 633 aligns the emitter/detector array 629 over the identification sequence 603. In particular, the alignment block 633 aligns the left emitters 630*a*-630*c* over the left blocks 610*a*-610*c*, respectively; the right emitters 634*a*-634*c* over the right blocks 612*a*-612*c*, respectively; and the detectors 632*a*-632*c* such that the detectors 632*a*-632*c* are equidistant from the left emitters 630*a*-630*c* and the right emitters 634*a*-634*c*. Windows 635 of the alignment block 633 direct radiation emitted by the emitters 630*a*-630*c*, 634*a*-634*c* toward the mounting surface 602. The windows 635 also allow the detector 632*a*-632*c* to receive radiation reflected off of the mounting surface 602. In some cases, the windows 635 are potted (e.g., using a plastic resin) to protect the emitter/detector array 629 from moisture, foreign objects (e.g., fibers from the cleaning pad), and debris. The left emitters 630*a*-630*c*, the detectors 632*a*-632*c*, and the right emitters 634*a*-634*c* are positioned along a plane defined by the alignment block such that, when the cleaning pad is disposed in the pad holder 620, the left emitters 630*a*-630*c*, the detectors 632*a*-632*c*, and the right emitters 634*a*-634*c* are equidistant from the mounting surface 602. The relative positions of the emitters 630*a*-630*c*, 634*a*-634*c* and detectors 632*a*-632*c* are selected to minimize the variations in the distance of the emitters and the detectors from the left and right blocks 610*a*-610*c*, 612*a*-612*c*, such that distance minimally affects the measured illuminance of radiation reflected by the blocks. As a result, the darkness of the ink applied for the dark state of the blocks 610-610*c*, 612*a*-612*c* and the natural color of the card backing 606 are the main factors affecting the reflectivity of each block 610*a*-610*c*, 612*a*-612*c*.

While the detectors 632*a*-632*c* have been described to be equidistant from the left emitters 630*a*-630*c* and the right emitters 634*a*-634*c*, it should be understood that the detectors can also or alternatively be positioned such that the detectors are equidistant from the left blocks and the right blocks. For example, a detector can be placed such that the distance from the detector to a right edge of the left block is the same as the distance to a left edge of the right block.

Referring also to FIG. 6A, the pad sensor assembly housing 625 defines a detection window 640 that aligns the pad sensor assembly 624 directly above the identification sequence 603 when the cleaning pad 600 is inserted into the pad holder 620. The detection window 640 allows radiation generated by the emitters 630*a*-630*c*, 634*a*-634*c* to illuminate the identification elements 608*a*-608*c* of the identification sequence 603. The detection window 640 also allows the detectors 632*a*-632*c* to detect the radiation as it reflects off of the elements 608*a*-608*c*. The detection window 640 can be sized and shaped to accept the alignment block 633 so that, when the cleaning pad 600 is loaded into the pad holder 620, the emitter/detector array 629 sits closely to the card backing 606 of the cleaning pad 600. Each emitter 630*a*-630*c*, 634*a*-634*c* can sit directly above one of the left or right blocks 610*a*-610*c*, 612*a*-612*c*.

During use, the detectors 632*a*-632*c* can determine an illuminance of the reflection of the radiation generated by the emitters 630*a*-630*c*, 634*a*-634*c*. The radiation incident on the left blocks 610*a*-610*c* and the right blocks 612*a*-612*c* reflects toward the detectors 632*a*-632*c*, which in turn generates a signal (e.g., a change in current or voltage) that the controller can process and use to determine the illuminance of the reflected radiation. The controller can independently activate the emitters 630*a*-630*c*, 634*a*-634*c*.

After a user has inserted the cleaning pad 600 into the pad holder 620, the controller of the robot determines the type of pad that has been inserted into the pad holder 620. As described earlier, the cleaning pad 600 has the identification sequence 603 and a symmetric sequence such that the cleaning pad 600 can be inserted in either horizontal orientation so long as the mounting surface 602 faces the emitter/detector array 629. When the cleaning pad 600 is inserted into the pad holder 620, the card backing 606 can wipe the alignment block 633 of moisture, foreign matter, and debris. The identification sequence 603 provides information pertaining to the type of inserted pad based on the states of the elements 608*a*-608*c*. The memory 560 typically is preloaded with data that associates each possible state of the identification sequence 603 with a specific cleaning pad type. For example, the memory 560 can associate the three-element identification sequence having the state (dark-light, dark-light, light-dark) with a damp mopping cleaning pad. Referring briefly back to TABLE 1, the robot 100 would respond by selecting the navigational behavior and spraying schedule based on the stored cleaning mode associated with the damp mopping cleaning pad.

Figure 6D:
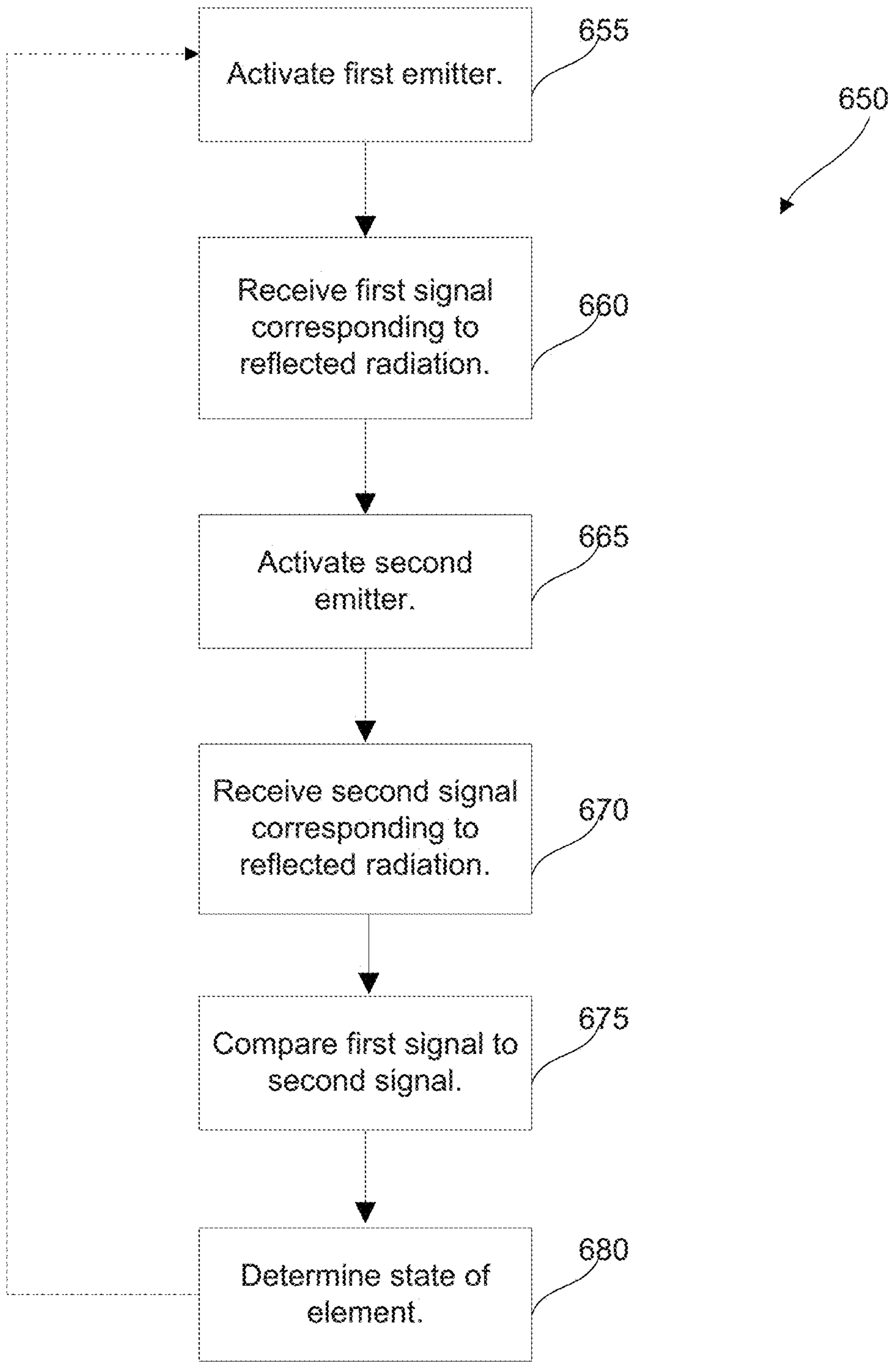
FIG. 6D is a flowchart of a pad identification algorithm used to determine a type of the cleaning pad attached to the exemplary attachment mechanism of FIG. 6B.

Referring also to FIG. 6D, the controller initiates an identification sequence algorithm 650 to detect and process the information provided by the identification sequence 603. At step 655, the controller activates the left emitter 630*a*, which emits radiation directed towards the left block 610*a*. The radiation reflects off of the left block 610*a*. At step 660, the controller receives a first signal generated by the detector 632*a*. The controller activates the left emitter 630*a* for a duration of time (e.g., 10 ms, 20 ms, or more) that allows the detector 632*a* to detect the illuminance of the reflected radiation. The detector 632*a* detects the reflected radiation and generates the first signal whose strength corresponds to the illuminance of the reflected radiation from the left emitter 630*a*. The first signal therefore measures the reflectivity of the left block 610*a* and the illuminance of the radiation reflected off of the left block 610*a*. In some cases, a greater detected illuminance generates a stronger signal. The signal is delivered to the controller, which determines an absolute value for the illuminance that is proportional to the strength of the first signal. The controller deactivates the left emitter 630*a* after it receives the first signal.

At step 665, the controller activates the right emitter 634*a*, which emits radiation directed towards the right block 612*a*. The radiation reflects off of the right block 612*a*. At step 670, the controller receives a second signal generated by the detector 632*a*. The controller activates the right emitter 634*a* for a duration of time that allows the detector 632*a* to detect the illuminance of the reflected radiation. The detector 632*a* detects the reflected radiation and generates the second signal whose strength corresponds to the illuminance of the reflected radiation from the right emitter 634*a*. The second signal therefore measures the reflectivity of the right block 612*a* and the illuminance of the radiation reflected off of the right block 612*a*. In some cases, a greater illuminance generates a stronger signal. The signal is delivered to the controller, which determines an absolute value for the illuminance that is proportional to the strength of the second signal. The controller deactivates the right emitter 634*a* after it receives the second signal.

At step 675, the controller compares the measured reflectivity of the left block 610*a* to the measured reflectivity of the right block 612*a*. If the first signal indicates a greater illuminance for the reflected radiation, the controller determines that left block 610*a* was in the light state and that the right block 612*a* was in the dark state. At step 680, the controller determines the state of the element. In the example described above, the controller would determine that the element 608*a* is in the light-dark state. If the first signal indicates a smaller illuminance for the reflected radiation, the controller determines that the left block 610*a* was in the dark state and that the right block 612*a* was in the light state. As a result, the element 608*a* is in the dark-light state. Because the controller simply compares the absolute values of the measured reflectivity values of the blocks 610*a*, 612*a*, the determination of the state of the element 608*a*-608*c* is protected against, for example, slight variations in the darkness of the ink applied to blocks set in the dark state and slight variations in the alignment of the emitter/detector array 629 and the identification sequence 603.

To determine that the left block 610*a* and the right block 612*a* have different reflectivity values, the first signal and the second signal differ by a threshold value that indicates that the reflectivity of the left block 610*a* and the reflectivity of the right block 612*a* are sufficiently different for the controller to conclude that one block is in the dark state and the other block is in the light state. The threshold value can be based on the predicted reflectivity of the blocks in the dark state and the predicted reflectivity of the blocks in the light state. The threshold value can further account for ambient light conditions. The dark ink that defines the dark state of the blocks 610*a*-610*c*, 612*a*-612*c* can be selected to provide a sufficient contrast between the dark state and the light state, which can be defined by the color of the card backing 606. In some cases, the controller may determine that the first and the second signal are not sufficiently different to make a conclusion that the element 608*a*-608*c* is in the light-dark state or the dark-light state. The controller can be programmed to recognize these errors by interpreting an inconclusive comparison (as described above) as an error state. For example, the cleaning pad 600 may not be properly loaded, or the cleaning pad 600 may be sliding off of the pad holder 620 such that the identification sequence 603 is not properly aligned with the emitter/detector array 629. Upon detecting that the cleaning pad 600 has slid off of the pad holder 620, the controller can cease the cleaning operation or indicate to the user that the cleaning pad 600 is sliding off of the pad holder 620. In one example, the robot 100 can make an alert (e.g., an audible alert, a visual alert) that indicates the cleaning pad 600 is sliding off. In some cases, the controller can check that the cleaning pad 600 is still properly loaded on the pad holder 620 periodically (e.g., 10 ms, 100 ms, 1 second, etc.). As a result, the reflected radiation received by the detectors 632*a*-632*c* may have generate similar measured values for illuminance because both the left and right emitters 630*a*-630*c*, 634*a*-634*c* are simply illuminating portions of the card backing 606 without ink.

After performing steps 655, 660, 665, 670, and 675, the controller can repeat the steps for the element 608*b* and the element 608*c* to determine the state of each element. After completing these steps for all of the elements of the identification sequence 603, the controller can determine the state of the identification sequence 603 and from that state determine either (i) the type of cleaning pad that has been inserted into the pad holder 620 or (ii) that a cleaning pad error has occurred. While the robot 100 executes a cleaning operation, the controller can also continuously repeat the identification sequence algorithms 650 to make sure that the cleaning pad 600 has not shifted from its desired position on the pad holder 620.

It should be understood that the order in which the controller determines the reflectivity of each block 610*a*-610*c*, 612*a*-612*c* can vary. In some cases, instead of repeating the steps 655, 660, 665, 670, and 675 for each element 608*a*-608*c*, the controller can simultaneously activate all of the left emitters; receive the first signals generated by the detectors, simultaneously activate all of the right emitters; receive the second signals generated by the detectors; and then compare the first signals with the second signals. In other implementations, the controller sequentially illuminates each of the left blocks and then sequentially illuminates each of the right blocks. The controller can make a comparison of the left blocks with the right blocks after receiving the signals corresponding to each of the blocks.

The emitters and detectors can further be configured to be sensitive to other wavelengths of radiation inside or outside of visible light range (e.g., 400 nm to 700 nm). For example, the emitters can emit radiation in the ultraviolet (e.g., 300 nm to 400 nm) or far infrared range (e.g., 15 micrometers to 1 mm), and the detectors can be responsive to radiation in a similar range.

While the card backing 606 of FIG. 6A has been described to include markings to form the identification sequence 603, in some implementations, a marking formed on a wrap layer of a cleaning pad is visible through a card backing of a cleaning pad. The mounting plate of the cleaning pad provides an identification sequence and enables access for the pad sensor to detect the marking on the wrap layer. Cutouts or transparent portions on the card backing enable the pad sensor to detect the marking and define locations of blocks of the identification sequence. The mounting plate, in conjunction with the marking on the wrap layers, defines the identification sequence. During manufacturing, the cutouts are formed in the card backing within expected potential locations of the blocks that define the identification sequence unique for the type of the cleaning pad.

Figure 10:
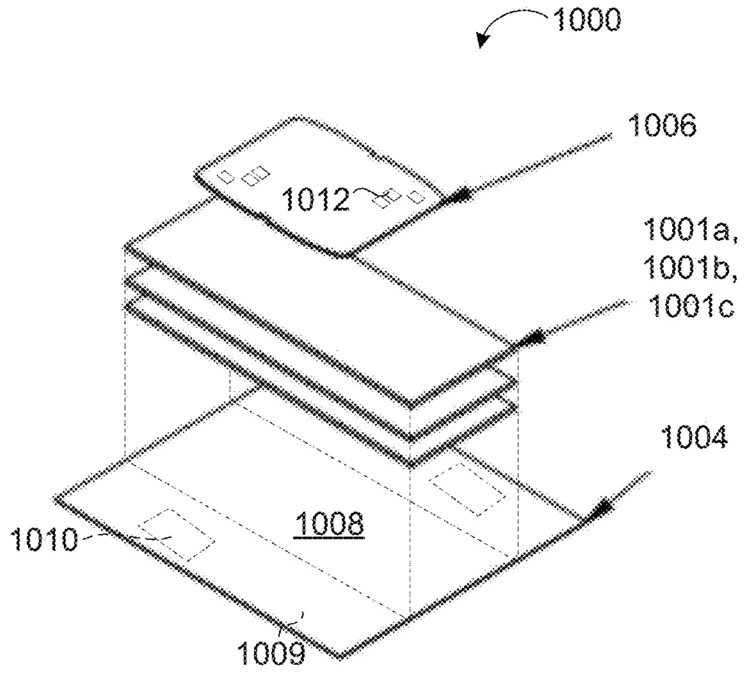
FIG. 10 is an exploded perspective view of a cleaning pad including an identification sequence.

As shown in FIG. 10, which shows an exploded view of a cleaning pad 1000, the cleaning pad 1000 includes absorptive layers 1001*a*, 1001*b*, 1001*c*, a wrap layer 1004, and a card backing 1006. The wrap layer 1004 and the absorptive layers 1001*a*, 1001*b*, 1001*c*, together, form a pad body of the cleaning pad 1000. Material properties of the absorptive layers 1001*a*, 1001*b*, 1001*c*, the wrap layer 1004, and the card backing 1006 are similar to the properties of the absorptive layers 201*a*, 201*b*, 201*c*, the wrap layer 204, and the card backing 206, respectively, described with respect to FIG. 2B.

As described herein, the wrap layer 1004 is a sheet structure of non-woven, porous material that includes an inner surface 1008 and an outer surface 1009 opposite to the inner surface 1008. During a cleaning operation in which a robot holds the cleaning pad 1000 while the robot traverses a floor surface, the outer surface 1009 of the wrap layer 1004 contacts the floor surface. The inner surface 1008 of the wrap layer 1004, visible in FIG. 10, faces the absorptive layers 1001*a*, 1001*b*, 1001*c* when the cleaning pad 1000 is assembled. The inner surface 1008 does not directly contact the floor surface during the cleaning operation. The outer surface 1009 of the wrap layer 1004, which is not visible in FIG. 10, faces away from the absorptive layers 1001*a*, 1001*b*, 1001*c* when the cleaning pad 1000 is assembled. The outer surface 1009 of the wrap layer 1004 serves as an external surface of the pad body that covers internal components of the pad body, such as the absorptive layers 1001*a*, 1001*b*, 1001*c*. In some implementations, when the outer surface 1009 contacts cleaning fluid on the floor surface, the cleaning fluid absorbs through the wrap layer 1004 from the outer surface 1009 to the inner surface 1008 and then into the absorptive layers 1001*a*, 1001*b*, 1001*c* facing the inner surface 1008.

The wrap layer 1004 includes a marking 1010. The marking 1010, as shown in FIG. 10, is positioned on the outer surface 1009 of the wrap layer 1004. After the cleaning pad 1000 is assembled, the marking 1010 faces the card backing 1006. To form the marking 1010, a portion of the wrap layer 1004 is marked by, for example, depositing ink in the portion or adhering colored paper or fibers to the portion. The marking 1010 is formed by, for example, an ink that does not diffuse through the wrap layer 1004 and the absorptive layers 1001*a*, 1001*b*, 1001*c* due to, for example, absorption of fluid through the wrap layer 1004 and the absorptive layers 1001*a*, 1001*b*, 1001*c*.

Because the marking 1010 faces the card backing 1006, cutouts 1012 on the card backing 1006 cause portions of the marking 1010 to be visible through the card backing 1006. The marking 1010 on the outer surface 1009 cooperates with the cutouts 1012 on the card backing 1006 to define an identification sequence. This identification sequence, similar to the identification sequence 603 of FIG. 6A, uniquely identifies a type of the cleaning pad 1000. During fabrication of the cleaning pad 1000, the marking 1010 is formed (e.g., deposited or printed) directly on the wrap layer 1004. The marking 1010 is localized to a region of the wrap layer 1004 underlying the expected potential locations for cutouts 1012 on the card backing 1006 (e.g., the expected locations for blocks of the identification sequence). Presence of the cutouts 1012 allows portions of the marking 1010 to be visible through the card backing 1006, while absence of the cutouts 1012 prevents other portions of the marking 1010 from being visible through the card backing 1006.

The cutouts 1012 are formed by portions of the card backing 1006 that are, for example, cut out or punched out during manufacturing. During manufacture of the cleaning pad 1000, the position and the number of cutouts 1012 on the card backing 1006 are selected such that the cutouts 1012 define an identification sequence unique to the type of the cleaning pad 1000. In contrast to the cleaning pad 600 in which the card backing 606 includes ink or other markings to form the identification sequence 603, the card backing 1006 of the cleaning pad 1000 does not include a printed marking to form the identification sequence. Rather, the card backing 1006 includes the cutouts 1012 to allow portions of the marking 1010 on the outer surface 1009 of the wrap layer 1004 to be visible through the card backing 1006 where the cutouts 1012 are located. The card backing 1006 and the cutouts 1012 enable a pad sensor (e.g., the pad sensor assembly 624) of the robot to detect a pattern of differently shaded or colored markings. That pattern is defined by the locations and number of cutouts 1012. The cutouts 1012 provide windows that define the identification sequence and enable the pad sensor to detect the marking 1010 at specific regions beneath a detection window (e.g., the detection window 640) of the pad sensor.

The marking 1010 itself does not define the identification sequence. Rather, the cutouts 1012 and the marking 1010 together define the identification sequence. Any combination of cutouts 1012 made on the card backing 1006 reveals portions of the marking 1010 to form the identification sequence unique to the type of the cleaning pad 1000. The cutouts 1012 allow the underlying marking 1010 to reflect radiation emitted by the pad sensor, and the non-cutout portions allow the card backing 1006 itself to reflect radiation emitted by the pad sensor.

In some examples, when the marking 1010 is visible through the card backing 1006 due to the presence of a cutout, the cutout defines a block of the identification sequence in a dark state. When the marking 1010 is not visible through the card backing 1006 due to absence of a cutout (e.g., presence of non-cutout portions), the card backing 1006 defines a block of the identification sequence in a light state. A combination of the cutouts 1012 and non-cutout portions form the pattern of differently colored or shaded markings. This combination also defines the identification sequence.

During manufacture of the cleaning pad 1000, in some cases, the marking 1010 is placed onto the wrap layer 1004 after the wrap layer 1004 is wrapped around the absorptive layers 1001*a*, 1001*b*, 1001*c*. When the ink forms the marking 1010 on the wrap layer 1004, the marking 1010 may be visible on both an inner surface of the wrap layer 1004 and an outer surface of the wrap layer 1004 or is visible only on the outer surface 1009 of the wrap layer 1004. When the wrap layer 1004 is wrapped around the absorptive layers 1001*a*, 1001*b*, 1001*c*, the marking 1010 is visible on the external surface of the pad body. The marking 1010 is detectable by optical sensors (e.g., the emitter/detector array 629) if the cutouts 1012 align with the marking 1010 so that the marking 1010 is visible through the cutouts 1012 in the card backing 1006.

A manufacturing process for the cleaning pad 1000 includes operations to define the marking 1010 on the wrap layer 1004 and to form the cutouts 1012 on the card backing 1006. In some implementations, the marking 1010 is formed using printing operations not specific to the type of the cleaning pad, while the card backing 1006 is fabricated using operations specific to the type of the cleaning pad. In an example of this manufacturing process, to define the marking 1010, ink or another appropriate marking is grossly deposited on the wrap layer 1004 in a portion that would be positioned generally beneath the pad sensor when the cleaning pad 1000 is held by a pad holder (e.g., the pad holder 620) of the robot. Alignment required for printing on the pad can be minimal since the marking 1010 does not define the pattern of the identification sequence. A larger spot of ink can be dispensed to form the marking 1010, and the operation to dispense the ink need not be precise. In this manufacturing process, ink or other markings do not need to be placed directly on the card backing 1006, which, in some cases, can be a water resistant surface.

To fabricate the card backing 1006, the cutouts 1012 and the card backing 1006 are formed, for example, in a single operation in which the card backing 1006 and its corresponding cutouts 1012 are removed from cardstock. This operation defines the shape of the card backing 1006 as well as the position of the cutouts 1012 along the card backing 1006. This single operation reduces alignment discrepancies that can occur between the card backing 1006 (e.g., edges of the card backing 1006) and the identification sequence. The alignment discrepancies can manifest during manufacturing operations that separately fabricate the card backing 1006 and define the identification sequence.

If the identification sequence is printed directly on the card backing, a special alignment process can be used to align the printing to the edges of the card backing. In the case of the card backing 1006 and the cutouts 1012, this special alignment process is not necessary because the card backing 1006 and the cutouts 1012 are formed in a single stamping operation. By forming the shape of the card backing and forming the cutouts in a single operation, the cutouts are aligned with the edges of the backing without the need for the special alignment process as would be needed if the pattern was formed using separate processes, for example, if the pattern was printed on the card backing after the card backing was first stamped out from the card stock.

Figure 11:
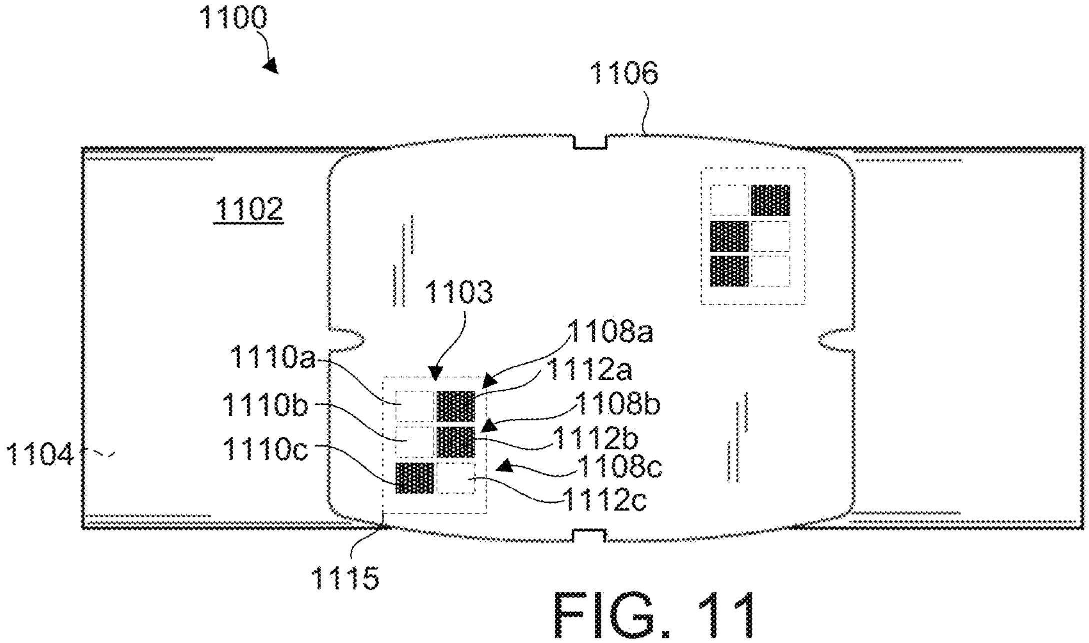
FIG. 11 is a top view of a cleaning pad including an identification sequence.

As described herein, in contrast with the identification sequence 603 formed by a marking directly dispensed on the card backing 606, an identification sequence 1103, as shown in FIG. 11 is defined by a marking 1115 and cutouts on a card backing 1106. As shown in FIG. 11, cleaning pad 1100—for example, fabricated using components similar to those described with respect to the cleaning pad 1000 of FIG. 10—includes a mounting surface 1102, a cleaning surface 1104, and the card backing 1106. The outer surface of the pad body of the cleaning pad 1100 defines the mounting surface 1102 and the cleaning surface 1104. When the cleaning pad 1100 is held by a robot, the mounting surface 1102 faces the robot while the cleaning surface 1104 faces opposite the robot. During a cleaning operation in which the robot navigates about a floor surface, the cleaning surface 1104 faces the floor surface. Marking 1115 dispensed on a wrap layer of the cleaning pad 1100 and positioned on the mounting surface 1102 is selectively visible or detectable through cutouts of the card backing 1106 to form identification sequence 1103 that the robot detects to identify the type of cleaning pad that the user has mounted onto the robot. The marking 1115 is directly on the mounting surface 1102 of the pad body, and the cutouts of the card backing 1106 reveal the marking 1115 such that the marking 1115 is detectable by the pad sensor of the robot when the cleaning pad 1000 is held by the pad holder.

Similar to and as described with respect to the identification sequence 603, the identification sequence 1103 includes identification elements 1108*a*-1108*c*, which each include a right block 1112*a*-1112*c* and a left block 1110*a*-1110*c*. As described herein, the blocks 1110*a*-1110*c*, 1112*a*-1112*c* are in one of two states: a dark state or a light state. In some implementations, the dark state of the blocks corresponds to detection of ink and the light state corresponds to detection of the card backing 1106.

Each of the left blocks 1110*a*-1110*c* and each of the right blocks 1112*a*-1112*c* are set (e.g., during manufacturing) to the dark or the light state. The state of each block is in the dark state or the light state is based on detectability of the marking 1115 in the area of the block. Blocks 1110*a*-1110*c*, 1112*a*-1112*c* in the dark state are defined by the presence of a cutout on the card backing 1106, while blocks 1110*a*-1110*c*, 1112*a*-1112*c* in the light state are defined by the absence of a cutout on the card backing 1106. In other words, the marking 1115 and the cutouts of the card backing 1106 define the dark state for the blocks 1110*a*-1110*c*, 1112*a*-1112*c*, while the card backing 1106 itself defines the light state. The marking 1115 is, for example, a dark ink or a light ink that colors the wrap layer and the mounting surface 1102 such that the natural color of the card backing 1106 contrasts with the marking 1115.

In FIG. 11, the right block 1112*a*, the right block 1112*b*, and the left block 1110*c* are in the dark state. Cutouts on the card backing 1106 are located in positions corresponding to these blocks so that the marking 1115 is visible through the card backing 1106. In contrast, the left block 1110*a*, the left block 1110*b*, and the right block 1112*c* are in the light state. The card backing 1106 does not include cutouts at the locations of these blocks so that the marking 1115 is not visible through the card backing 1106. Rather, the card backing 1106 is located at positions corresponding to these blocks in the light state.

The marking 1115 occupies a region beneath the blocks 1110*a*-1110*c*, 1112*a*-1112*c* such that the marking 1115 fills the entirety of each of the blocks 1110-1110*c*, 1112*a*-1112*c*. The marking 1115 is only visible in the blocks 1110*a*-1110*c*, 1112*a*-1112*c* that also correspond to locations of the cutouts on the card backing 1106. The marking 1115 occupies an area that extends past the outer perimeters of the blocks 1110*a*-1110*c*, 1112*a*-1112*c* such that the marking 1115 underlies any expected potential locations for cutouts.

Referring back to FIG. 6C, the pad sensor assembly 624 of the robot used to detect the identification sequence 1103 can be similarly used to detect the identification sequence 1103 of FIG. 11. When the cleaning pad 1100 is inserted into the pad holder 620, the cutouts and hence the identification sequence 1103 are positioned beneath the pad sensor assembly 624 so that radiation emitted by the emitter 630*a*-630*c*, 634*a*-634*c* travels through the windows 635, illuminates and reflects off the underlying surface of the wrap layer of the cleaning pad 1100. After the user has inserted the cleaning pad 1100 into the pad holder 620, the controller of the robot determines the type of pad that has been inserted into the pad holder 620 using the identification sequence process described herein.

In some cases, the marking 1115 extends beyond a perimeter of the identification elements 1108*a*-1108*c* such that the marking 1115 occupies an area greater than an area of the identification sequence or individual blocks of the identification sequence (e.g., 5% to 25% greater than the area of the identification sequence). An area of the identification sequence corresponds to an area along the cleaning pad 1000 (e.g., along the card backing 1006) in which the pad sensor detects the blocks of the identification sequence. The area of the identification sequence includes expected potential locations for the cutouts 1012 corresponding to the blocks (e.g., in either a dark state or a light state) of the identification sequence. The area of the identification sequence, in some examples, is equal to the area of the detection window. In some cases, the area of the identification sequence is, for example, 1 times to 1.5 times, 1.5 times to 2 times, or 2 times to 3 times greater than the area of the detection window.

In some implementations, the marking 1115 occupies an area having a size of, for example, 100% to 150%, 110% to 125%, 125% to 150%, 150% to 200%, or 200% to 250% of the area of the identification sequence 1103 or the area of the blocks of the identification sequence. In some implementations, the marking 1010 occupies an area between, for example, 2 square centimeters and 4 square centimeters or 2 square centimeters and 6 square centimeters. Each marking 1010, in some cases, occupies an area proportional to the area of the card backing 1006, such as, for example, 10% to 25% or 25% to 50% of the area of the card backing 1006. In some examples, the area of the marking 1115 corresponds to the area of the detection window of the pad sensor. The size of the cutouts are sufficiently large to allow the detectors 632*a*-632*c* to detect radiation reflected off of the marking 1115 through the detection window. The marking 1115 occupies an area that is, for example, 100% to 150%, 110% to 125%, 125% to 150%, 150% to 200%, or 200% to 250% of the area of the detection window. The cutouts, in some examples, are square or rectangular and have a width of about 3 mm to 5 mm.

The dark state and the light state have different reflectivities such that the pad sensor detects a difference between the dark state and the light state. For example, the dark state may be 20%, 30%, 40%, 50%, etc., less reflective than the light state. The reflectivity of the dark state depends on the reflectivity of the marking 1115, while the reflectivity of the light state depends on the reflectivity of the card backing 1106. For a block of the identification sequence to have the lesser reflectivity in the dark state than in the light state, the marking 1115 includes darker inks or marks that reduce the reflectivity of the block in the dark state as compared to the reflectivity of the block in the light state.

In some cases, the marking 1115 is lighter than the card backing 1106. Detection of the marking 1115, in these cases, indicates the light state for the block, while detection of the card backing 1106 indicates the dark state for the block.

In some implementations, the wrap layer has a different reflectivity than the card backing 1106. The wrap layer itself contrasts with the card backing 1106 and no additional ink is needed on the wrap layer to form the marking 1115 on the mounting surface 1102. The card backing 1106 is, for example, 20% to 50%, 50% to 100%, or 100% to 150% more reflective than the wrap layer (or vice versa). The wrap layer itself serves as a marking that is less reflective than the card backing 1106. Detection of the wrap layer indicates the dark state for the block, and detection of the card backing 1106 indicates the light state for the block.

FIG. 11 shows each of the blocks of the identification sequence 1103 as a rectangular portion formed by the cutouts on the card backing 1106, though in other implementations, the portion can be circular, elliptical, rectangular, square, or other appropriate shape that provides a sufficient area for detection by the optical sensor of the robot (e.g., the emitter/detector array 629 of FIG. 6C) to detect the identification sequence 1103. While cutouts 1012 are described to define each block of the identification sequence, in some implementations, a single cutout forms a shape that includes each of the blocks of the identification sequence.

While FIGS. 10 and 11 show two markings for the two identification sequences on the cleaning pad, in some cases, a single marking is deposited across a larger portion of the wrap layer such that the marking defines both identification sequences. The single marking occupies an area between 30 square centimeters and 60 square centimeters, or more. The single marking, in some examples, is disposed in an area that has a size of 75% to 125% of the area of the card backing.

Colored Identification Mark

Figure 7A:
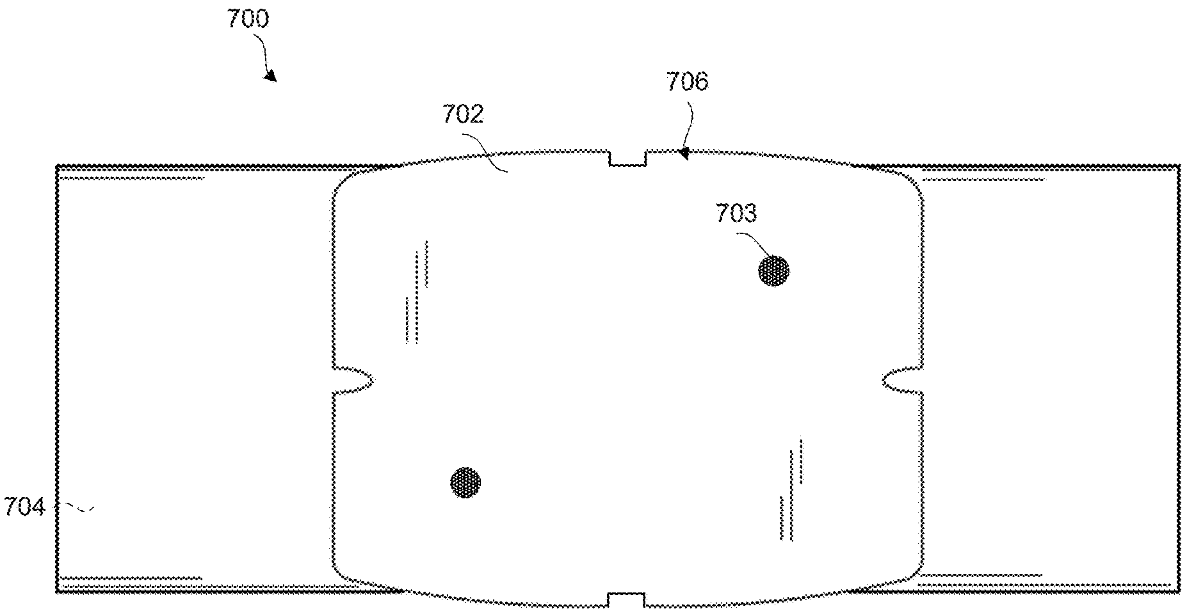
FIG. 7A is a top view of a cleaning pad with a second pad identification feature.

Referring to FIG. 7A, cleaning pad 700 includes a mounting surface 702 and a cleaning surface 704, and a card backing 706. Pad 700 is essentially identical to the pad described above, but for a different identification mark. Card backing 706 includes a monochromatic identification mark 703. Card backing 706 is disposed on the mounting surface 702 of the cleaning pad 700. The identification mark 703 is replicated symmetrically about the longitudinal and horizontal axes so that a user can insert the cleaning pad 700 into the robot 100 in either horizontal orientation.

The identification mark 703 is a sensible portion of the card backing 706 that the robot can use to identify the type of cleaning pad that the user has mounted onto the robot. The identification mark 703 is created on the card backing 706 by marking the card backing 706 with a colored ink (e.g., during fabrication of the cleaning pad 700). The colored ink can be one of several colors used to uniquely identify different types of cleaning pads. As a result, the controller of the robot can use the identification mark 703 to identify the type of the cleaning pad 700. FIG. 7A shows the identification mark 703 as a circular dot of ink deposited on the card backing 706. While the identification mark 703 has been described as monochromatic, in other implementations, the identification mark 703 can include patterned dots of a different chromaticity. The identification mark 703 can include other types of pattern that can differentiate the chromaticity, reflectivity, or other optical features of the identification mark 703.

Figure 7B:
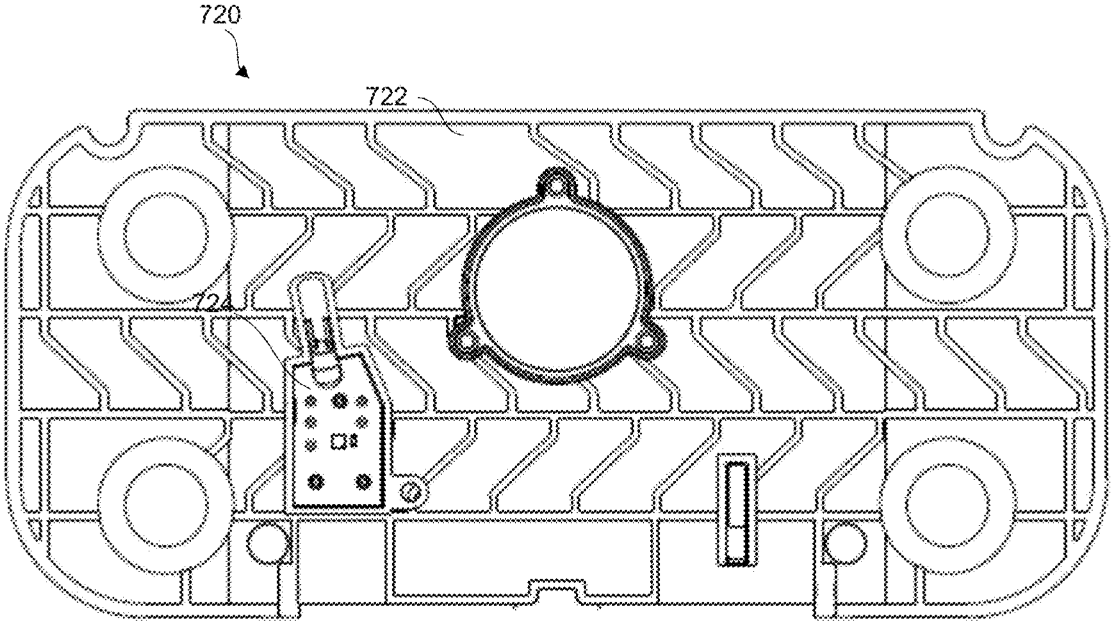
FIG. 7B is a top view of a pad attachment mechanism with a second pad identification reader.
Figure 7C:
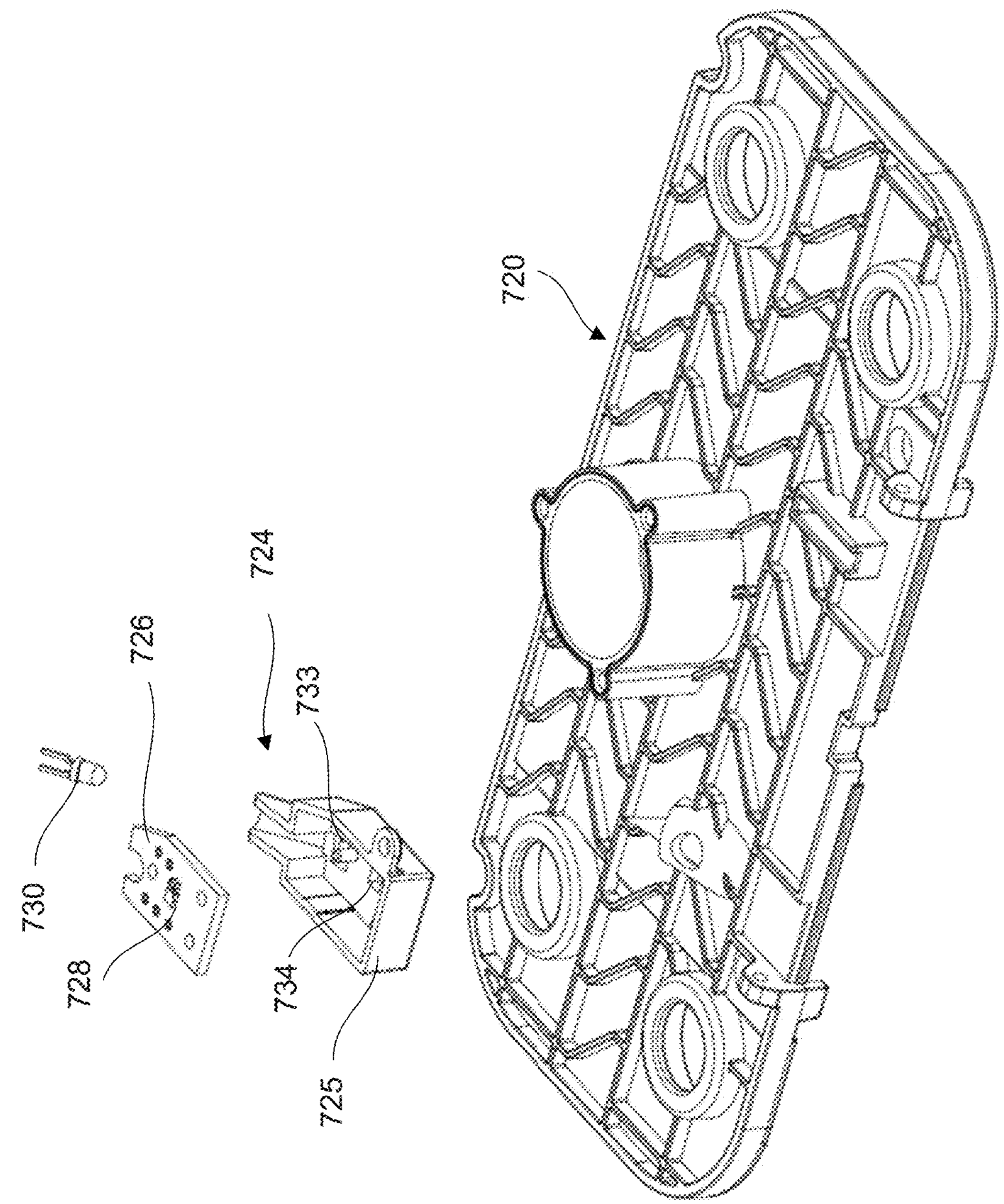
FIG. 7C is an exploded view of the pad attachment mechanism of FIG. 7B.

Referring to FIGS. 7B and 7C, the robot can include a pad holder 720 having a pad holder body 722 and a pad sensor assembly 724 used to detect the identification mark 703. The pad holder 720 retains the cleaning pad 700 (as described with respect to the pad holder 300 of FIGS. 3A-3D). A pad sensor assembly housing 725 houses a printed circuit board 726 that includes a photodetector 728. The size of the identification mark 703 is sufficiently large to allow the photodetector 728 to detect radiation reflected off of the identification mark 703 (e.g., the identification mark has a diameter of about 5 mm to 50 mm). The housing 725 further houses an emitter 730. The circuit board 726 is part of the pad identification system 534 (described with respect to FIG. 5) and electrically connects the detector 728 and the emitter to the controller. The detector 728 is sensitive to radiation and measures the red, green, and blue components of sensed radiation. In the implementation described below, the emitter 730 can emit three different types of light. The emitter 730 can emit light in a visible light range, though it should be understood that, in other implementations, the emitter 730 can emit light in the infrared range or the ultraviolet range. For example, the emitter 730 can emit a red light at a wavelength of approximately 623 nm (e.g., between 590 nm to 720 nm), a green light at a wavelength of approximately 518 nm (e.g., between 480 nm to 600 nm), and a blue light at a wavelength of approximately 466 nm (e.g., between 400 nm to 540 nm). The detector 728 can have three separate channels, each channel sensitive in a spectral range corresponding to red, green, or blue. For example, a first channel (a red channel) can have a spectral response range sensitive to red light at a wavelength between 590 nm and 720 nm, a second channel (a green channel) can have a spectral response range sensitive green light at a wavelength between 480 nm and 600 nm, and a third channel (a blue channel) can have a spectral response range sensitive to blue light at a wavelength between 400 nm and 540 nm. Each channel of the detector 728 generates an output correspond to the amount of red, green, or blue light components in the reflected light.

The pad sensor assembly housing 725 defines an emitter window 733 and a detector window 734. The emitter 730 is aligned with the emitter window 733 such that activation of the emitter 730 causes the emitter 730 to emit radiation through the emitter window 733. The detector 728 is aligned with the detector window 734 such that the detector 728 can receive radiation passing through the detector window 734. In some cases, the windows 733, 734 are potted (e.g., using a plastic resin) to protect the emitter 730 and the detector 728 from moisture, foreign objects (e.g., fibers from the cleaning pad 700), and debris. When the cleaning pad 700 is inserted into the pad holder 720, the identification mark 703 is positioned beneath the pad sensor assembly 724 so that radiation emitted by the emitter 730 travels through the emitter window 733, illuminates the identification mark 703, and reflects off of the identification mark 703 through the detector window 734 to the detector 728.

In another implementation, the pad sensor assembly housing 725 can include additional emitter windows and detector windows for additional emitters and detectors to provide redundancy. The cleaning pad 700 can have two or more identification marks that each have a corresponding emitter and detector.

For each light emitted by the emitter 730, the channels of the detector 728 detect light reflected from the identification mark 703 and, in response to detecting the light, generate outputs correspond to the amount of red, green, and blue components of the light. The radiation incident on the identification mark 703 reflects toward the channels of the detector 728, which in turn generates a signal (e.g., a change in current or voltage) that the controller can process and use to determine the amount of red, blue, and green components of the reflected light. The detector 728 can then deliver a signal carrying the outputs of the detector. For example, the detector 728 can deliver the signal in the form of a vector (R, G, B), where the element R of the vector corresponds to the output of the red channel, the element G of the vector corresponds to the output of the green channel, and the element B of the vector corresponds to the output of the blue channel.

The number of lights emitted by the emitter 730 and the number of channels of the detector 728 determine the order of the identification of the identification mark 703. For example, two emitted light with two detecting channels allows for a fourth order identification. In another implementation, two emitted lights with three detecting channels allows for a sixth order identification. In the implementation described above, three emitted lights with three detecting channels allows for a ninth order identification. Higher order identifications are more accurate but more computationally costly. While the emitter 730 has been described to emit three different wavelengths of light, in other implementations, the number of lights that can be emitted can vary. In implementations requiring a greater confidence in classifying the color of the identification mark 703, additional wavelengths of light can be emitted and detected to improve the confidence in the color determination. In implementations requiring a faster computation and measurement time, fewer lights can be emitted and detected to reduce computational cost and the time required to make spectral response measurements of the identification mark 703. A single light source with one detector can be used to identify the identification mark 703 but can result in a greater number of misidentifications.

After a user has inserted the cleaning pad 700 into the pad holder 720, the controller of the robot determines the type of pad that has been inserted into the pad holder 720. As described above, the cleaning pad 700 can be inserted in either horizontal orientation so long as the card backing 706 faces pad sensor assembly 724. When the cleaning pad 700 is inserted into the pad holder 720, the card backing 706 can wipe the windows 733, 734 of moisture, foreign matter, and debris. The identification mark 703 provides information pertaining to the type of inserted pad based on the color of the identification mark 703.

The memory of the controller typically is pre-loaded with an index of colors corresponding to the colors of ink that are expected to be used as identification marks on the card backing 706 of the cleaning pad 700. A specific colored ink within the index of colors can have corresponding spectral response information in the form of an (R, G, B) vector for each of the colors of light emitted by the emitter 730. For example, a red ink within the index of colors can have three identifying response vectors. A first vector (a red vector) corresponds to the response of the channels of the detector 728 to red light emitted by the emitter 730 and reflected off of the red ink. A second vector (a blue vector) corresponds to the response of the channels of the detector 728 to blue light emitted by the emitter 730 and reflected off of the red ink. A third vector (a green vector) corresponds to the response of the channels of the detector 728 to green light emitted by the emitter 730 and reflected off of the red ink. Each color of ink expected to be used as identification marks on the card backing 706 of the cleaning pad 700 has a different and unique associated signature corresponding to three response vectors as described above. The response vectors can be gathered from repeated testing of specific colored inks deposited on materials similar to the material of the card backing 706. The pre-loaded colored inks in the index can be selected so that they are distant from one another along the light spectrum (e.g., purple, green, red, and black) to reduce the probability of misidentifying a color. Each pre-defined colored ink corresponds to a specific cleaning pad type.

Figure 7D:
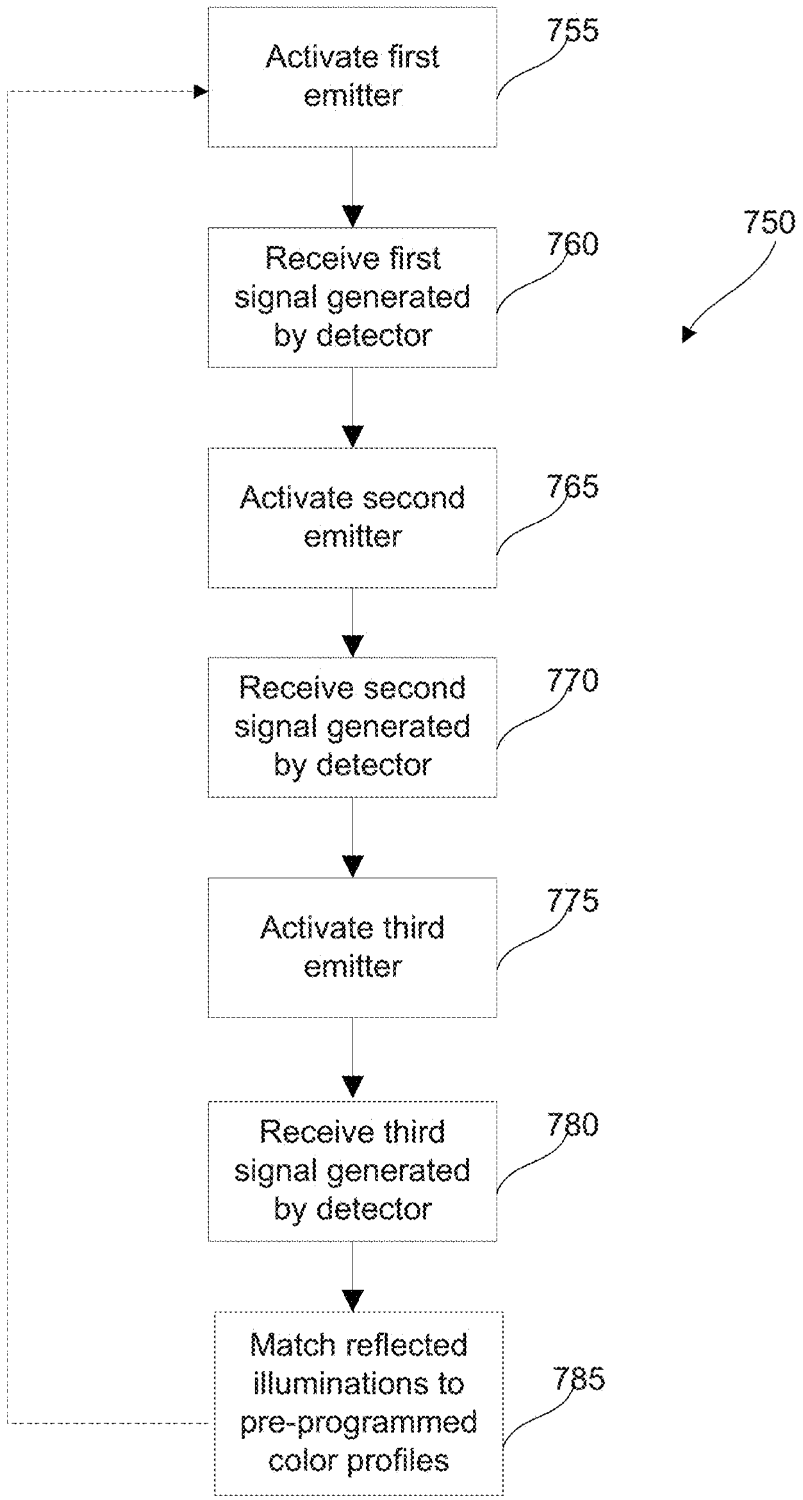
FIG. 7D is a flowchart of a pad identification algorithm used to determine a type of the cleaning pad attached to the exemplary attachment mechanism of FIG. 7B.

Referring also to FIG. 7D, the controller initiates an identification mark algorithm 750 to detect and process the information provided by the identification mark 703. At step 755, the controller activates the emitter 730 to generate a red light directed towards the identification mark 703. The red light reflects off of the identification mark 703.

At step 760, the controller receives a first signal generated by the detector 728, which includes an (R, G, B) vector measured by the three color channels of the detector 728. The three channels of the detector 728 respond to the light reflected off of the identification mark 703 and measure the red, green, and blue spectral responses. The detector 728 then generates the first signal carrying the values of these spectral responses and delivers the first signal to the control.

At step 765, the controller activates the emitter 730 to generate a green light directed towards the identification mark 703. The green light reflects off of the identification mark 703.

At step 770, the controller receives a second signal generated by the detector 728, which includes an (R, G, B) vector measured by the three color channels of the detector 728. The three channels of the detector 728 respond to the light reflected off of the identification mark 703 and measure the red, green, and blue spectral responses. The detector 728 then generates the second signal carrying the values of these spectral responses and delivers the second signal to the control.

At step, the controller 505 activates the emitter 730 to generate a blue light directed towards the identification mark 703. The blue light reflects off of the identification mark 703. At step 780, the controller receives a third signal generated by the detector 728, which includes an (R, G, B) vector measured by the three color channels of the detector 728. The three channels of the detector 728 respond to the light reflected off of the identification mark 703 and measure the red, green, and blue spectral responses. The detector 728 then generates the third signal carrying the values of these spectral responses and delivers the third signal to the controller.

At step 785, based on the three signals received by the controller in steps 760, 770, and 780, the controller generates a probabilistic match of the identification mark 703 to a colored ink within the index of colors loaded in memory. The (R, G, B) vectors identify the colored ink that define the identification mark 703, and the controller can calculate the probability that the set of three vectors corresponds to a colored ink in the index of colors. The controller can calculate the probability for all of the colored inks in the index and then rank the colored inks from highest to lowest probability. In some examples, the controller performs vector operations to normalize the signals received by the controller. In some cases, the controller computes a normalized cross product or a dot product before matching the vectors to a colored ink in the index. The controller can account for noise sources in the environment, for example, ambient light that can skew the detected optical characteristics of the identification mark 703.

In some cases, the controller can be programmed such that the controller determines and selects a color only if the probability of the highest probability colored ink exceeds a threshold probability (e.g., 50%, 55%, 60%, 65%, 70%, 75%). The threshold probability protects against errors in loading the cleaning pad 700 onto the pad holder 720 by detecting misalignment of the identification mark 703 with the pad sensor assembly 724. For example, as described above, the cleaning pad 700 can "walk off" or slide off the pad holder 720 during use and partially translate along the pad holder 720 from its loaded position, thus preventing the pad sensor assembly 724 from being able to detect the identification mark 703. If the controller computes the probabilities of the colored inks in the colored ink index and none of the probabilities exceed the threshold probability, the controller can indicate that a pad identification error has occurred. The threshold probability can be selected based on the sensitivity and precision desired for the identification mark algorithm 750. In some implementations, upon determining that none of the probabilities exceed the threshold probability, the robot generates an alert. In some cases, the alert is a visual alert, where the robot can stop in place and/or flash lights on the robot. In other cases, the alert is an audible alert, where the robot can play a verbal alert stating that the robot is experiencing an error. The audible alert can also be a sound sequence, such as an alarm.

Additionally or alternatively, the controller can compute an error for each calculated probability. If the error of the highest probability colored ink is greater than a threshold error, then the controller can indicate that a pad identification error occurred. Similar to the threshold probability described above, the threshold error protects against misalignment and loading errors of the cleaning pad 700.

The identification mark 703 is sufficiently large to be detected by the detector 728 but is sufficiently small so that the identification mark algorithm 750 indicates that a pad identification error has occurred when the cleaning pad 700 is sliding off of the pad holder 720. For example, the identification mark algorithm 750 can indicate an error if, for example, 5%, 10%, 15%, 20%, 25% of the cleaning pad 700 has slid off of the pad holder 720. In such a case, the size of the identification mark 703 can correspond to a percent of the length of the cleaning pad 700 (e.g., the identification mark 703 may have a diameter that is 1% to 10% of the length of the cleaning pad 700). While the identification mark 703 has been described and shown as of limited extent, in some cases, the identification mark can simply be a color of the card backing. The card backings may all have uniform color, and the spectral responses of the different colored card backings can be stored in the color index. In some cases, the identification mark 703 is not circularly shaped and is, instead, square, rectangular, triangular, or other shape that can be optically detected.

While the ink used to create the identification mark 703 has simply been described as colored ink, in some examples, the colored ink includes additional components that the controller can use to uniquely identify the ink and thus the cleaning pad. For example, the ink can contain fluorescent markers that fluoresce under a specific type of radiation, and the fluorescent markers can further be used to identify the pad type. The ink can also contain markers that produce a distinct phase shift in reflected radiation that the detector can detect. In this example, the controller can use the identification mark algorithm 750 as both an identification and an authentication process in which the controller can identify the type of the cleaning pad using the identification mark 703 and subsequently authenticate the type of the cleaning pad by using the fluorescent or phase shift marker.

In another implementation, the same type of colored ink is used for different types of the cleaning pads. The amount of ink varies depending on the type of the cleaning pad, the photodetector can detect an intensity of the reflected radiation to determine the type of the cleaning pad.

Figure 12:
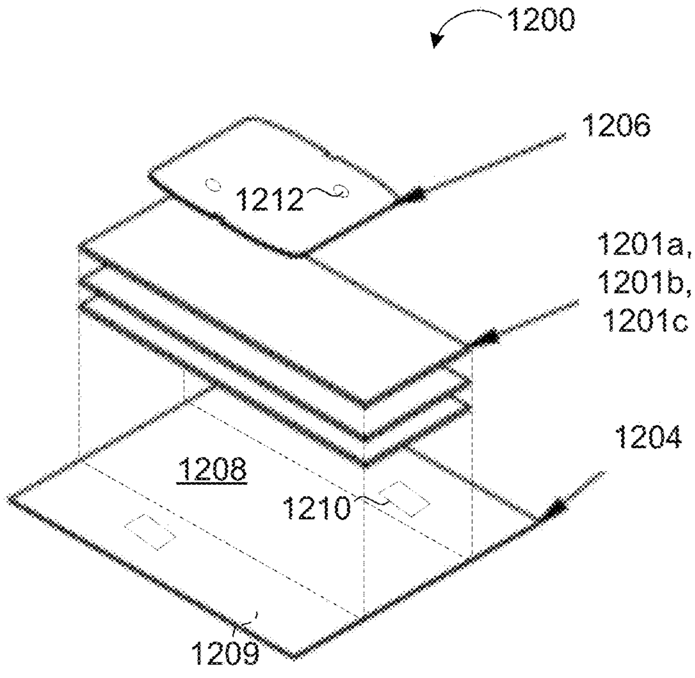
FIG. 12 is an exploded perspective view of a cleaning pad including an identification mark.

While the card backing 706 of FIG. 7A has been described to include the monochromatic identification mark 703, in some implementations, an identification mark can be directly placed on a wrap layer of a cleaning pad. As shown in FIG. 12, which is an exploded view of a cleaning pad 1200, the cleaning pad 1200 includes absorptive layers 1201*a*, 1201*b*, 1201*c*, a wrap layer 1204, and a card backing 1206.

As described herein, the wrap layer 1204 is a sheet structure of non-woven, porous material that includes an inner surface 1208 and an outer surface 1209 opposite to the inner surface 1208. Material properties of the absorptive layers 1201*a*, 1201*b*, 1201*c*, the wrap layer 1204, and the card backing 1206 can be similar to the properties of the absorptive layers 201*a*, 201*b*, 201*c*, the wrap layer 204, and the card backing 206, respectively, described with respect to FIG. 2B. During a cleaning operation in which a robot holds the cleaning pad 1200, the outer surface 1209 contacts a floor surface. The inner surface 1208 of the wrap layer 1204, visible in FIG. 12, faces the absorptive layers 1201*a*, 1201*b*, 1201*c* when the cleaning pad 1200 is assembled. The inner surface 1208 does not contact the floor surface during the cleaning operation. The outer surface 1209 of the wrap layer 1204, which is not visible in FIG. 12, faces away from the absorptive layers 1201*a*, 1201*b*, 1201*c* when the cleaning pad 1200 is assembled. The outer surface 1209 of the wrap layer 1204 serves as an external surface of the pad body that covers internal components of the pad body, such as the absorptive layers 1201*a*, 1201*b*, 1201*c*. In some implementations, after the outer surface 1209 contacts cleaning fluid on the floor surface, the cleaning fluid absorbs through the wrap layer 1204 from the outer surface 1209 to the inner surface 1208 and then into the absorptive layers 1201*a*, 1201*b*, 1201*c* facing the inner surface 1208.

The wrap layer 1204 includes a marking on the outer surface 1209 that forms a monochromatic identification mark 1210 on the wrap layer 1204. The identification mark 1210 is formed directly on the wrap layer 1204. The identification mark 1210 is, for example, an ink absorbed by the wrap layer 1204 and localized to a portion of the wrap layer 1204 such that the identification mark 1210 forms a geometric shape, such as a rectangle or a circle. The card backing 1206 includes a cutout 1212 so that the identification mark 1210 on the portion of the wrap layer 1204 occupies substantially all of the portion of the wrap layer 1204 visible through the cutout 1212 (e.g., more than 85%, 90%, 95%, 99% etc., of the portion of the wrap layer 1204 visible through the cutout 1212).

The identification mark 1210, disposed on the wrap layer 1204 beneath the card backing 1206, is, in some cases, formed from a colored ink (e.g., during fabrication of the cleaning pad 1300 and the wrap layer of the cleaning pad 1300). The colored ink is, for example, one of several different colors that the controller of the robot uses to uniquely identify different types of cleaning pads. In some implementations, the identification mark 1210 is an ink that does not diffuse through the wrap layer 1204 and the absorptive layers 1201*a*, 1201*b*, 1201*c* during use of the cleaning pad 1200, e.g., when the cleaning pad 1200 absorbs moisture through the wrap layer 1204 and the absorptive layers 1201*a*, 1201*b*, 1201*c*.

The card backing 1206 is fabricated to include the cutout 1212. The cutout 1212 is defined by, for example, a portion of the card backing 1206 that is cut out or punched out during manufacturing. As a result, in contrast to the cleaning pad 700 in which the card backing 706 includes an ink to form the identification mark 703, the card backing 1206 does not include the ink or other colored marking to form an identification mark. Rather, the card backing 1206 includes the cutout 1212 to allow a portion of the identification mark 1210 to be visible through the card backing 1206, thus enabling a pad sensor (e.g., the pad sensor assembly 724) of the robot to detect the portion of the identification mark 1210 through the card backing 1206.

Figure 13:
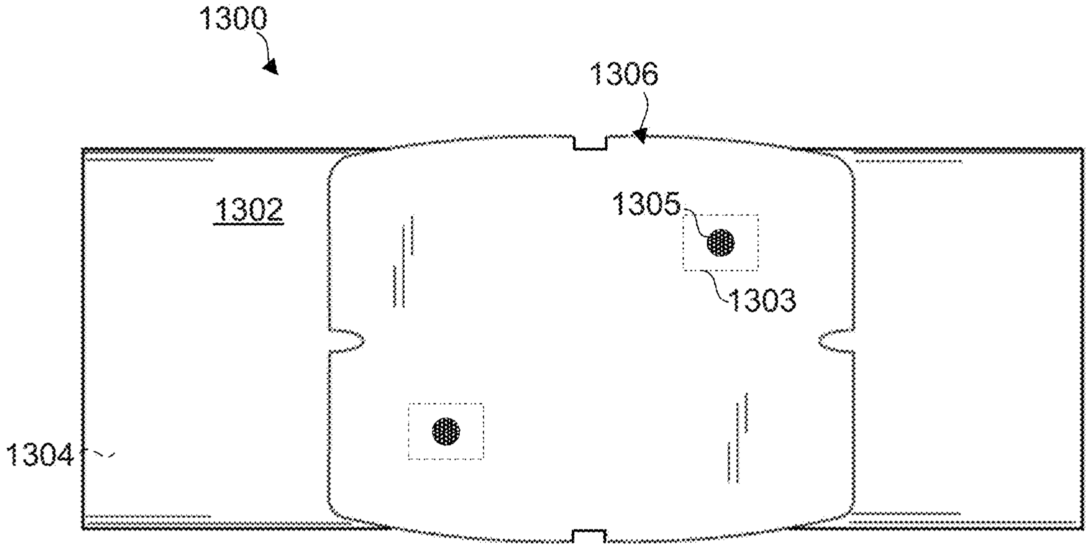
FIG. 13 is a top view of a cleaning pad including an identification mark.

As shown in FIG. 13, a cleaning pad 1300—for example, fabricated using components similar to those described with respect to the cleaning pad 1200 of FIG. 12— includes a mounting surface 1302, a cleaning surface 1304, and a card backing 1306. The outer surface of the pad body of the cleaning pad 1300 defines the mounting surface 1302 and the cleaning surface 1304. When the cleaning pad 1300 is held by a robot, the mounting surface 1302 faces the robot while the cleaning surface 1304 faces opposite the robot. During a cleaning operation in which the robot navigates about a floor surface, the cleaning surface 1304 faces the floor surface. A portion of monochromatic identification mark 1303 disposed on a wrap layer of the cleaning pad 1300 is visible or optically sensible through a cutout 1305 of the card backing 1306. The identification mark 1303 is replicated symmetrically about longitudinal and horizontal axes of the cleaning pad 1300 on the mounting surface 1302 so that the user can insert the cleaning pad 1300 into the robot in either horizontal orientation.

In some examples, the identification mark 1303 occupies a greater area than the area of the cutout 1305 to ensure that the identification mark 1303 fills the cutout 1305. The identification mark 1303 has an area that is, for example, 0% to 50%, 10% to 25%, or 25% to 50% larger than the area of the cutout 1305. In some implementations, the marking 1010 occupies an area between, for example, 0.5 square centimeters and 2 square centimeters, 2 square centimeters and 6 square centimeters or 2 square centimeters and 4 square centimeters.

The identification mark 1303, in some cases, occupies an area proportional to the area of the card backing 1006, such as, for example, 10% to 25% or 25% to 50% of the area of the card backing 1006. In some examples, the area of the identification mark 1303 corresponds to the area of an emitter window of the pad sensor. The size of the cutouts are sufficiently large to allow the pad sensor to detect radiation reflected off of the identification mark 1303 through the emitter window. The identification mark 1303 occupies an area that is, for example, 100% to 150%, 110% to 125%, 125% to 150%, 150% to 200%, or 200% to 250% of the area of the emitter window. The cutouts, in some examples, are circular and have a diameter of about 3 mm to 5 mm, 5 mm to 10 mm, or 10 mm to 20 mm. In some implementations, the cutouts are elliptical, rectangular, square, or other appropriate shape that provides a sufficient area for the optical sensor of the robot to detect the identification mark 1303.

Referring back to FIGS. 7B and 7C, the pad sensor assembly 724 of the robot used to detect the identification mark 703 can be similarly used to detect the identification mark 1303 of FIG. 13. The size of the cutout 1305 is sufficiently large to allow the photodetector 728 to detect radiation reflected off of the portion of the identification mark 1303 visible through the card backing 1306 (e.g., the cutout 1305 has a diameter of about 5 mm to 50 mm). When the cleaning pad 1300 is inserted into the pad holder 720, the cutout 1305 and the identification mark 1303 are positioned beneath the pad sensor assembly 724 so that radiation emitted by the emitter 730 travels through the emitter window 733, illuminates the portion of the identification mark 1303 visible through the cutout 1305. The radiation reflects off of the identification mark 1303 through the detector window 734 to the detector 728. After the user has inserted the cleaning pad 1300 into the pad holder 720, the controller of the robot determines the type of pad that has been inserted into the pad holder 720 using, for example, the identification mark process 750 to detect and process the information provided by the identification mark 1303 (e.g., a spectral response of the identification mark 1303). Based on the color of the identification mark 1303, the controller can determine the type of the cleaning pad and adjust cleaning and navigation operations accordingly, as described herein.

Other Identification Schemes

Figure 8A:
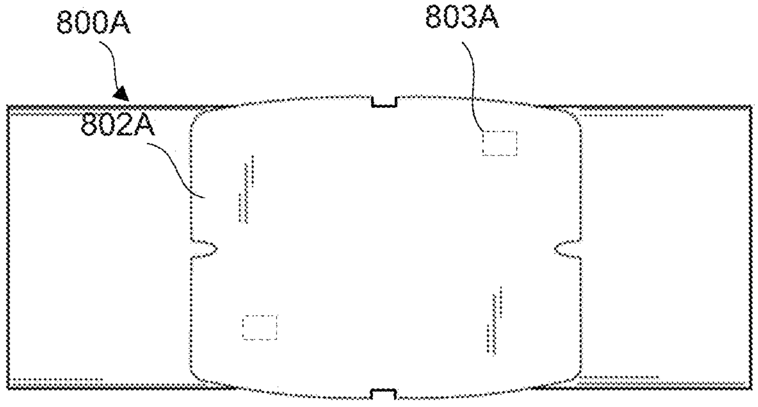
FIGS. 8A-8F show cleaning pads with other pad identification features.

FIGS. 8A to 8F show other cleaning pads with different detectable attributes that can be used to allow the controller of the robot to identify the type of cleaning pad deposited into the pad holder. Referring to FIG. 8A, a card backing 802A of a cleaning pad 800A includes a radio-frequency identification (RFID) chip 803A. The radio-frequency identification chip uniquely distinguishes the type of cleaning pad 800A being used. The pad holder of the robot would include an RFID reader with a short reception range (e.g., less than 10 cm). The RFID reader can be positioned in the pad holder such that it sits above the RFID chip 803A when the cleaning pad 800A is properly loaded onto the pad holder.

Figure 8B:
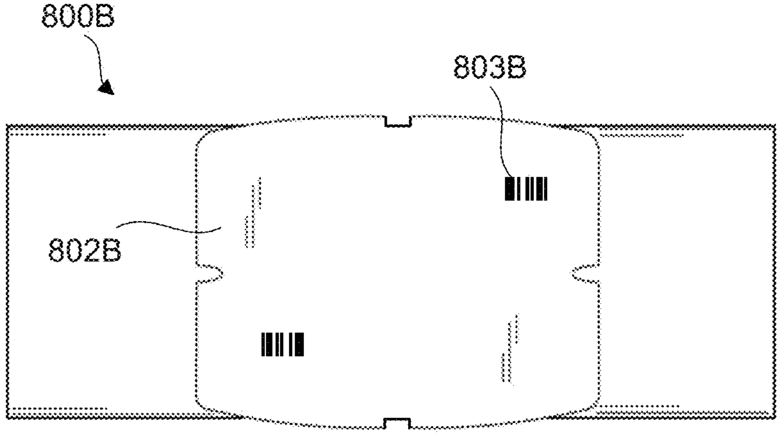

Referring to FIG. 8B, a card backing 802B of a cleaning pad 800B includes a bar code 803B to distinguish the type of cleaning pad 800A being used. The pad holder of the robot would include a bar code scanner that scans the bar code 803B to determine the type of cleaning pad 800A deposited on the pad holder.

Figure 8C:
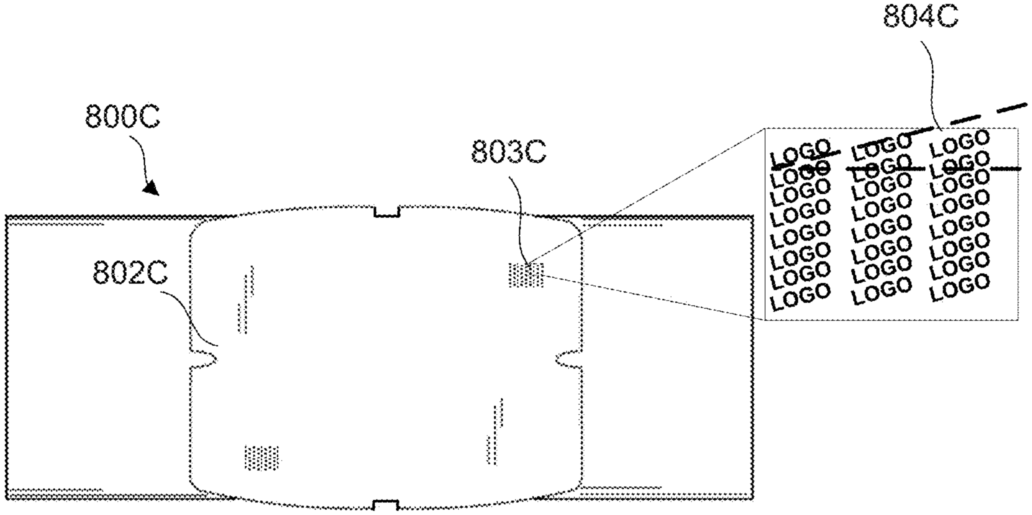

Referring to FIG. 8C, a card backing 802C of a cleaning pad 800C includes a microprinted identifier 803C that distinguishes the type of cleaning pad 800C used. The pad holder of the robot would include an optical mouse sensor that takes images of the microprinted identifier 803C and determines characteristics of the microprinted identifier 803C that uniquely distinguishes the cleaning pad 800C. For example, the controller can use the image to measure an angle 804C of orientation of a feature (e.g., a corporate logo or other repeated image) of the microprinted identifier 803C. The controller selects a pad type based on detection of the image orientation.

Figure 8D:
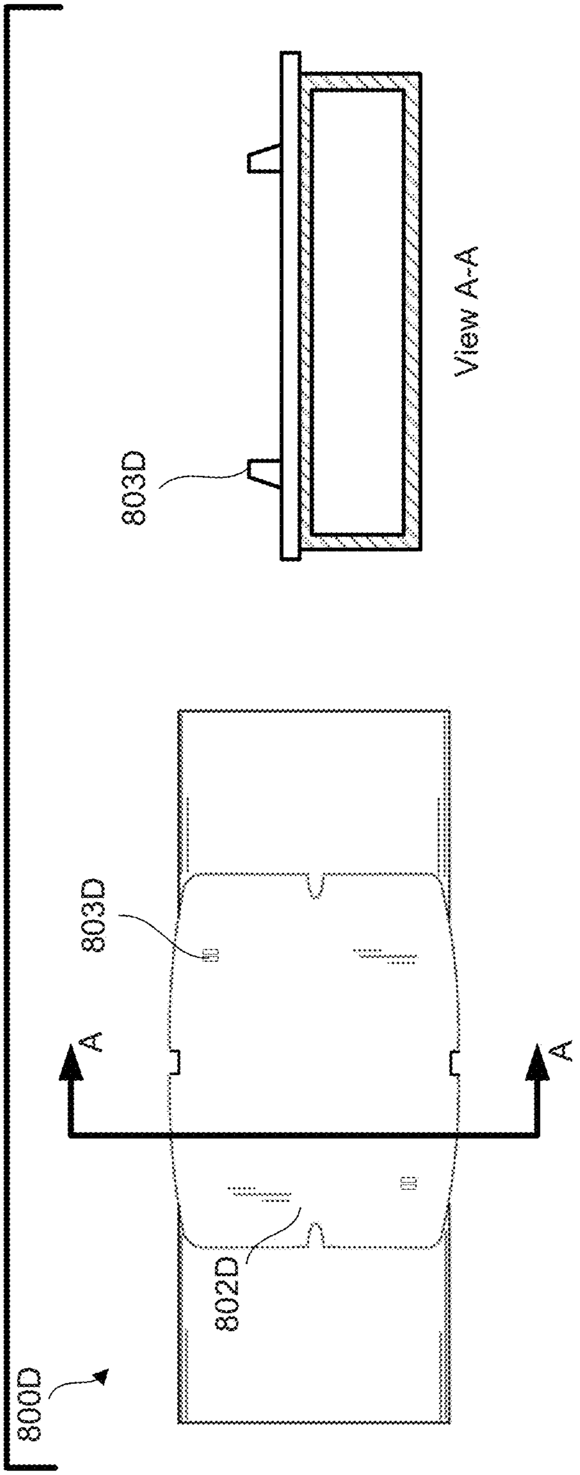

Referring to FIG. 8D, a card backing 802D of a cleaning pad 800D includes mechanical fins 803D to distinguish the type of cleaning pad 800C used. The mechanical fins 803D can be made of a foldable material such that they can be flattened against the card backing 802D. The mechanical fins 803D protrude from the card backing 802D in their unfolded states, as shown in the A-A view of FIG. 8D. The pad holder of the robot may include multiple break beam sensors. The combination of mechanical break beam sensors that are triggered by the fins indicates to the controller of the robot that a particularly type of cleaning pad 800D has been loaded into the robot. One of the break beam sensors can interface with the mechanical fin 803D shown in FIG. 8D. The controller, based on the combination of sensors that have been triggered, can determine pad type. The controller may alternatively determine from the pattern of triggered sensors a distance between mechanical fins 803D that is unique to a particular pad type. By using the distance between fins or other features, as opposed to the exact position of such features, the identification scheme is resistant to slight misalignment errors.

Figure 8E:
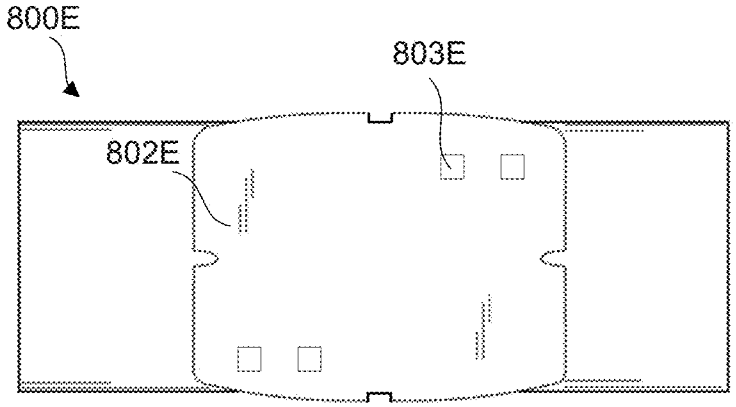

Referring to FIG. 8E, a card backing 802E of a cleaning pad 800E includes cutouts 803E. The pad holder of the robot can include mechanical switches that remain unactuated in the region of the cutout 803E. As a result, the placement and size of the cutout 803E can uniquely identify the type of the cleaning pad 803E deposited into the pad holder. For example, the controller, based on the combination of switches that are actuated, can compute a distance between the cutouts 803E, and the controller can use the distance to determine the pad type.

Figure 8F:
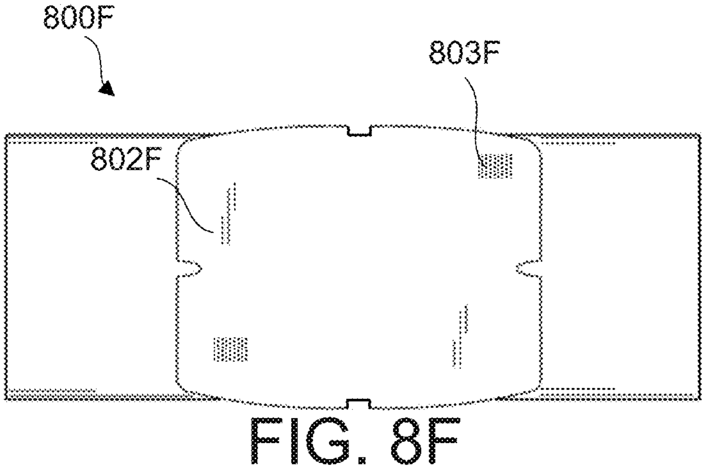

Referring to FIG. 8F, a card backing 802F of a cleaning pad 800F includes a conductive region 803F. The pad holder of the robot can include a corresponding conductivity sensor that contacts the card backing 802F of the cleaning pad 800F. Upon contacting the conductive region 803F, the conductivity sensor detects a change in conductivity because the conductive region 803F has a higher conductivity than the card backing 802F. The controller can use the change in conductivity to determine the type of the cleaning pad 800F.

Methods of Use

The robot 100 (shown in FIG. 1A) can implement the control system 500 and pad identification system 534 (shown in FIG. 5) and use the pad identifiers (e.g., the identification sequence 603 of FIG. 6A, the identification mark 703 of FIG. 7A, the RFID chip 803A of FIG. 8A, the bar code 803B of FIG. 8B, the microprinted identifier 803C of FIG. 8C, the mechanical fins 803D of FIG. 8D, the cutouts 803E of FIG. 8E, and the conductive regions 803F of FIG. 8F) to intelligently execute specific behaviors based on the type of cleaning pad 120 (shown in FIG. 2A and alternatively described as cleaning pads 600, 700, 800A-800F) loaded into the pad holder 300 (shown in FIGS. 3A-3D and alternative described as pad holders 620, 720). The method and process below describes an example of using the robot 100 having a pad identification system.

Figure 9:
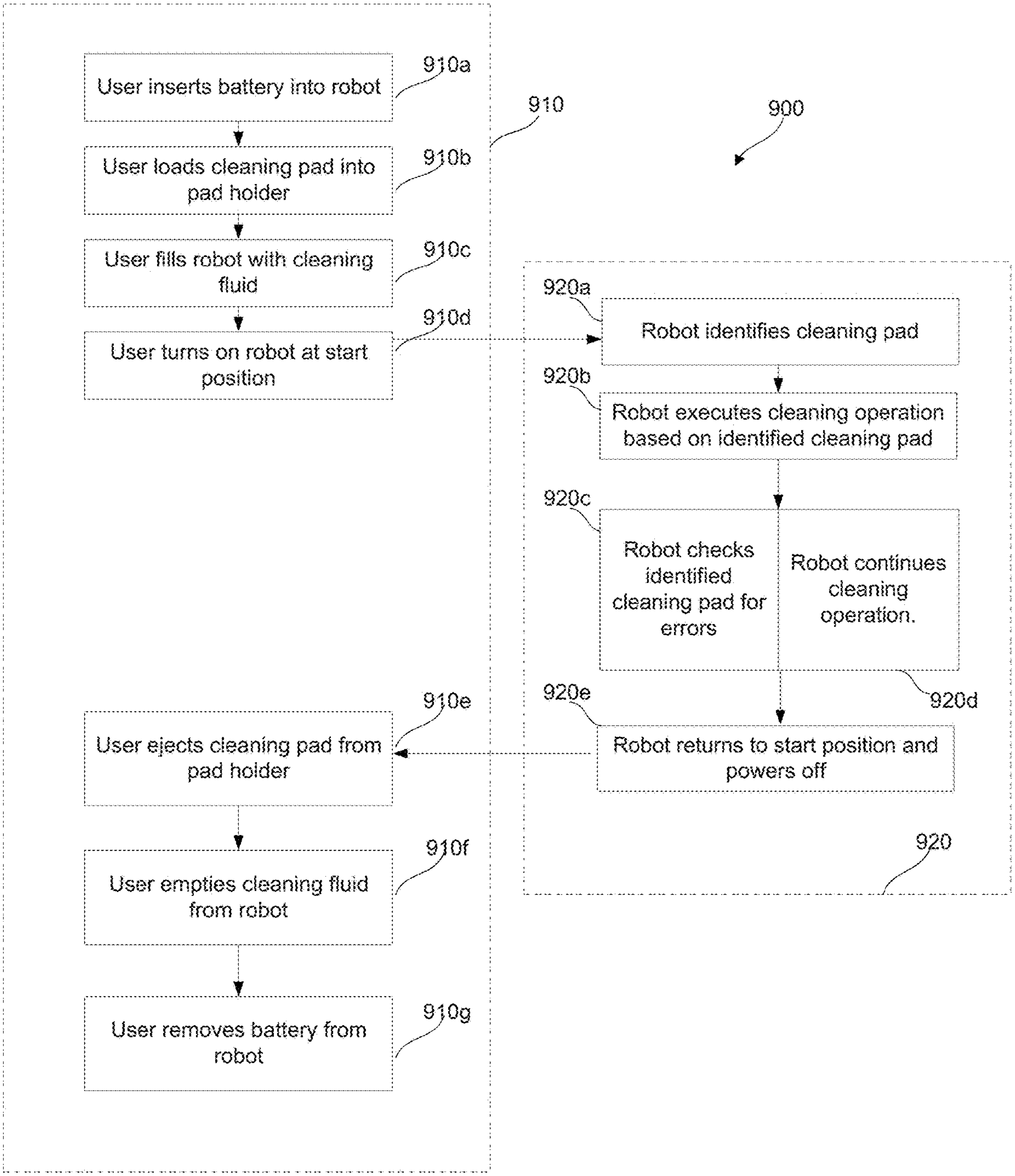
FIG. 9 is a flowchart describing use of a pad identification system.

Referring to FIG. 9, a flowchart 900 describes a use case of the robot 100 and its control system 500 and pad identification system 534. The flowchart 900 includes user steps 910 corresponding to steps that the user initiates or implements and robot steps 920 corresponding to steps that the robot initiates or implements.

At step 910*a*, the user inserts a battery into the robot. The battery provides power to, for example, the control system of the robot 100.

At step 910*b*, the user loads the cleaning pad into the pad holder. The user can load the cleaning pad by sliding the cleaning pad into the pad holder such that the cleaning pad engages with the protrusions of the pad holder. The user can insert any type of cleaning pad, for example, the wet mopping cleaning pad, the damp mopping cleaning pad, the dry dusting cleaning pad, or the washable cleaning pad described above.

At step 910*c*, if applicable, the user fills the robot with cleaning fluid. If the user inserted a dry dusting cleaning pad, the user does not need to fill the robot with the cleaning fluid. In some examples, the robot can identify the cleaning pad immediately after operation 910*b*. The robot can then indicate to the user whether the user needs to fill the reservoir with cleaning fluid.

At step 910*d*, the user turns on the robot 100 at a start position. The user can, for example, press the clean button 140 (shown in FIG. 1A) once or twice to turn on the robot. The user can also physically move the robot to the start position. In some cases, the user presses the clean button once to turn on the robot and presses the clean button a second time to initiate the cleaning operation.

At step 920*a*, the robot identifies the type of the cleaning pad. The controller of the robot can execute one of the pad identification schemes described with respect to FIGS. 6A-D, 7A-D, and 8A-F, for example.

At step 920*b*, upon identifying the type of the cleaning pad, the robot executes a cleaning operation based on the type of cleaning pad. The robot can implement navigational behaviors and spraying schedules as described above. For example, in the example as described with respect to FIG. 4E, the robot executes the spraying schedule corresponding to TABLES 2 and 3 and executes the navigational behavior as described with respect to those tables.

At steps 920*c* and 920*d*, the robot periodically checks the cleaning pad for errors. The robot checks the cleaning pad for errors while the robot continues the cleaning operation executed as part of step 920*b*. If the robot does not determine that an error has occurred, the robot continues the cleaning operation. If the robot determines that an error has occurred, the robot can, for example, stop the cleaning operation, change the color of a visual indicator on top of the robot, generate an audible alert, or some combination of indications that an error has occurred. The robot can detect an error by continuously checking the type of the cleaning pad as the robot executes the cleaning operation. In some cases, the robot can detect an error by comparing its current identification the cleaning pad type with the initial cleaning pad type identified as part of step 920*b* described above. If the current identification differs from the initial identification, the robot can determine that an error has occurred. As described earlier, the cleaning pad can slide off of the pad holder, which can result in the detection of an error.

At step 920*e*, upon completing the cleaning operation, the robot returns to the start position from the step 910*d* and powers off. The controller of the robot can cut power from the control system of the robot upon detecting that the robot has returned to the start position.

At step 910*e*, the user ejects the cleaning pad from the pad holder. The user can actuate the pad release mechanism 322 as described above with respect to FIGS. 3A-3C. The user can directly eject the cleaning pad into the trash without touching the cleaning pad.

At step 910*f*, if applicable, the user empties the remaining cleaning fluid from the robot.

At step 910*g*, the user removes the battery from the robot. The user can then charge the battery using an external power source. The user can store the robot for future use.

The steps above described with respect to the flowchart 900 do not limit the scope of the methods of use of the robot. In one example, the robot can provide visual or audible instructions to the user based on the type of the cleaning pad that the robot has detected. If the robot detects a cleaning pad for a particular type of surface, the robot can gently remind the user of the type of surfaces recommended for the type of surface. The robot can also alert the user of the need to fill the reservoir with cleaning fluid. In some cases, the robot can notify the user of the type of the cleaning fluid that should be placed into the reservoir (e.g., water, detergent, etc.).

In other implementations, upon identifying the type of the cleaning pad, the robot can use other sensors of the robot to determine if the robot has been placed in the correct operating conditions to use the identified cleaning pad. For example, if the robot detects that the robot has been placed on carpet, the robot may not initiate a cleaning operation to prevent the carpet from being damaged.

While a number of examples have been described for illustration purposes, the foregoing description is not intended to limit the scope of the invention, which is defined by the scope of the appended claims. There are and will be other examples and modifications within the scope of the following claims.

What is claimed is:

1. A cleaning pad comprising:

a pad body comprising a first surface and a second surface, a pad identification feature indicative of a type of the cleaning pad, and a plate secured to the second surface of the pad body, wherein the plate is mountable to an autonomous cleaning robot to attach the cleaning pad to the autonomous cleaning robot such that the second surface of the pad body faces the autonomous cleaning robot and the first surface faces away from the autonomous cleaning robot, and wherein the plate comprises a cutout that allows the pad identification feature to be detectable by a pad sensor of the autonomous cleaning robot, an area of the pad identification feature being larger than an area of the cutout.

2. The cleaning pad of claim 1, wherein:

the cutout extends across the plate above a first area of the pad body, and the pad identification feature comprises a marking on the second surface extending across a second area of the pad body, the second area of the pad body overlapping with at least 85% of the first area of the pad body.

3. The cleaning pad of claim 1, wherein:

the cutout extends across the plate above a first area of the pad body, and the pad identification feature comprises a marking on the second surface extending across a second area of the pad body, the second area of the pad body being greater than the first area of the pad body.

4. The cleaning pad of claim 1, wherein:

the pad identification feature is a first pad identification feature, and the cutout is a first cutout, the cleaning pad further comprises a second pad identification feature indicative of the type of the cleaning pad, the plate further comprises a second cutout that allows the second pad identification feature to be detectable by the pad sensor of the autonomous cleaning robot, and the first pad identification feature and the second pad identification feature are symmetrically located about a longitudinal axis and a horizontal axis of the cleaning pad.

5. The cleaning pad of claim 4, wherein the first pad identification feature is configured to be detected by the pad sensor of the autonomous cleaning robot when the cleaning pad is attached to the autonomous cleaning robot in a first orientation, and the second pad identification feature is configured to be detected by the pad sensor of the autonomous cleaning robot when the cleaning pad is attached to the autonomous cleaning robot in a second orientation.

6. The cleaning pad of claim 1, wherein the pad identification feature corresponds to at least one of a wet mopping cleaning pad, a damp mopping cleaning pad, a dry dusting cleaning pad, or a washable cleaning pad.

7. The cleaning pad of claim 1, wherein the pad identification feature is formed from ink deposited on the second surface.

8. The cleaning pad of claim 7, wherein a color of the ink deposited on the second surface is indicative of the type of the cleaning pad.

9. The cleaning pad of claim 7, wherein a pattern of the ink deposited on the second surface is indicative of the type of the cleaning pad.

10. The cleaning pad of claim 1, wherein the pad body comprises a plurality of absorbent layers and an external layer wrapped around the absorbent layers, and wherein the pad identification feature is located on the external layer.

11. The cleaning pad of claim 1, wherein the cutout is positioned within an outer perimeter of the plate.

12. The cleaning pad of claim 1, wherein the area of the pad identification feature is between 10% and 50% larger than the area of the cutout.

13. The cleaning pad of claim 12, wherein the area of the pad identification feature is between 25% and 50% larger than the area of the cutout.

14. The cleaning pad of claim 1, wherein the area of the pad identification feature is between 10% to 50% of the area of the plate.

15. The cleaning pad of claim 14, wherein the area of the pad identification feature is between 25% and 50% of the area of the plate.

16. A cleaning pad comprising:

a pad body comprising a first surface and a second surface, a pad identification feature indicative of a type of the cleaning pad, and a plate secured to the second surface of the pad body, the plate being symmetric about a longitudinal axis of the cleaning pad and a horizontal axis of the cleaning pad, wherein the plate is mountable to an autonomous cleaning robot to attach the cleaning pad to the autonomous cleaning robot such that the second surface of the pad body faces the autonomous cleaning robot and the first surface faces away from the autonomous cleaning robot, and wherein the plate comprises a cutout that allows the pad identification feature to be detectable by a pad sensor of the autonomous cleaning robot.

17. The cleaning pad of claim 16, wherein the cleaning pad is mountable to the autonomous cleaning robot in at least two orientations.

18. The cleaning pad of claim 1, wherein the cutout is configured to allow radiation to pass through the cutout in a first direction and allow a reflected portion of the radiation to pass through the cutout in a second direction.

19. The cleaning pad of claim 1, wherein a first portion of the pad identification feature is visible through the cutout and a second portion of the pad identification feature is obscured by the plate.

20. The cleaning pad of claim 16, wherein the cutout is a first cutout and the plate further comprises a second cutout that allows a second pad identification feature of the cleaning pad to be detectable by the autonomous cleaning robot.

21. The cleaning pad of claim 20, wherein the first and second cutouts are symmetric about the longitudinal axis of the cleaning pad and the horizontal axis of the cleaning pad.

22. The cleaning pad of claim 21, wherein the pad identification feature is formed from ink deposited on the second surface, and a color or pattern of the ink is indicative of the type of the cleaning pad.

23. A cleaning pad comprising:

a pad body comprising a first surface and a second surface, a pad identification feature indicative of a type of the cleaning pad, the pad identification feature corresponding to at least one of a wet mopping cleaning pad, a damp mopping cleaning pad, a dry dusting cleaning pad, or a washable cleaning pad, and a plate secured to the second surface of the pad body, wherein the plate is mountable to an autonomous cleaning robot to attach the cleaning pad to the autonomous cleaning robot such that the second surface of the pad body faces the autonomous cleaning robot and the first surface faces away from the autonomous cleaning robot, and wherein the plate comprises a cutout that allows the pad identification feature to be detectable by a pad sensor of the autonomous cleaning robot.

24. The cleaning pad of claim 23, wherein the cutout is configured to allow radiation to pass through the cutout in a first direction and allow a reflected portion of the radiation to pass through the cutout in a second direction.

25. The cleaning pad of claim 24, wherein an area of the pad identification feature is larger than an area of the cutout.

* * * * *